(12) United States Patent
Thoumy et al.

(10) Patent No.: US 7,039,120 B1
(45) Date of Patent: May 2, 2006

(54) DEVICE AND METHOD FOR THE DYNAMIC ALLOCATION OF FREQUENCIES FOR MULTICARRIER MODULATION SYSTEMS

(75) Inventors: François Thoumy, Chevaigne (FR); Philippe Le Bars, Nouvoitou (FR); Samuel Rousselin, Rennes (FR); Lionel Le Scolan, Rennes (FR); Frédérique Ehrmann, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/450,716

(22) Filed: Nov. 30, 1999

(30) Foreign Application Priority Data

Nov. 30, 1998 (FR) .............................. 98 15042
Jan. 29, 1999 (FR) .............................. 99 0134
Oct. 11, 1999 (FR) ............................. 99 12648

(51) Int. Cl.
  *H04L 27/10* (2006.01)

(52) U.S. Cl. ....................... 375/275; 375/260
(58) Field of Classification Search ................. 375/275, 375/271, 279, 260, 281, 222, 246
See application file for complete search history.

(56) References Cited

U.S. PATENT DOCUMENTS 5,313,467 A * 5/1994 Varghese et al. ............ 370/468
5,479,447 A * 12/1995 Chow et al. ................. 375/260
5,636,247 A    6/1997 Kamerman et al. ......... 375/260

FOREIGN PATENT DOCUMENTS

| EP | 0 753 948 A1 | 1/1997 |
| EP | 0 841 771 A1 | 5/1998 |
| EP | 0 905 948 A2 | 3/1999 |
| EP | 0 928 084 A2 | 7/1999 |
| GB | 2 280 571 A  | 2/1995 |
| WO | WO 97/16046  | 5/1997 |
| WO | WO 99/39484  | 8/1999 |

OTHER PUBLICATIONS

"Bit Significance Selective Frequency Diversity Transmission," Kumagai, et al., IEICE Transactions on Communications, vol. E81–B, No. 3, Mar. 1998, pp. 545–552.

* cited by examiner

*Primary Examiner*—Khai Tran
(74) *Attorney, Agent, or Firm*—Fitzpatrick, Cella, Harper & Scinto

(57) ABSTRACT

The method of transmitting data in the form of symbols sent over an electromagnetic channel is characterized in that a measurement of significance is attributed to each group of data to be transmitted, in that the transmission reliability of the carriers is estimated dynamically, and in that the most significant data are sent over the most reliable carriers at each instant, the other data being sent over the carriers of decreasing reliability, in decreasing order of significance of the data.

101 Claims, 30 Drawing Sheets

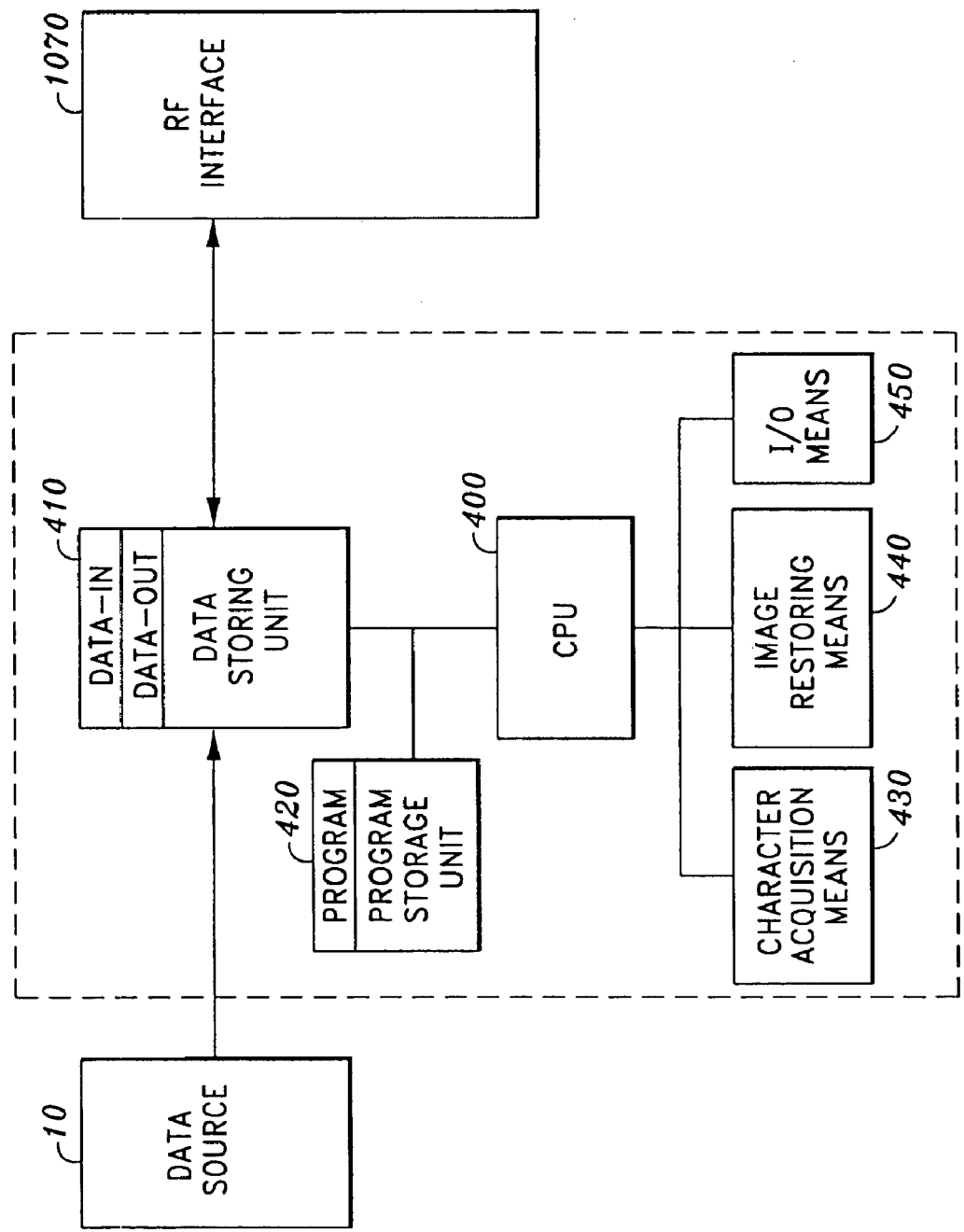

DEVICE AND METHOD FOR THE DYNAMIC ALLOCATION OF FREQUENCIES FOR MULTICARRIER MODULATION SYSTEMS

BACKGROUND OF THE INVENTION

1. Field of the Invention

The invention relates to the transmission of information in the form of an electromagnetic signal. In particular, the invention concerns the allocation of carrier frequencies for transmission systems using multi-carrier type modulation and the process for reducing the ratio of peak amplitude to mean amplitude usually required in transmission systems using multi-carrier type modulation.

2. Description of the Related Art

An information transmission system generally sends symbols serially, where each symbol can be a sequence of binary data. Consequentially, the frequency band required to send the symbols must be larger than the inverse of the length of a symbol. When the symbol transmission rate becomes to high, the channel must have identical amplitude and phase characteristics over the entire space of the frequencies which constitute the passband. Any distortions will give rise to interference between symbols, which must be negated with an equalizer.

One method of avoiding this problem is to distribute the signal, formed by a stream of symbols, over a plurality of parallel carriers, which are individually modulated at a low transmission rate. Because the transmission rate is low for each carrier, the passband required is smaller and therefore the frequency and phase characteristics will more likely be identical for all the frequencies constituting this band.

This technique is generally known as frequency division multiplex, and is used to select carriers so as to avoid interference. One particular case is Orthogonal Frequency Division Multiplex, or OFDM, in which the spacing between two adjacent subcarriers (the closest subcarriers in terms of frequency) corresponds to the inverse of the length of a symbol sent.

As a result of flaws in the transmission channel, a transmitted symbol can contain errors on reception, and, if the errors are detected, retransmission may be required.

To improve this situation, it is possible to transmit a series of blocks of symbols, where each of these blocks is a discrete Fourier transform or inverse Fourier transform of a corresponding block of information symbols.

The advantage of this technique is that all of the symbols received will be affected by only a small evaluation error in the event of a transmission channel problem. If the procedure were not applied, a single symbol would be affected by a large evaluation error, leading to erroneous detection. It is an object of the invention to correctly evaluate all symbols using the fast Fourier transforms demodulation technique.

This technique is also a particular method of OFDM. To appreciate the similarity of this technique to OFDM, reference can be made to chapter 15 of "Modem Quadrature Amplitude Modulation Principles and Applications for Fixed and Wireless Channels," by W. T. Webb and L. Hanzo.

OFDM operates as follows. Initially, a complex vector comprising n components for transmission is transformed with an inverse Fast Fourier Transform (IFFT). The complex vector can be, for example, complex numbers forming part of a whole creating an alphabet, or code adapted to correspond to the different sequences of data for transmission.

The transformation by IFFT may be by a matrix product of an inverse Fast Fourier transform matrix, or "Fourier Matrix", into n rows and n columns by the vector of the n data elements for transmission. The alphabet is generally that of the phase and amplitude modulations.

A vector of n complex numbers, known as a "transformed vector, is generated from this matrix product. The transformed vector forms a succession of numbers the amplitudes of which are transmitted successively by the device. This series of amplitudes, referred to as a baseband OFDM symbol corresponds to a sequence of n data elements for transmission.

This signal can itself modulate a carrier of a higher frequency to be able to be transmitted in a transposed band, according to a conventional technique.

Baseband reception or demodulation occurs by multiplying the received transformed vector with the matrix of the direct Fast Fourier transform, or the matrix of the inverse transform if the direct Fast Fourier transform was used on transmission). The received vector is a counterpart of the vector obtained from OFDM transmission, although it has been subjected to interference, noise addition or partial fading.

OFDM demodulation does not, therefore, restore the initial components of the complex vector associated with the sequence of data for transmission, but rather it approximates the components. The information is restored after a decision making process which consists of measuring the distance of each component calculated after reception at each point of the encoding alphabet used for transmission, and of assimilating the component calculated after reception to the point of the alphabet that corresponds to the shortest distance.

Instead of having most of the data received perfectly and a few data elements completely lost, as in conventional series transmission, the transmission errors are, in fact, distributed over all of the points, which ensures that it is almost always possible to reconstitute the initial information in its entirety.

This conventional mode of transmission using OFDM does, however, have a major drawback. Through the effect of the matrix product, the discrete Fast Fourier transform creates a linear combination of the n symbols for transmission and a number of critical complex vectors, associated with critical sequences of data. This combination can result, after the Fourier transform, in transformed vectors wherein the succession of amplitudes of the components have local maximum values corresponding to signal peaks that are substantial, in relation to the mean value for the amplitudes of the components of the transformed vector.

The peak amplitude to mean amplitude ratio of the transformed vectors corresponding to these critical sequences or critical complex vectors is thus very high.

Such critical sequences may cause difficulties for the downstream devices as, in practice, amplifiers and modulators may lack the fidelity to process swift amplitude variations. As a result clipping, which is the non-transmission of the signal peaks, may occur, resulting in the loss of corresponding information. Furthermore, harmonic distortion, one of the major problems of transmission systems, may be introduced, and may be impossible to negate.

Theoretically, maximum amplitude is calculated to be a direct function of the length of the sequence of symbols for transmission.

It is thus highly desirable to reduce this maximum amplitude so as to use the full dynamic properties of the amplifiers without causing clipping or distortion. Several solutions aimed at alleviating this problem of peaks are known. One of these techniques is to exclude sequences of symbols creating maximum peak-to-mean amplitude ratio values of the OFDM symbol. This is achieved by encoding redundancies, resulting in a reduction in the transmission rate of useful symbols. One example of implementation of this solution is described in U.S. Pat. No. 5,636,247.

Another solution is to calculate the inverse Fourier transform for the sequences of symbols to be transmitted, and then to measure the peak-to-mean ratios for the transformed vectors thus obtained, and, by looping, to change the phases of the components of the critical complex vectors corresponding to the peaks. Measurement of these peaks involves calculating another discrete Fourier transform. A technique of this kind is disclosed in U.S. Pat. No. 5,610,908. A third solution is to change the coefficients of the Fourier matrices (inverse and direct) so as to avoid or limit the occurrence of these peaks. This process induces a slight deterioration in the bit error rate. By way of example, one solution of this type has been proposed by patent application FR 98.13261.

All these currently implemented solutions have the drawback either of adversely affecting the bit rate of the transmission, impairing the quality of the transmission, or of being complicated.

A conventional multicarrier transmission system of standard type (see FIG. 1) has a data source 910 a serial-to-parallel converter 920 connected to a stream of subcarriers, and a multi-carrier modulator 950 which transmits the data to an RF transmitter 960. In a standard system of this type, the data are distributed sequentially over the different subcarriers. For example, for a system using eight subcarriers, the data bearing the numbers 0, 8, 16, 24 will be transmitted over the subcarrier 930 of frequency $\omega_1$, the data bearing the numbers 1, 9, 17, 25 will be transmitted over the subcarrier frequency $\omega_2$ etc.

In a conventional device not according to the invention, this stream of the "serial" type is converted into a "parallel" stream by the serial-to-parallel converter 920, so as to reduce the transmission rate of the modulating signals. This parallel stream is then sent to the multi-carrier modulator 950, which effects the modulation necessary for the transmission over the chosen transmission channel.

In the example presented, the serial stream is transformed into a parallel stream in eight bits. In this case, if the transmission rate of the binary source is D, the rate of each stream at the output of the serial-to-parallel converter 920 will therefore be D/8.

Each of these stream then modulates a subcarrier by virtue of the subcarriers 930 to 937. The modulation can be of different types: phase, amplitude or frequency modulation, according to conventional techniques.

An adder 940 next adds all the modulated subcarriers so as to obtain the global signal S(t), which is then transmitted to the RF transmitter 960.

It is significant to note that the binary data $X_{01}, X_1, X_2, \ldots X_7$ issuing from the serial-to-parallel converter 920 and used for modulating the subcarriers, can consist of several bits. They will then more generally be referred to as "symbols". In this case the modulations employed can be complex (for example according to types known to persons skilled in the art as QPSK, 8PSK, 16QAM, 64QAM etc) in order to improve the spectral efficiency.

These elements constitute a conventional multicarrier device, known to persons skilled in the art. It will therefore not be detailed any further in the present description.

The majority of the transmission channels, or "radio" channels used have transmission characteristics, such as attenuation, noise, or phase displacement, which vary depending on the carrier frequency used. Certain channels have characteristics which vary over time, because of "multipath" effects, such as the presence of elements entering the channel.

FIG. 2 depicts an example of a symbolic representation of the transmission quality, quantified by a signal to noise ration, or "SNR", on each of the subcarriers in the case of eight subcarriers, at two different times, Time t1 and Time t2. The transmission characteristics for each frequency varying with time, it is found in the example that the data item $X_6$ is correctly transmitted at time $t_1$, but may be erroneous at time $t^2$.

The concept of efficiency of such a multicarrier transmission is then related to the resolution of the following problem: with what power P must transmission be carried out in order to ensure the transmission of a certain output of data D with a quality Q in a given physical transmission channel?

This efficiency can be defined as the ratio (transmission rate x quality)/emitted power The solution generally adopted for this problem of transmission efficiency is a compromise between on the one hand the energy emitted during transmission over the transmission channel and on the other hand the acceptable error rate for the transmitted data.

The operating principle of the majority of existing devices is to increase the transmission power in order to counteract the degradation of the transmission channel and to transmit all the data with guarantee of an error rate below a predetermined threshold.

Several techniques have been disclosed for improving the efficiency of transmission.

These techniques are based on a different coding for the data considered to be the most significant, before sending over the transmission channel.

A technique disclosed in U.S. Pat. No. 5,425,050 introduces a concept of pyramidal coding, in which two classes of data requiring two different transmission quality levels are created.

U.S. Pat. No. 5,467,132 describes a method for coding the data differently according to their significance.

Other techniques are based on a dynamic estimation of the transmission quality on each subcarrier, and on a modification of number of bits per symbol transmitted in order to take account of this variation in transmission quality. U.S. Pat. No. 5,479,447 describes one example of this technique.

In summary, the conventional solutions to this problem of multicarrier transmission efficiency are:

increasing the transmission power so as always to transmit with a sufficient signal/noise level, testing the transmission channel and eliminating the subcarriers most interfered with, adding redundancy to the data by coding, modifying the number of bits per symbol for the subcarriers interfered with.

All these solutions result in an increase in the emitted energy for transmitting the same data stream with a constant quality.

BRIEF SUMMARY OF THE INVENTION

The present invention relates to an improved method of efficiently transmitting information using multi-carrier modulation.

According to a second objective of the invention, noisy carriers may be utilized, even noisy carriers normally rejected by conventional techniques.

According to another objective, the invention proposes a dynamic transmission method which makes it possible to preserve optimum efficiency when there are variations in characteristics of the transmission channel.

Another objective of the invention is to guarantee correct transmission of the most significant data, simply to a sufficient SNR.

Another object of the method is to reduce the emitted energy during transmission, compared with the existing techniques, for equal efficiency.

To this end, the invention proposes under a first aspect a method of transmitting data using a modulation of the multicarrier type, comprising operations of:
- extraction from received data of a first signal representing the transmission quality on each sub-carrier observed and transmitted by a remote device;
- allocation of transmission data to the sub-carriers in an order based on significance of the transmission data and the first signal representing the transmission quality, and
- insertion in transmission data of a second signal representing the order in which the transmission data are allocated to the sub-carriers based on the significance of the transmission data and the first signal;

It will be understood that this method takes account of the significance of the data, not at the time of coding, but at the time of allocation of a transmission frequency, in an adaptive fashion, when the reliability of the carriers (error rate during transmission) varies, and by taking advantage even of the very noisy carriers, for transferring data of lesser significance. This possible use of the noisy carriers affords a gain in efficiency compared with conventional techniques, in which these carriers would have been avoided, and in which a single error rate common to all the data transmitted is defined in advance.

In addition, the dynamic character of the method guarantees that, in the event of high degradation of the reliability of the transmission channel, the most significant data will always be transmitted as a priority (that is to say over the most reliable channel) with the greatest possible quality at this moment.

Taking into account the significance of the data gives a good saving in energy compared with current methods since in this way it is possible to reduce the transmission power without impairing the quality of transmission of the significant data, and therefore without any risk of loss of the substance of the message.

This is an improvement compared with the current methods in which transmission is carried out with sufficient transmission power to guarantee a given SNR for all frequencies used.

Similarly, the invention proposes a method of receiving data using a modulation of a multicarrier type, comprising operations of
- analysis of transmission channel so as to supply a signal representing transmission quality of each sub-carriers in a return direction;
- extraction from received data of a signal representing an order in which the transmission data are arranged by a transmission device on the sub-carriers; and
- formation of the received data according to the signal representing the order in which the transmission data are arranged by the transmission device.

According to a preferred implementation, the received data are serialized in said formation operation according to the signal representing the order.

The invention also relates to a device for transmitting data to a remote device, comprising:
- means for allocating the transmission data to the sub-carriers in an order based on significance of the transmission data and transmission quality of the sub-carriers; and
- means for inserting in the transmission data of a signal representing the order in which the transmission data are allocated on the sub-carriers based on the significance of the transmission data and the transmission quality of the sub-carriers.

According to a preferred implementation of this device, said allocating means allocates the transmission data to the sub-carriers in the order based on the transmission quality of the sub-carriers observed and transmitted by a reception device.

According to a preferred implementation, the device comprises premodulator means including:
- a means of presenting, to the different inputs of the modulator, each input corresponding to a subcarrier, different data to be transmitted according to a classification of their significance as well as the transmission quality level of each subcarrier in the "outward" direction A→B,
- a means of inserting in the data to be transmitted a signal representing the transmission quality observed in each subcarrier in the "return" direction B→A,
- and a means of inserting, in the data, a signal representing the order in which there are arranged the different data to be transmitted at the input of the premodulator, and the device also has:
- a post-demodulator means including:
- a means of extracting, from the signal issuing from the demodulator, an FCD signal representing the transmission quality observed by the remote device B on each subcarrier in the "outward" direction A→B, said signal being generated by the remote device B,
- and a means of analyzing the transmission channel so as to supply the signal representing the quality of the transmission of each subcarrier in the "return" direction B→A,
- a means of extracting, from the signal issuing from the demodulator, a signal representing the order in which there were arranged the different data to be transmitted at the input of the premodulator of the remote device B,
- and a means of serialising the data received as a function of the DP signal representing the order in which there were arranged the different data to be transmitted at the input of the premodulator of the remote device B.

According to a preferred implementation, the premodulator means also includes a data classification unit and a frequency allocation unit.

According to a particular characteristic, the unit for classifying data to be transmitted has means adapted to generate a DS signal representing the significance of each data item supplied by the source.

According to another particular characteristic, the frequency allocation unit has means adapted to generate a data allocation command signal (determining the distribution of the data over the different subcarriers), from data including the DS and FCD signals A B and means adapted to generate a signal representing the order in which there are arranged the different data to be transmitted at the input of the premodulator.

According to a particular characteristic, the frequency allocation unit has means adapted to perform operations of:

initialization, in which the frequency allocation unit reads the information contained in the FCD, DS and storage signals, classification of the subcarriers by order of interference and storage in the table thus obtained, classification of the indices of the data to be transmitted in order of significance, using the information contained in the DS signal, and storage of the result of this classification, transmission of the signal of the relative positions of the data with respect to each other, to the unit for insertion in the data to be transmitted, transmission of the data allocation command signal to the data allocation unit, this DAC signal being in fact composed of pairs (subcarriers, index of the data), testing to check whether all the pairs have been supplied, so that, if the test is negative, the following pair is supplied, and if the test is positive, the initialization step is returned to.

According to yet another particular characteristic, data allocation unit has means adapted to transfer each data item supplied by the source to the subcarrier defined by the frequency allocation unit in the data allocation command signal.

According to a particular characteristic, the device for the transmission of data from a device A to a remote device B via a transmission channel, has a CPU calculation unit, a temporary data storage unit, a program storage unit, character entry means, image reproduction means and means allowing inputs and outputs.

Under a second aspect, the present invention aims to provide a novel process for optimizing an information transmission system using multi-carrier modulation, the said process offering improved transmission efficiency.

For this purpose, the process for transmitting groups of data elements over a transmission channel using multi-carrier type modulation is wherein a significance is attributed to each data element or group of data elements for transmission, and the most important data is transmitted after modulation favoring a minimum bit error rate, the other data being transmitted after modulation favoring a maximum data rate.

It will be appreciated that, generally speaking, the invention aims to optimize the perceived quality of a transmission using OFDM modulation by exploiting knowledge of the importance of the data for transmission.

According to the nature of the data transmitted, an improvement in perceived quality can be obtained, in fact, either by increasing the data rate (thus by more quickly accessing the data in its entirety) or by reducing the bit error rate in the transmission of the said data.

One simple example of data that can be transmitted according to the invention is that of a picture having a subject and a background; the subject has to be transmitted with the smallest possible bit error rate, whereas the background has be transmitted as quickly as possible.

The invention aims to perform a variety of OFDM transmissions involving minimization of the maximum value for the peak-to-mean ratios of the symbols transmitted, this minimization system being dynamically chosen from among known systems so as to optimize the perceived quality of the transmission.

The invention aims to produce a low-cost system that is simple to implement.

The invention applies to the communication system, i.e. it changes both the transmitter and the receiver.

The invention also relates to a process for transmitting data from a local device, A, to a remote device, B, via a transmission channel, local device A comprising a data source, two multi-carrier modulators, the first one being adapted to favor the minimum bit error rate and the second to favor the maximum data rate, multiplexers adapted to select a modulator, and a radiofrequency interface;

wherein it comprises operations involving receiving from the source a new succession of data elements for transmission;

extracting the information of importance that is associated therewith and analyzing this information;

if the data element is considered to be highly significant, inserting a <<Most Significant Data>> item of information and applying an algorithm that generates an OFDM symbol after the addition of redundancy bits that reduce the peak value of the signal;

if the data is considered to be less significant, inserting a <<Least Significant Data>> item of information and applying an algorithm that generates an OFDM symbol by using an inverse fast Fourier transform (IFFT) matrix modified so as to reduce the peak value of the signal;

transmitting the OFDM symbol generated, via the RF interface.

In one advantageous form of embodiment, the step of inserting the item of information representative of the type of modulator chosen will be combined with the step of inserting synchronization data.

The invention also relates to a process for receiving data transmitted by a remote device, A, via a transmission channel, the reception device, B, comprising a radiofrequency receiver, two multi-carrier demodulators, the first one being adapted to favor the minimum bit error rate and the second the maximum data rate, multiplexers adapted to select a demodulator, and a unit for extracting the type of demodulator to use;

wherein it comprises operations involving:

the radiofrequency receiver receiving a new succession of data elements;

extracting the information of importance that is associated therewith and analyzing this information;

generating a control signal representative of the type of demodulation to be applied;

if the data element is considered to be highly significant, applying a demodulation favoring a minimum bit error rate;

if the data is considered to be less significant, applying a demodulation favoring a maximum data rate;

sending demodulated data to the destination.

The invention also relates, according to another aspect, to a device, A, for transmitting data to a remote device, B, via a transmission channel, with device A comprising a data source and a radiofrequency interface;

wherein the device according to the invention also comprises two multi-carrier demodulators, the first one being adapted to favor the minimum bit error rate and the second to favor the maximum bit rate, and multiplexers adapted to select a modulator, and an insertion unit responsible for inserting into the data an item of information representative of the modulator chosen according to a criterion of importance of the data received from the source.

According to yet another aspect, the invention relates to a device, B, for receiving data transmitted by a remote device, A, via a transmission channel, with reception device B comprising a radiofrequency receiver;

wherein the reception device also comprises two multi-carrier demodulators, the first one being adapted to favor the minimum bit error rate and the second the maximum data rate, multiplexers adapted to select a demodulator, and a unit for extracting control data (type of demodulator to be used) and for generating a signal to command the multiplexers.

Under a third aspect, the present invention concerns a method and device for managing information transmissions in a communication network including a base station and at least one peripheral station communicating said information with it, notably by the transmission of several carriers modulated by the information.

From the French Patent No. FR 2 660 131, a method and device are known for transmitting digital data over a communication channel, based on a technique of modulation by OFDM.

This method starts from the principle that digital data from different sources require levels of protection against transmission errors which are different from one source to another and which are adapted to the type of information under consideration.

The method proposes, for a given group of carriers of an OFDM symbol, to select a type of modulation and a coding efficiency which are appropriate according to the interference affecting the communication channel and the protection level required.

In cases, for example, when it is wished for the data issuing from two sources to be transmitted simultaneously over a radio communication channel, the device proposed in this document allocates a group of given carriers to each of the sources and selects an appropriate modulation type and coding efficiency for each of the groups.

When this technique makes provision for increasing the coding efficiency or reducing the modulation level, for a data source, in order to increase protection against transmission errors, this will result in a decrease in the useful data transmission rate over the communication channel.

However, in certain applications of the real-time type, such as for example the transmission of video or audio data or data used for video conferencing, it is essential to guarantee a constant data rate, whilst the transmission error rate can vary.

Another document, U.S. Pat. No. 5,726,978 describes a method of allocating carriers applied to modulation by OFDM.

During transmissions of information between a base station and several peripheral stations in a network, this method recommends allocating a group of carriers of an OFDM symbol dynamically to the transmissions between the base station and a peripheral station.

According to the results of measurements of the noise level and the quality of reception of the OFDM symbols transmitted over the communication channel, the base station decides to replace some of the carriers which, for example, give rise to data transmissions affected by an excessively high error rate, with other carriers less affected by noise.

This method proposes above all to guarantee a low transmission error rate between the base station and the peripheral stations.

In the light of the above, it would be advantageous to find a method and device for managing information transmissions which can adapt easily to the different requests coming from communication stations in a network and requiring a given service quality, in terms of transmission error rate and output to be transmitted, and making it possible, for example, to satisfy requests for which the transmission error rate must be low and where, at the same time, the useful output of data to be transmitted must remain substantially constant.

The invention aims to resolve under a third aspect this problem and thus proposes a method of managing information transmissions by radio between a base station and at least one peripheral station, communicating information with it by the transmission of carriers modulated by said information, said method including a step of allocating a number of carriers and a modulation to at least one radio communication channel allocated to the transmission of information between said base station and said at least one peripheral station, wherein said method includes a step of determining a number of carriers and a modulation adapted in response to a required service quality, in terms of transmission error rate and transmission rate, for a given transmission of information between said base station and said at least one peripheral station, the adapted number of carriers and modulation differing according to the required service qualities.

Thus the invention guarantees, for a given information transmission over a radio communication channel, a service quality in terms of required transmission error rate and transmission rate, choosing an appropriate pair consisting of a number of carriers and a modulation.

This is particularly important in applications of the real-time type (transmission of video data) or of the file transfer type.

When a transmission of information over the communication channel requires a service quality (in terms of transmission error rate and transmission rate) different from that allocated for the previous transmission of information, the invention makes provision for adapting, for this transmission of information, the number of carriers and the modulation guaranteeing this new service quality.

It should be noted that the transmission error rate can be interpreted in different ways: thus it can for example correspond to an error rate on the bits transmitted or on the number of video or audio data frames transmitted.

In the case of a transmission using a technique known as modulation by orthogonal frequency multiplexing OFDM, the transmission error rate can, for example, mean the error rate on the number of OFDM symbols transmitted.

Advantageously, the required service qualities are also expressed in terms of transmission error rate threshold and variation in the transmission rate acceptable for said given information transmission.

The decision on reconfiguration of the transmission parameters (number of carriers, modulation) is simplified because of the presence of a transmission error rate threshold.

Moreover, accepting that the transmission rate can vary within a range instead of requiring a single value makes it possible to limit the number of possibilities of reconfiguration of the transmission parameters and to be able to terminate a transmission in the even of non-compliance with this criterion.

According to a particular characteristic, the step of determining carriers and a modulation is performed during a transmission of information between the base station and at least one peripheral station, which is particularly advantageous when the actual transmission conditions on the communication channel vary during the information transmission itself, for example because of a movement of the peripheral station.

It should nevertheless be noted that the determination step can also be performed between two information transmissions.

In addition, it is advantageous to be able to perform this determination step both before a new transmission of information, in order to adapt to a new required service quality, and during transmission, in order to guarantee that this service quality is indeed complied with, even if the transmission conditions vary.

According to another particularly advantageous characteristic, the method includes a step of receiving at least one measurement of the transmission error rate on the radio communication channel allocated to the transmission of information between the base station and at least one peripheral station. This error rate is measured globally for the transmission between the base station and at least one peripheral station, and is subsequently taken into account for the step of determining a suitable number of carriers and a suitable modulation.

It should be noted that the step of receiving at least one measurement of the transmission error rate can be performed before or after the step of determining a number of carriers and a modulation suited to a required service quality.

According to a particular characteristic, after the step of receiving said at least one measurement, the method includes a step of analyzing said at least one transmission error rate measurement and of comparing the result of this analysis with the service quality required in terms of transmission rate and transmission error rate.

According to one characteristic, the method includes a step of determining a step of determining a suitable number of carriers and a suitable modulation as a function of the result of the measurement, if the result of this analysis does not meet the service quality required for said transmission.

According to a particular characteristic, the method includes a step of determining a number of carriers to be allocated which is different from that which was previously allocated to said at least one communication channel between the base station and the peripheral station.

The number of given carriers to be allocated to said at least one communication channel between the base station and the peripheral station can therefore be greater than that allocated previously to this communication channel, for example in order to guarantee a required service quality in the case of an application of the real-time type where the transmission rate must remain constant.

According to another particular characteristic, which can be combined with the particular characteristic mentioned above, the method also includes a step of determining a modulation to be allocated to said at least one communication channel between the base station and the peripheral station which is different from the one allocated before.

Thus, where the given number of carriers is greater than the one allocated before in order to guarantee a required service quality (for example in the case of an application of the real-time type where the transmission rate is to remain constant, if, in addition, the communication channel is very noisy and if the required service quality demands a low transmission error rate, it is also possible to reconfigure the modulation in order to make it more robust.

The given number of carriers to be allocated to said at least one communication channel between the base station and the peripheral station can also be less than that allocated previously to this communication channel where the communication channel becomes less noisy.

Thus the carriers which are no longer used for this communication channel, because of the reconfiguration, can be allocated to another communication channel requiring an additional number of carriers.

According to another particular characteristic, which can be combined with the characteristic according to which the given number of carriers is less than the one allocated before to said at least one communication channel between the base station and the peripheral station, the method also includes a step of determining a modulation to be allocated which is different from that allocated before.

Thus, where the number of reconfigured carriers is less than the one allocated before, in order to guarantee a service quality demanded for this transmission, and where this service quality also makes it necessary to guarantee a constant transmission rate, it is also possible to reconfigure the modulation in order to make it less robust.

According to another advantageous characteristic, the method includes on the one hand a step of determining a number of carriers to be allocated to a first communication channel between the base station and a first peripheral station which is greater than that which was previously allocated to this first communication channel and on the other hand a step of determining a number of carriers to be allocated to a second communication channel between the base station and a second peripheral station, which is smaller than the one previously allocated to this second communication channel, in response to service qualities required respectively for the transmission of information over these communication channels, in the terms of transmission error rate and transmission rate.

Thus the step of determining a different number of carriers can result from a compromise between two communication channels, according to the service qualities required for the transmissions of information over each of them, in so far as the two communication channels do not simultaneously require a number of carriers greater than that previously effected.

Advantageously, transmission by modulated carriers uses a technique of modulation by orthogonal frequency division multiplexing OFDM. This technique has a spectral efficiency expressed in bits per hertz which is greater than the other modulation techniques.

Moreover, this technique constitutes an effective means for combating the effects of multiple propagation and fading.

This technique makes it possible to distribute the fading effects which are selective with regard to frequency of the transmission channel over a certain number of subchannels which have constant fadings corresponding to the carrier frequencies of the OFDM multiplex.

According to another aspect, the invention concerns a method of sending information over a radio communication channel including steps of allocating a number of carriers and a modulation to said information for transmitting these over the radio communication channel and sending said information in the form of carriers modulated by said information, wherein said method includes a step of reconfiguring the number of carriers and the modulation allocated to the information according to a required service quality, in terms of transmission error rate and transmission rate for a given information transmission, the number of carriers and the modulation reconfigured differing according to the required service qualities.

The step of reconfiguring the number of carriers and the modulation allocated to a given information transmission is performed so as to adapt to the required service quality.

According to yet another aspect, the invention relates to a method of receiving information coming from a radio communication channel, including a step of receiving said information sent in the form of carriers modulated by said information and a step of selecting the carriers and modulation allocated to said information, wherein it includes a step of reconfiguring the number of carriers and the modulation to be selected according to a required service quality, in terms of transmission error rate and transmission rate for a given information transmission, the number of carriers and the modulation reconfigured differing according to the required service qualities.

According to a particular characteristic, the method according to the invention includes a step of carrying out at least one measurement of the transmission error rate on the radio communication channel allocated to the information transmission in question.

Advantageously, the result of this measurement supplies information on the actual conditions of the current transmission and therefore makes it possible to reconfigure the number of carriers and the modulation allocated to this transmission where the required service quality is not met.

The actual conditions of the current transmission can therefore be monitored continuously and the number of carriers and the modulations adapted accordingly.

Correlatively with the management method, the invention relates to a device for managing the information transmissions by radio between a base station and at least one peripheral station communicating information with it by transmitting carriers modulated by said information, said device having means of allocating a number of carriers and a modulation to at least one radio communication channel allocated to the transmission of information between said base station and said at least one peripheral station, wherein said device has means of determining a number of carriers and a modulation adapted in response to required service qualities, in terms of transmission error rate and transmission rate for a given information transmission between said base station and said at least one peripheral station, the number of carriers and the modulation adapted differing according to the required service qualities.

Thus, in response to a service quality required either by a peripheral station or by the base station itself, the transmission management device according to the invention determines the number of carriers and the modulation which it is necessary to allocate to a given information transmission in order to guarantee this service quality.

Correlatively with the sending method, the invention also relates to a device for sending information over a radio communication channel, having means of allocating a number of carriers and a modulation to said information for transmitting it over said radio communication channel, and means of sending said information in the form of carriers modulated by said information, wherein said device has means of reconfiguring the number of carriers and the modulation allocated to the information according to a required service quality, in terms of transmission error rate and transmission rate for a given information transmission, the number of carriers and the modulation reconfigured differing according to the required service qualities.

Correlatively with the reception method, the invention relates to a device for receiving information coming from a radio communication channel, having means of receiving said information sent in the form of carriers modulated by said information and means of selecting the carriers and the modulation allocated to said information, wherein said device has means of reconfiguring the number of carriers and the modulation to be selected as a function of a required service quality, in terms of transmission error rate and transmission rate for a given information transmission, the number of carriers and the modulation reconfigured differing according to the required service qualities.

Another object of the invention is a base station able to communicate information by radio with at least one peripheral station, wherein said base station has a device for managing information transmissions by radio as briefly disclosed above.

According to a particular characteristic, the base station has a sending device and a reception device as briefly disclosed above.

It should be noted that the management device can include the sending device and the reception device mentioned above.

The invention relates to a peripheral station able to communicate information by radio with a so-called base station, wherein said peripheral station has a radio sending device and reception device as briefly described above.

The invention also concerns a network including a base station and at least one peripheral station as disclosed above.

The base station and peripheral stations can have a computer, a printer, a server, a facsimile machine, a scanner, a digital cameral, a digital photographic apparatus, a television, a video recorder or a decoder (known as a "set-top box").

The invention also relates to a telephone, a photographic apparatus, a printer, a scanner, a camera, a computer, a facsimile machine, a television receiver and an audio/video player, wherein they have a device as briefly disclosed above.

The invention also relates to:
- an information storage means that is readable by a computer or by a micro-processor holding instructions of a computer program, wherein it permits implementation of the process according to the invention as succinctly presented hereabove; and
- an information storage means that is removable, partially or wholly, and readable by a computer or a micro-processor holding instructions of a computer program, wherein it permits implementation of the invention as succinctly presented hereabove.

The advantages of this device, network, telephone, photographic apparatus, printer, scanner, camera, computer, facsimile machine, television receiver, audio/video player and storage means being the same as those of the method as briefly disclosed above, they are not repeated here.

BRIEF DESCRIPTION OF THE DRAWINGS

The following description and drawings will give a better understanding of the aims and advantages of the invention. Clearly that this description is given by way of example, and has no limitative character. In the drawings:

FIG. 11 illustrates a form of embodiment of the invention using a computer;

DETAILED DESCRIPTION OF THE INVENTION

Figure 1:
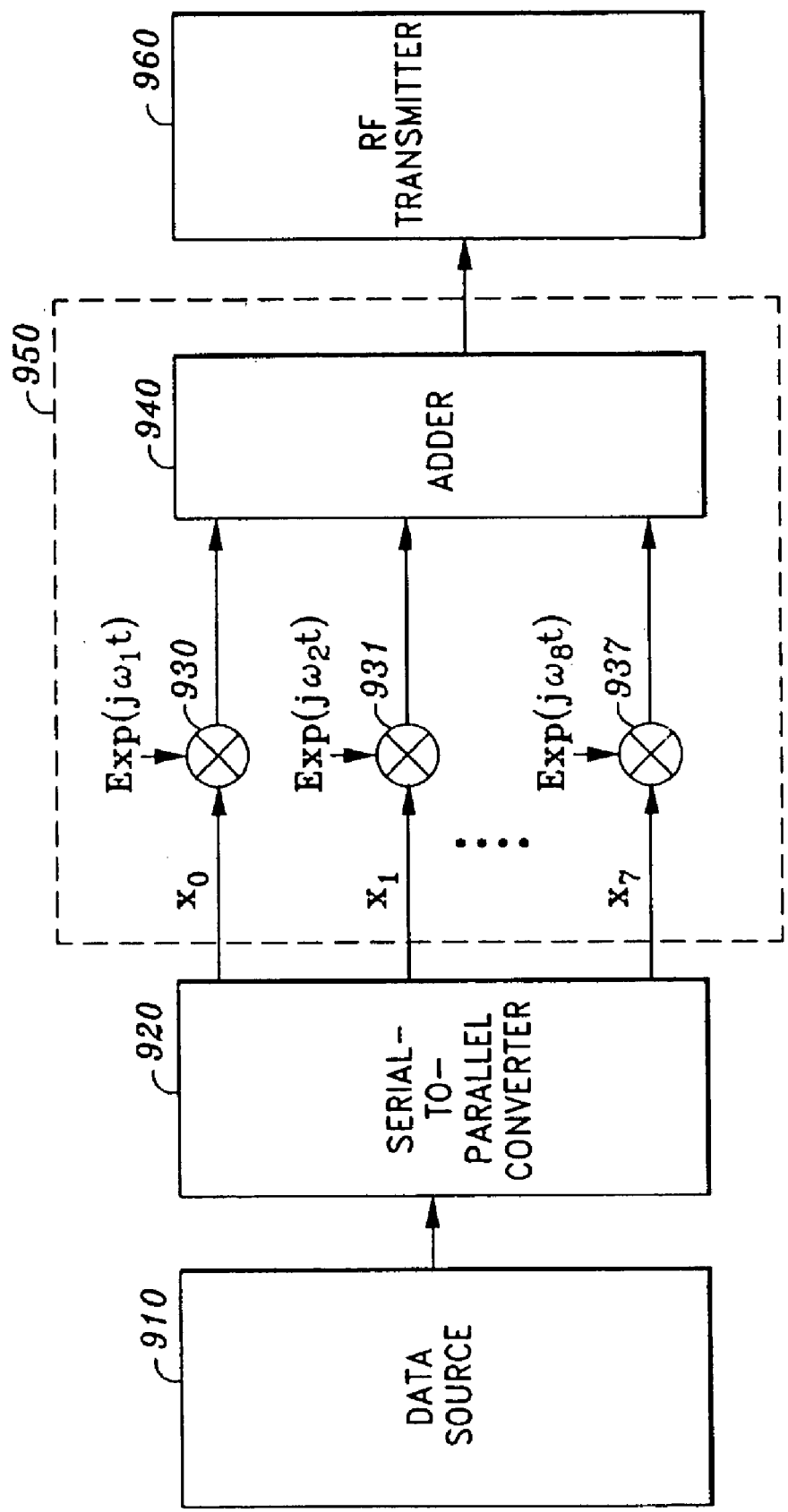
FIG. 1 depicts the block diagram of a standard system of transmission by multicarrier modulation.
Figure 2:
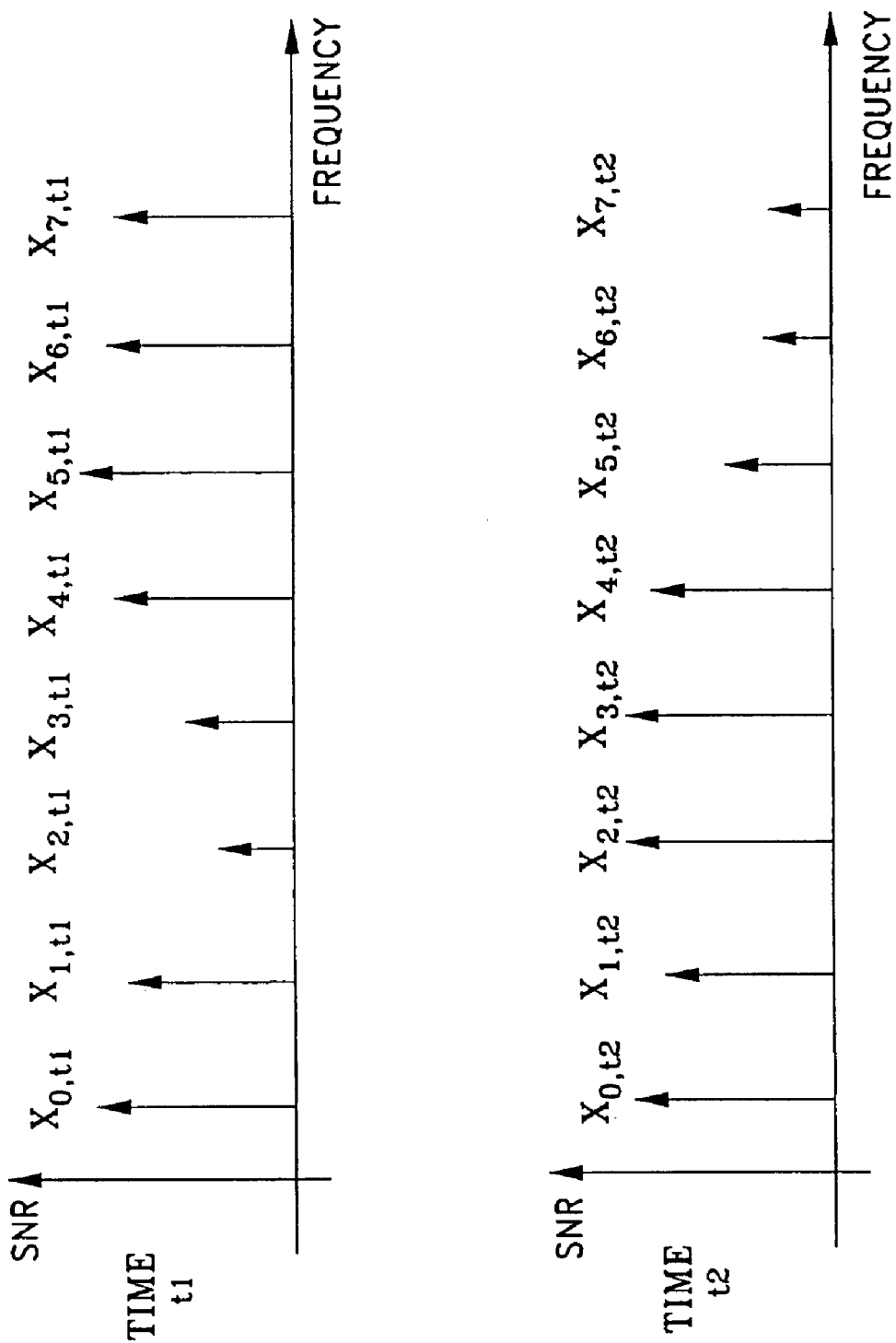
FIG. 2 illustrates symbolically the transmission quality of each subcarrier in an example of transmission by a standard multicarrier system.

In the example below, use will be made of a matrix which can be decomposed according to the Cooley-Tuckey algorithm, which provides a simple explanation of the methodology.

Prior to the description of the invention, a few matters relating to the conventional method of calculating a discrete Fourier transform, with examples to base 4, will be stated here.

A discrete Fourier transform can be represented by the multiplication of a complex vector U by a matrix, which corresponds well to the obtaining of a series of linear combinations of the components of the initial complex vector.

If $W=\exp(-j2\pi/n)$, with n the number of components of the complex vector of the discrete Fourier transform (DFT), j the root of $-1$, then the DFT operation can be represented by the equation:

$$\begin{bmatrix} X_0 \\ X_1 \\ X_2 \\ \ldots \\ X_{n-1} \end{bmatrix} = \frac{1}{\sqrt{n}} \begin{bmatrix} 1 & 1 & 1 & \ldots & 1 \\ 1 & W & W^2 & \ldots & W^{n-1} \\ 1 & W^2 & W^4 & \ldots & W^{2(n-1)} \\ \ldots & \ldots & \ldots & \ldots & \ldots \\ 1 & W^{(n-1)} & W^{2(n-1)} & \ldots & W^{(n-1)(n-1)} \end{bmatrix} \begin{bmatrix} x_0 \\ x_1 \\ x_2 \\ \ldots \\ x_{n-1} \end{bmatrix}.$$

In general terms the so-called nth order Fourier matrix is defined by the matrix:

$$M = 1/\sqrt{n} \begin{bmatrix} 1 & 1 & 1 & \ldots & 1 \\ 1 & W & W^2 & \ldots & W^{n-1} \\ 1 & W^2 & W^4 & \ldots & W^{2(n-1)} \\ \ldots & \ldots & \ldots & \ldots & \ldots \\ 1 & W^{(n-1)} & W^{2(n-1)} & \ldots & W^{(n-1)(n-1)} \end{bmatrix}$$

The inverse Fourier transform is obtained by replacing W by $W'=\exp(j2\pi/n)$.

If n is a power of 4, this transform can be divided into four groups of four multiplications of a vector by a matrix in accordance with the following form (according to the Cooley-Tuckey algorithm):

$$\sqrt{n} \begin{bmatrix} X_{0+K*n/4} \\ X_{1+K*n/4} \\ X_{2+K*n/4} \\ \ldots \\ X_{n/4-1+K*n/4} \end{bmatrix} =$$

$$a_k D_0 T \begin{bmatrix} x_0 \\ x_4 \\ x_8 \\ \ldots \\ x_{4(n/4-1)} \end{bmatrix} + b_k D_1 T \begin{bmatrix} x_1 \\ x_5 \\ x_9 \\ \ldots \\ x_{n-3} \end{bmatrix} + c_k D_2 T \begin{bmatrix} x_2 \\ x_6 \\ x_{10} \\ \ldots \\ x_{n-2} \end{bmatrix} + d_k D_3 T \begin{bmatrix} x_3 \\ x_7 \\ x_{11} \\ \ldots \\ x_{n-1} \end{bmatrix}$$

for k=1, 2, 3;

with the coefficients $a_k$, $b_k$, $c_k$, $d_k$ equal to the coefficients of the 4th dimension Fourier matrix, that is to say $$\begin{bmatrix} a_0 & b_0 & c_0 & d_0 \\ a_1 & b_1 & c_1 & d_1 \\ a_2 & b_2 & c_2 & d_2 \\ a_3 & b_3 & c_3 & d_3 \end{bmatrix} = \begin{bmatrix} 1 & 1 & 1 & 1 \\ 1 & -j & -1 & j \\ 1 & -1 & 1 & -1 \\ 1 & j & -1 & -j \end{bmatrix},$$

T is the Fourier matrix of dimension n/4 and $D_0$, $D_1$, $D_2$, $D_3$ are diagonal matrices consisting of elements $W^{il}$ with $0 \leq I \leq n/4-1$, in accordance with the form:

$$Di = \begin{bmatrix} W^0 & 0 & \cdots & 0 \\ 0 & W^i & \cdots & 0 \\ \cdots & \cdots & \cdots & 0 \\ 0 & 0 & 0 & W^{(n/4-1)i} \end{bmatrix}, \text{ and } D_0 \text{ being an idenity matrix.}$$

Consequently, if the components of a complex vector to be transmitted, associated with the data of a sequence of data representing physical quantities, are taken from an alphabet $\{1+j, 1-j, -1-j, -1+j\}$, no multiplications in the operations are performed when complex symbols are transmitted by the OFDM method, and only additions or changes of signs occur, simplifying simplifies the implementation of such a method.

Figure 3:
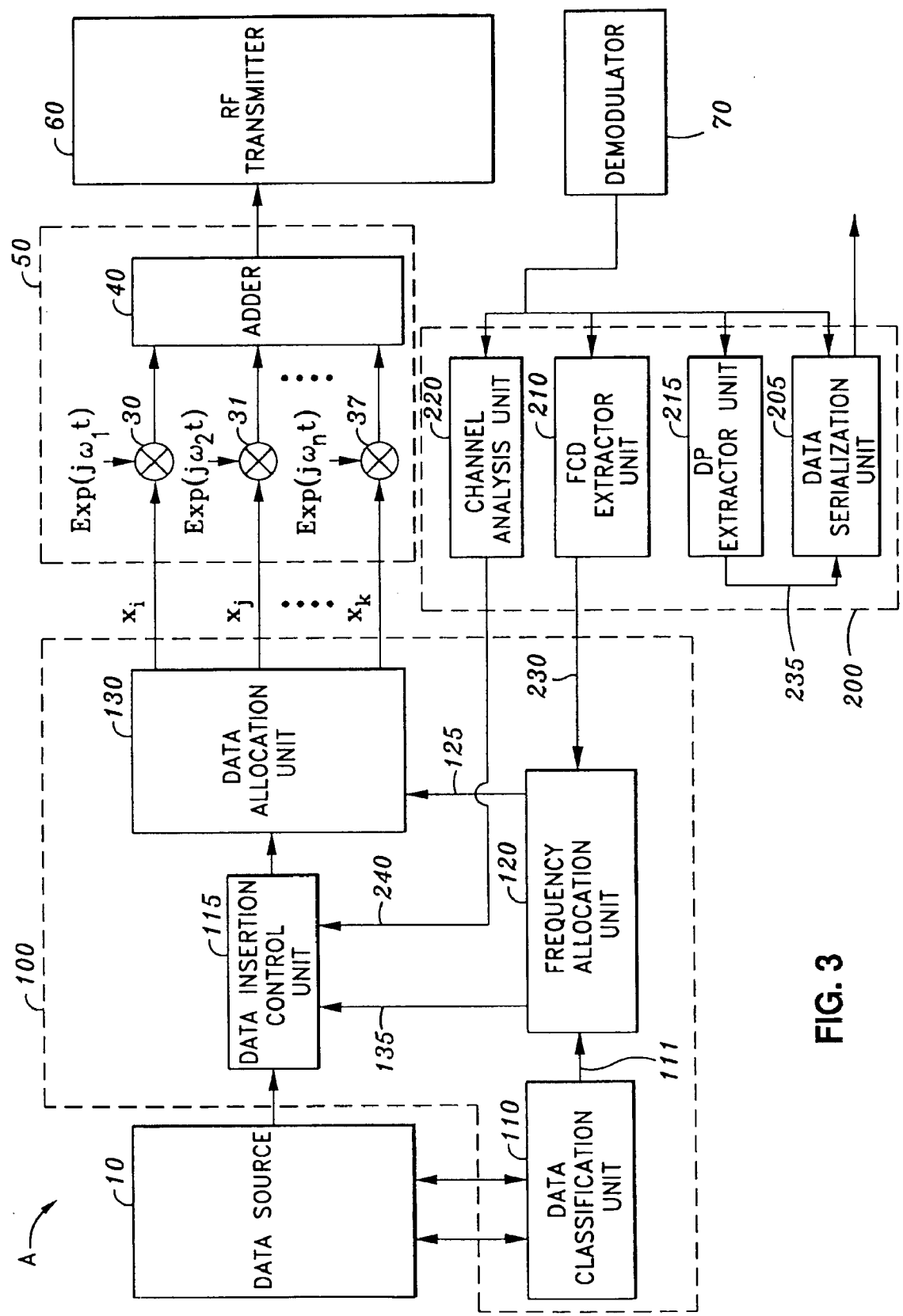
FIG. 3 is a block diagram of the device according to the invention, according to a presentation analogous to FIG. 1.

As can be seen in FIG. 3, which must be compared with FIG. 1 representing a standard multicarrier transmission system, there are found, in a device A according to a first implementation of the invention, a data source 10 and a multi-carrier modulator 50 which transmits the data to a radiofrequency (RE) transmitter 60. A demodulator 70 is inserted downstream of the RF transmitter 60 in order to process the signal received over the transmission channel, coming from another remote transceiver B (identical to device A), not shown in the figure.

The data source 10 generates a binary data stream which constitutes the signal to be transmitted.

The device according to the present invention has two parts which do not exist in conventional devices: a premodulator 100, inserted upstream of the multi-carrier modulator 50, instead of serial-to-parallel converter 920, and a post-demodulator 200, inserted downstream of the demodulator 70.

In summary, the premodulator 100 coordinates the different inputs of the modulator 50, according to each subcarrier, according to the significance and the transmission quality level of each subcarrier.

This premodulator 100 also inserts a signal 240 into the data, the signal representing the transmission quality observed on each subcarrier in the so-called "return" direction, also denoted B→A.

This premodulator 100 also inserts a signal 135 into the data, the signal representing the order of the data in the serial stream, denoted A→B.

The post-demodulator 200 effects on the one hand the analysis of the channel so as to supply the signal 240, and on the other hand extracts a signal 230 representing the transmission quality observed by a remote receiving device on each subcarrier in the so-called "outward," or A→B direction. The signal 230 is inserted by the premodulator 100 of the remote device situated at the other end of the channel, so as to control the premodulator 100 of the local device.

This post-demodulator 200 also extracts a DP signal 235 representing the order in which the different data to be transmitted were arranged at the input of the premodulator of the remote transmitter.

More precisely, the premodulator 100, includes a data allocation unit 130, a data insertion control unit 115, a data classification unit 110 and a frequency allocation unit 120.

The post-demodulator 200 includes a channel analysis unit 220, a frequency classification data extraction unit 210 ("FCD extractor unit 210"), a data position extractor unit 215 ("DP extractor 215") for extracting the signal representing the order of the data in the serial stream coordinated by the remote premodulator 100, and a data serialization unit 205 (also referred to as a serializer).

The electronic design detail of these parts results from the transmission method as disclosed here.

The channel analysis unit 220 analyzes the transmission channel, for example by evaluating different characteristics of known pilot signals inserted by the remote device B (situated at the other end of the transmission channel). There are several analysis techniques (pilot signals at fixed frequencies, at frequencies sliding in time, etc) known to persons skilled in the art.

The result of this analysis constitutes the signal 240. This is supplied to the data insertion control unit 115, which inserts signal 240 into the data stream to be transmitted, so as to inform the remote device B of the behaviour of this transmission channel. This signal 240 therefore represents the characteristics of the channel in the B→A direction, as observed by the local device A.

The FCD extractor unit 210 extracts, from the data received and demodulated by the demodulator 70, an FCD signal 230, a signal generated and inserted by the channel analysis unit 220 and data insertion control unit 115 of the remote device B. This FCD signal 230 represents the characteristics of the channel in the direction A→B, as observed by the remote device B.

The "DP extractor unit 215 extracts, from the data received and demodulated by the demodulator 70, a signal 235, a signal generated and inserted by the frequency allocation unit 120 and data insertion control unit 115 of the remote device B. This signal 235 represents the order of the data in the serial stream, coordinated by the premodulator 100 of the remote device B. This signal 235 will be used by the data serialization unit 205 to transform the parallel stream of the received data into a serial stream identical to that presented to the premodulator 100 of the remote device B.

The data classification unit 110 generates a data significance (DS) signal 111 representing the significance of each data item supplied by the source. An example of generating a DS signal is given in FIG. 5.

The frequency allocation unit 120 selects the distribution of the data over the different subcarriers from the DS signal 111 and FCD signal 230, and optionally other parameters supplied by the user, and generates a data allocation command (DAC) signal 125 accordingly.

The frequency allocation unit 120 also supplies a data position (DP) signal 135 representing the order in which the data allocated to the different subcarriers is relative to each other in the serial stream coordinated by the premodulator 100. The DP signal 135 is used by the data insertion control unit 115, which inserts the DP signal 135 into the data to be transmitted so as to enable the data serialization unit 205 of the remote device B to correctly collate the data after transmission.

Different data-frequency allocation algorithms can be used. An example of a simple algorithm is given in FIG. 6.

The DAC signal 125 is sent to the data allocation unit 130, which then switches each data item supplied by the data source 10 to the subcarrier chosen by the frequency allocation unit 120.

For a correct functioning of the invention, the data supplied to the data allocation unit 130, to the data insertion control unit 115 and to the frequency allocation unit 120 must be correctly phased. Techniques for correctly phasing data, such as the use of a delay line for delaying a signal, are known in the art. The complex signal coming from the modulator 50 is then transmitted to the RF transmitter 60 for sending via the channel to the remote device B.

Figure 4:
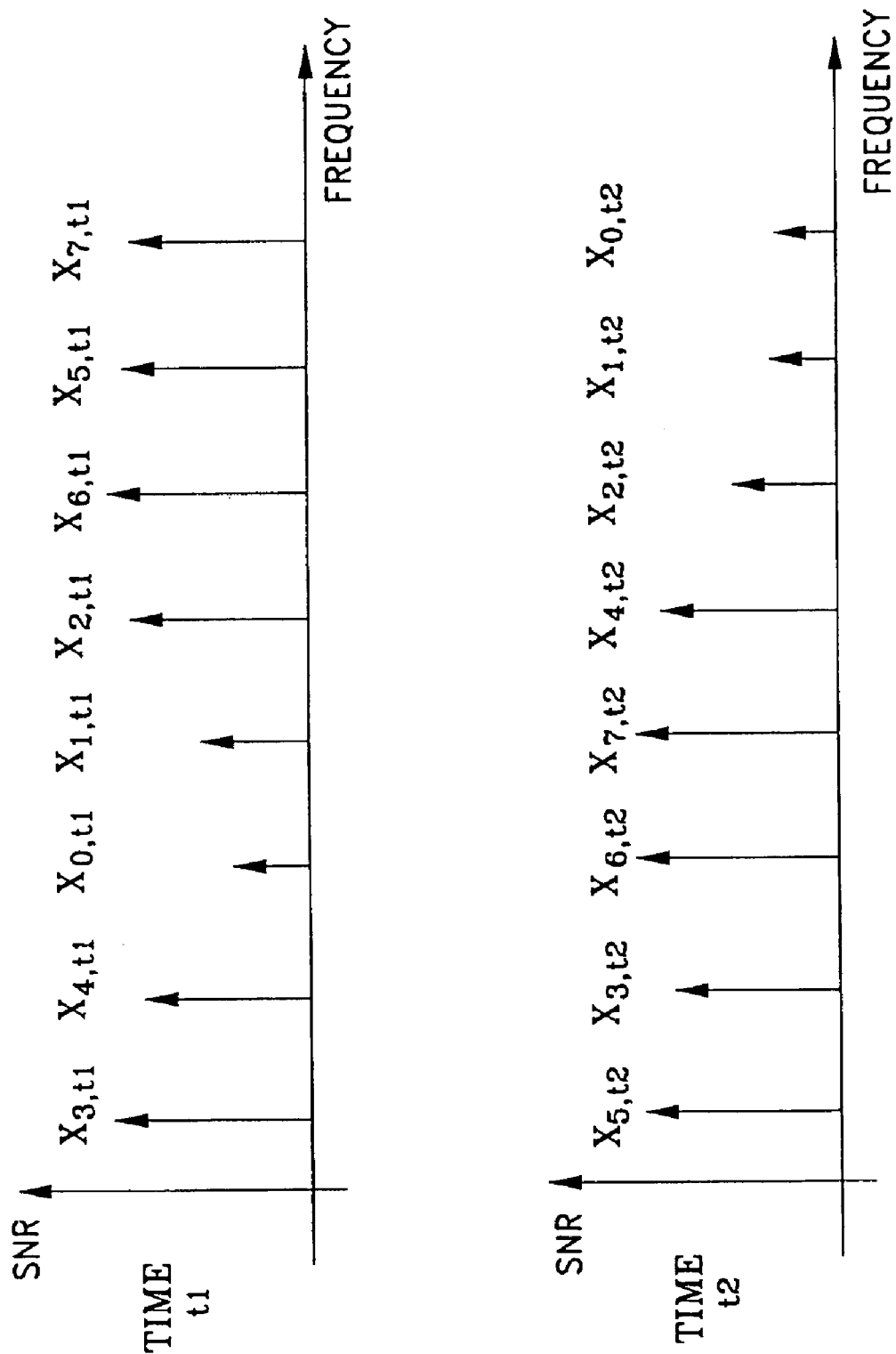
FIG. 4 illustrates the transmission quality of each subcarrier in an example of transmission by a system according to the invention, according to a presentation analogous to FIG. 2.

FIG. 4 then illustrates an example of the distribution of the symbols to be transmitted over the different subcarriers for two different times, Time=[[t=]] $t_1$ and Time=[[t=]] $t_2$, in the case of a multi-carrier transmission device according to the present invention.

The index of the data (0 to 7) corresponds to the order generated by the data source 10. The variations in characteristics of the channel are symbolized by the variation in size of the arrows representing the subcarriers (signal to noise ratio, which amounts for example to observing the attenuation of the channel at the frequency under consideration).

Assuming that the data are not of equal significance, and for example that the data with the highest index are the most significant, it can be seen that the significant data will be correctly transmitted at any time whatever the variations in the channel.

Figure 5:
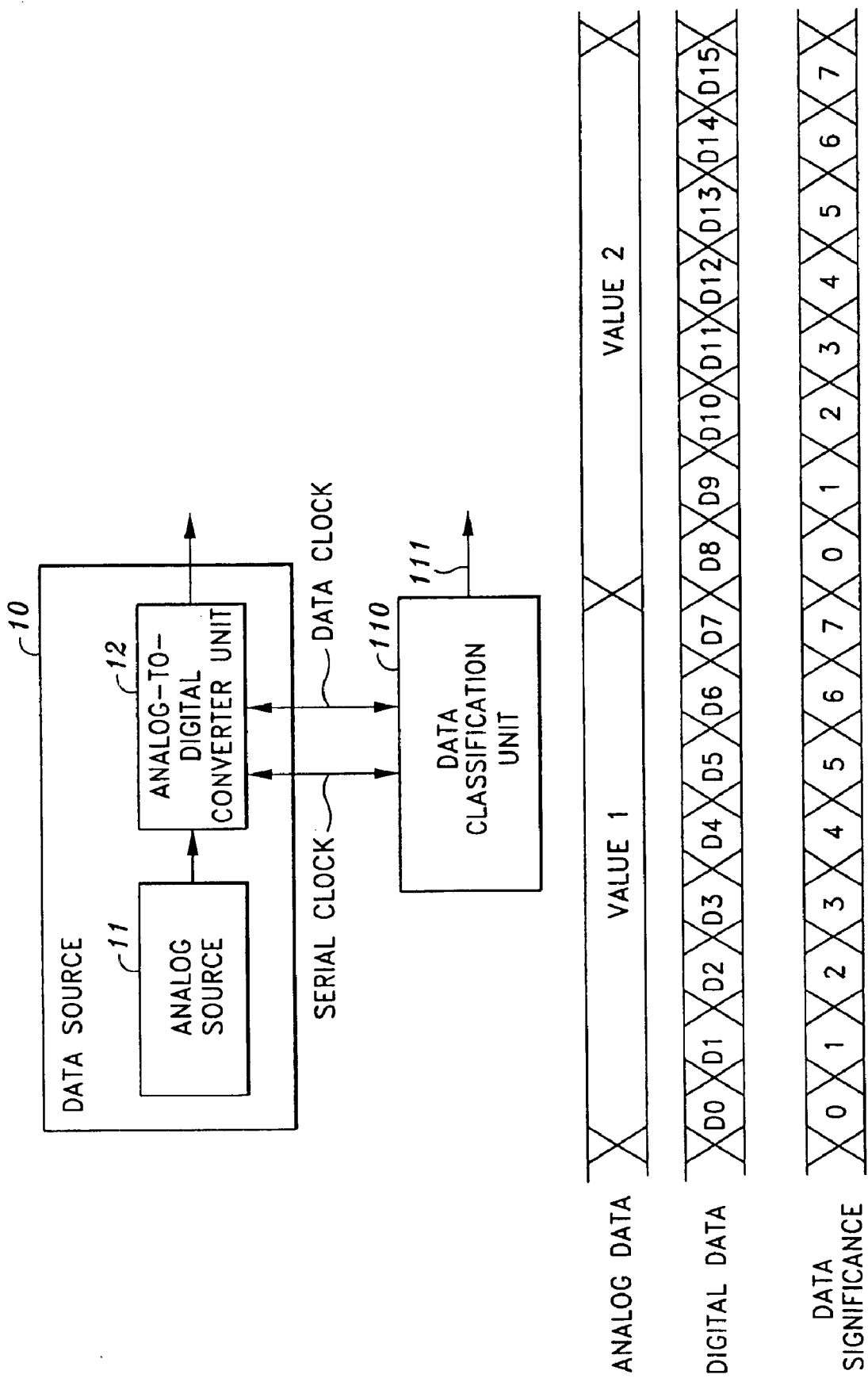
FIG. 5 illustrate an example of DS signal generation in the case of digitisation of an analog source.

FIG. 5 then illustrates an example of generation of a DS signal 111 by the data classification unit 110.

In this particular case, the data source 10 used comprises an analog source 11, digitized before transmission. An analog-to-digital converter (ADC) unit 12 for this purpose generates a continuous sequence of bits, each block of eight bits representing a analog value to be transmitted. By synchronising the analog-to-digital converter 12 and the data classification unit 110, it is possible to simply generate a DS signal 111 which will take a different value for each bit.

For example, if, in a set of bits D0 to D7supplied by the analog-to-digital converter unit 12, the first bit D7 is the most significant, it follows to assign the bit a maximum significance index, which in this example is an index of 7. The index of 6 is then made to correspond to the following, second most significant bit D6, the index 5 to the third most signficant bit D5 etc. This assignment can be achieved easily by using a 3-bit counter performing the data classification function. This counter will be incremented by the serial clock of the analog-to-digital converter unit 12, and initialized to 0 at each new analog data item.

Figure 6:
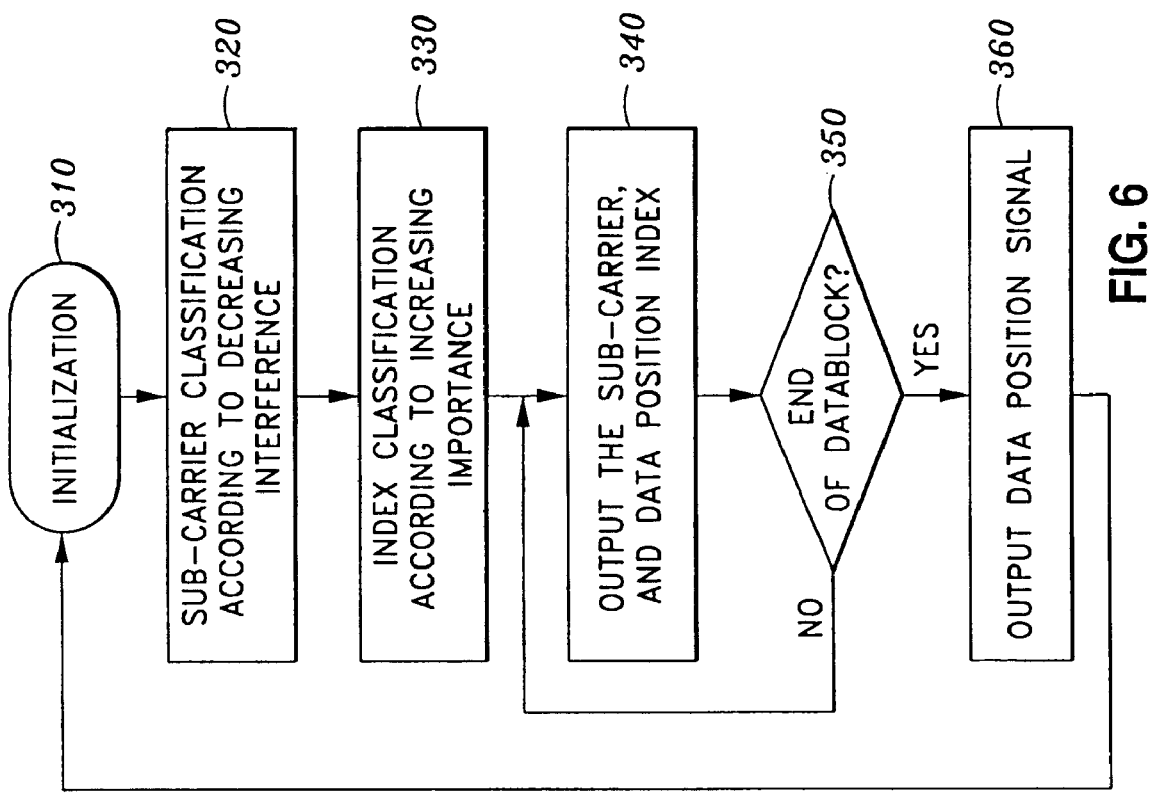
FIG. 6 shows an algorithm allocating the data to the different subcarriers.

FIG. 6 gives an example of an algorithm for allocating the data to the different subcarriers according to the level of interference measured on each subcarrier and the significance of the data. This algorithm is intended to be implemented by the frequency allocation unit 120.

During initialization (step 310), the device reads the information contained in the FCD signal 230 and DS signal 111 and stores them.

The subcarriers are classified in order of decreasing interference and a table containing this information is stored in memory (step 320).

The indices of the data to be transmitted are classified in order of increasing importance, using the information contained in the DS signal 111 (step 330). The result of this classification is also stored in memory.

The DAC signal 125 is transmitted to the data allocation unit 130, where the DAC signal 125 is composed of subcarrier-data index pairs (step 340).

After the outputting of each pair, a test is performed in order to check whether all the pairs have been supplied, since there are as many pairs as there are subcarriers (step 350). If not all pairs have been supplied, the next pair is supplied. If all pairs have been supplied, the process proceeds to the next step.

The DP signal 135 is transmitted to the data insertion control unit 115, which inserts it in the data to be transmitted (step 360).

Next, the process returns to initialization (step 310) in order to prepare to supply the next allocation table (DAC signal 125).

It should be noted that the FCD signal 230 can be updated at a slower rate than that of the data to be transmitted. In this case, step 320 does not have to be performed for each new data item, but only when the FCD signal 230 is refreshed.

In a preferred embodiment, if all data has the same relative significance level, the data position signal can be omitted. In this case, it would be sufficient to reclassify the data on reception knowing only the frequency classification order.

Figure 7:
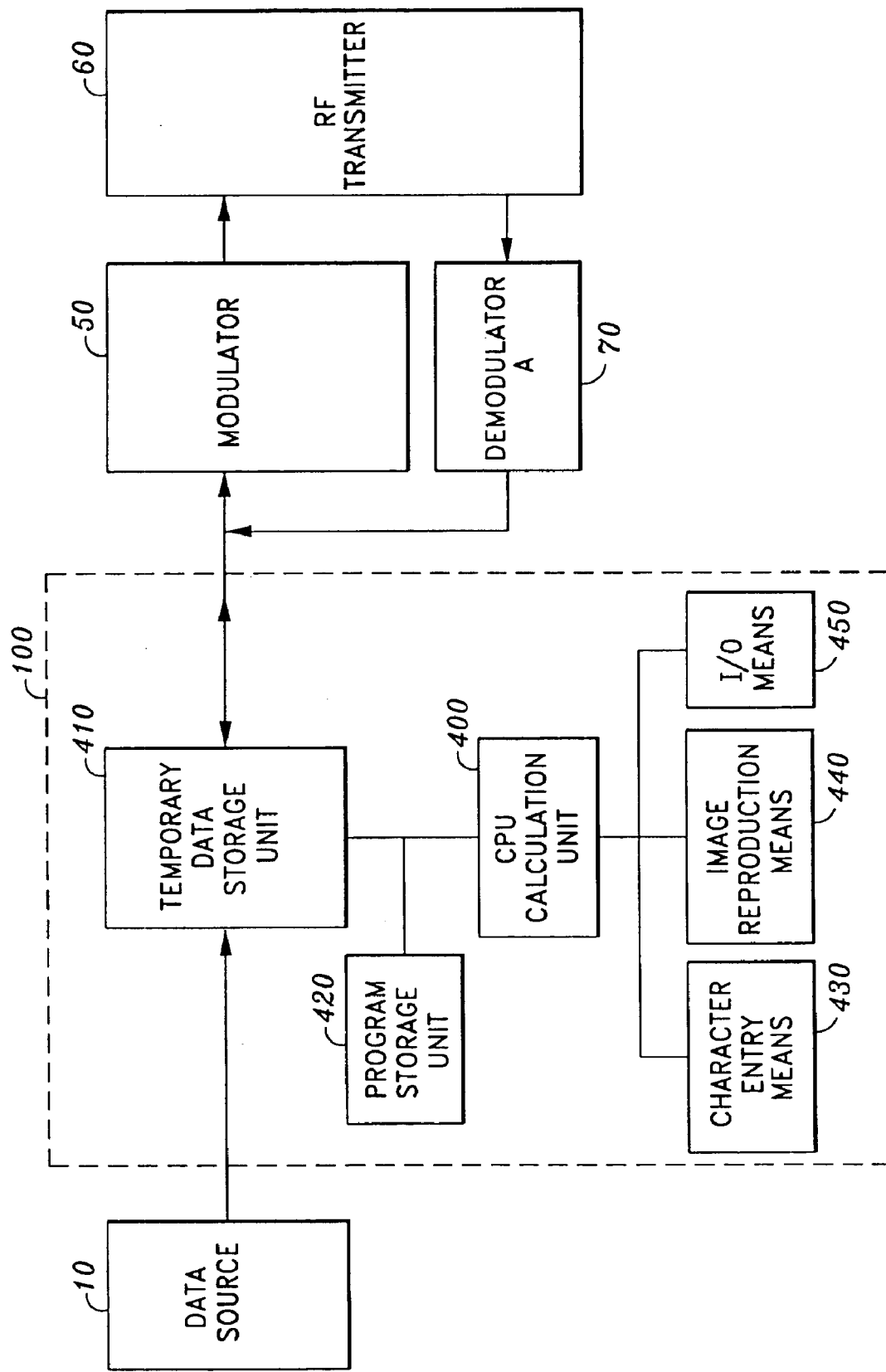
FIG. 7 shows the block diagram of a multicarrier transmission system including the calculation means necessary for implementing the data allocation algorithm of FIG. 6.

FIG. 7 depicts one embodiment the invention including a CPU calculation unit 400, a temporary data storage unit 410, a program storage unit 420, character entry means 430 such as a keyboard, image reproduction means 440 and input/output (I/P) means 450.

The algorithm described above can easily be integrated into this embodiment by a person skilled in the art, but other means of implementation are possible.

In a variant using a transmission by coaxial cable, the channel is "fixed", in that its quality does not vary over time, and it is therefore not necessary to make an estimation of the channel. Classification of the data can nevertheless make it possible to use the high frequencies which are most attenuated on this type of channel, then sending the data of less significance thereon.

It should be noted that the data source 10 can for example be an image compression system using progressive coding techniques such as coding in sub-bands, by fractals, by transform (discrete cosine transformation: DCT, wavelets), in video object, such as MPEG-4. These systems naturally produce signals of variable significance, and the data classification unit 110 can be operated accordance to these conditions.

Moreover, in an application of the invention with a view to another objective, it can be chosen to favour a saving in energy by using only the carriers with a very low noise level and therefore by transmitting at low power, even if it means reducing the transmission rate (since there are fewer subcarriers used simultaneously) and therefore taking a little longer to transmit the message. The transmission principle for all that remains substantially similar.

In the following description of a second aspect of the invention, detailed descriptions of the devices for reducing the peak-to-mean ratio, as well as of the conventional OFDM modulation devices, have been deliberately omitted.

By way of illustration, the preferred form of embodiment will be described in the case of a transmission of data representing an image and compressed with the so-called "sub-band" method, using algorithms for reducing the peaks by modifying the matrix of the FFT or by adding redundancy bits. One example of this algorithm is described in U.S. Pat. No. 5,636,247.

As a brief reminder, the method of compressing data by encoding in sub-bands enables the image for transmission to be iteratively divided into a number of hierarchically arranged blocks of data, known as sub-bands.

Upon the first iteration, four sub-bands of data are created : the first contains the low frequencies of the image, the second the horizontal high frequencies, the third the vertical high frequencies, and the fourth the diagonal high frequencies.

Each sub-band comprises four times less data than the original image.

Upon the second iteration, the first block is broken down into four new blocks containing the low frequencies, the horizontal high frequencies, the vertical high frequencies and the diagonal high frequencies relating to this block.

As the total number of data elements is constant at each iteration, one can proceed in this way until the expected result is obtained (insofar as there remain enough points to perform the operations).

This breaking down process (without losses) is followed by a quantization step (with losses) wherein the data present in each block is encoded with a quantization level that depends on the reference of the block and the desired compression rate.

Given the sensitivity of the human eye, which is more receptive to the low frequencies than to the high frequencies, it will be readily appreciated that the invention is perfectly applicable to the transmission of images compressed using this algorithm. Indeed, it directly supplies the information representative of the importance of each data element or block of data elements (deduced from the reference of the block to which it belongs).

The peak reducing algorithms chosen to illustrate this description of the invention are as follows:

1/ Reduction of the peak-to-mean ratio favoring the data rate: this algorithm consists in changing the coefficients of the Fourier matrix as a function of the input vector (set of data for transmission) in such a way that the output signal (called the OFDM symbol) has a peak-to-mean ratio as close as possible to 1.

Changing the coefficients of the matrix has the drawback of increasing sensitivity to noise, causing the bit error rate to deteriorate slightly.

2/ Reduction of the peak-to-mean ratio favoring the bit error rate: this algorithm consists in adding to the input vector supplementary data calculated in such a way that the output signal (called the OFDM symbol) has a peak-to-mean ratio as close as possible to 1. This algorithm is described in detail in U.S. Pat. No. 5,636,247.

This method, which in no way affects the modulation process, has the advantage of not causing the bit error rate of the transmission to deteriorate, but it reduces the efficiency of the transmission since it reduces its data rate.

Figure 8:
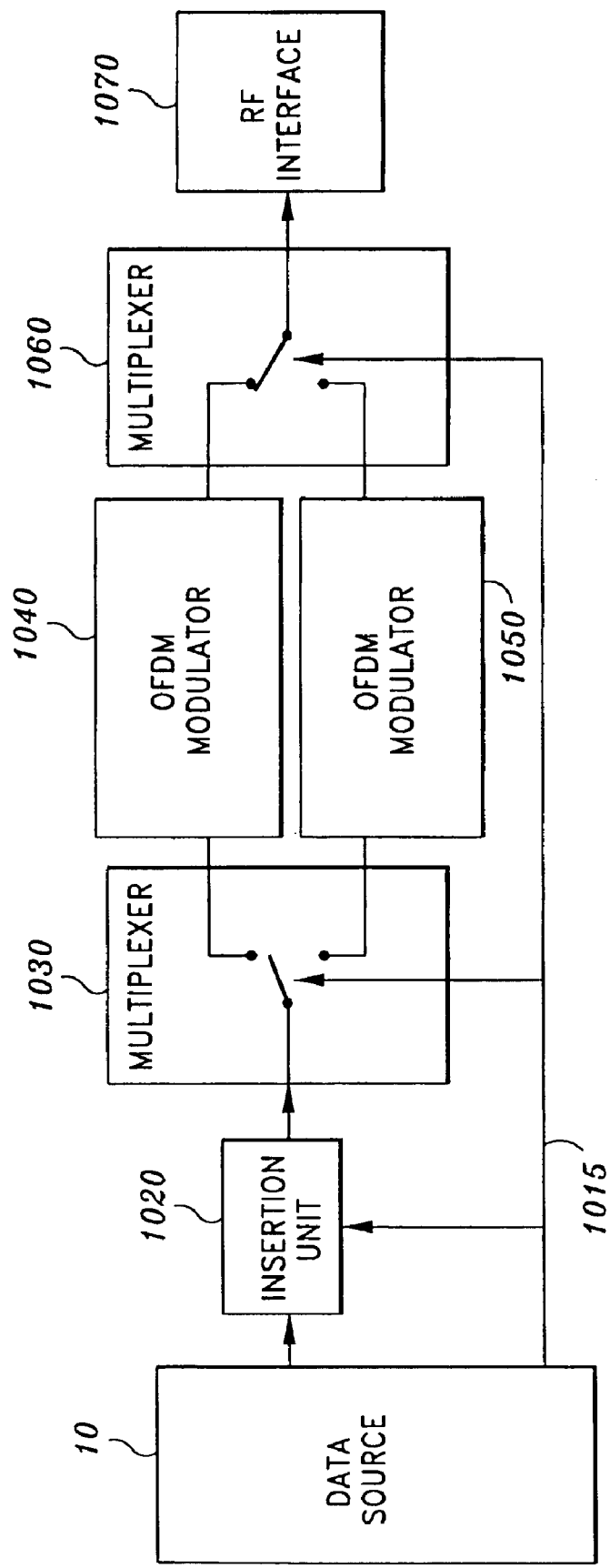
FIG. 8 is a block diagram of a transmission system including the invention.

FIG. 8 is a diagram showing an OFDM type transmitter designed according to the present invention.

A transmitter according to the invention comprises an OFDM modulator implementing a means for reducing the peak-to-mean ratio favoring a maximum data rate;

an OFDM modulator implementing a means for reducing the peak-to-mean ratio favoring a bit error rate;

a means for attributing a criterion of importance to the data for transmission if the latter is not classified by the source;

a means for inserting data into a stream of data; and a radiofrequency interface.

More precisely, a data source 10, supplies a block of data for transmission to an insertion unit 1020, responsible for inserting an item of information representative of the type of OFDM modulator chosen, from amongst the two OFDM modulators 1040 and 1050, which favor either the minimum bit error rate or the maximum data rate.

Data source 10 also provides a command signal 1015, the function of which is to indicate to the insertion unit 1020 what item of information is to be inserted (according to a classification of the data in terms of importance), and to control multiplexers 1030 and 1060 so as to use the chosen OFDM modulators 1040 and 1050.

The modulated signal is then transmitted to a radiofrequency interface 1070, of a conventional type.

OFDM modulators 1040 and 1050 are, respectively, a first OFDM modulator 1040 for reducing the peak-to-mean ratio favoring the minimum bit error rate (BER), and a second OFDM modulator 1050 for reducing the peak-to-mean ratio favoring the data rate.

Figure 9:
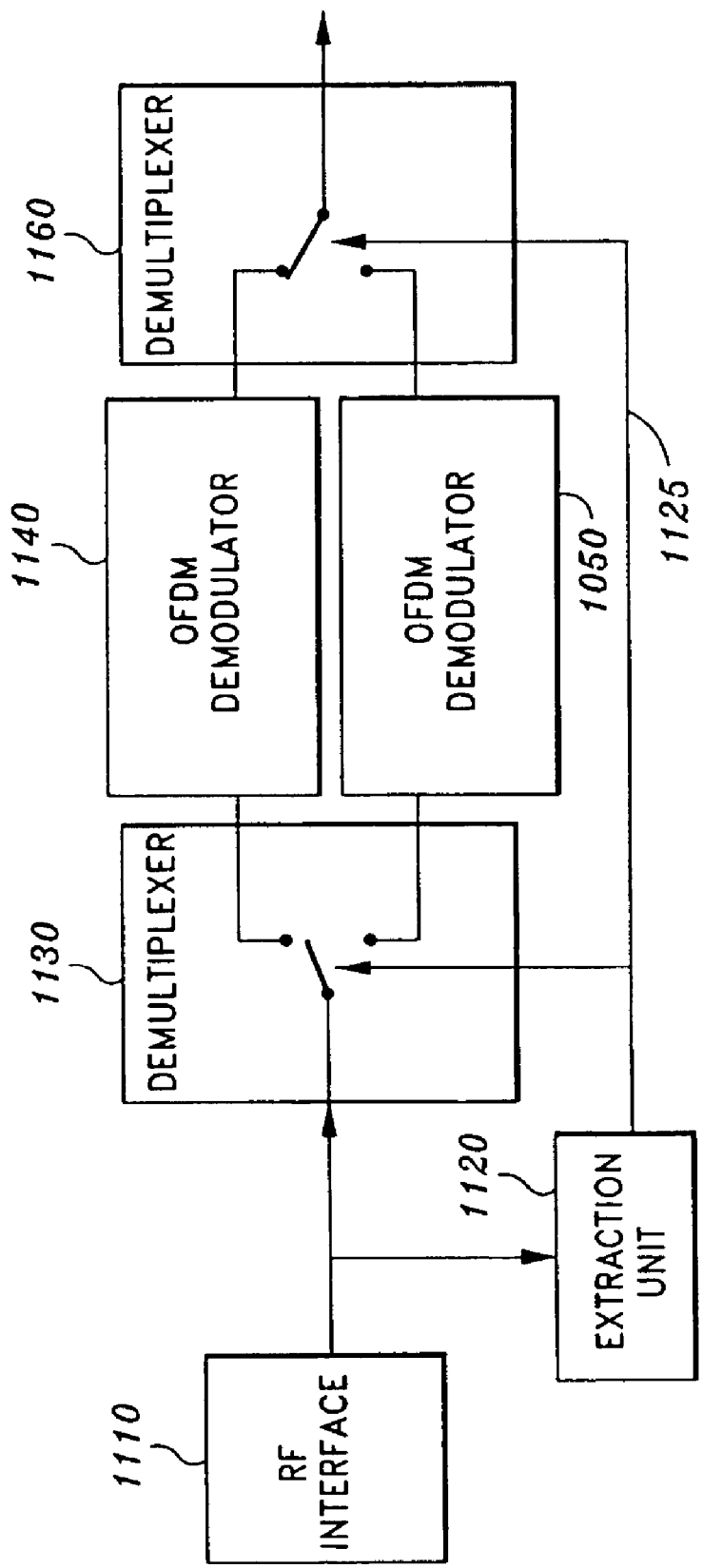
FIG. 9 is a block diagram of a reception system including the invention.

In a similar manner, FIG. 9 is a diagram of an OFDM type receiver implementing the invention.

A receiver according to the invention uses a demodulator adapted to take into account the system for reducing the peak-to-mean ratio favoring the data rate, a demodulator adapted to take into account the system for reducing the peak-to-mean ratio favoring the minimum bit error rate, and a means for extracting control data from the data received.

More precisely, the signal received by a radiofrequency interface 1110 is sent simultaneously to an extraction unit 1120, and to the input of demultiplexer 1130.

Extraction unit 1120 extracts an item of information representative of the type of modulator chosen from the received data and deduces therefrom the state of demultiplexers 1130 and 1160 (selection blocks of the demodulator) which it positions via a signal 1125.

OFDM demodulators 1140 and 1150 correspond, respectively to an OFDM demodulator 1140 for reducing the peak-to-mean ratio favoring the minimum bit error rate (BER) and an OFDM demodulator 1150 for reducing the peak-to-mean ratio favoring the data rate.

The item of information representative of the type of OFDM modulator chosen can take only a very limited number of states (two in the present non-limitative example). It is then clear that it can easily be transported on the control signals that are necessarily attached to the data for transmission.

In the example described here, advantage is taken of the synchronization data P, S of the OFDM symbols to transport it. Technical literature describes a host of proposals regarding synchronization.

In general, a known prefix P and a known suffix S are added to an OFDM symbol, on which a correlation is effected in a conventional type of correlator (not shown in the figures), or a cyclic prefix is used, such as repeating the information contained in one part of the message after a set period of time.

A delay line enables the delayed signal to be correlated with the incoming signal and a series of correlation peaks are obtained that enable a synchronization signal to be restored.

In the case of such a synchronization process, to transport an item of binary information, it suffices to change the sign of the data in prefix P (or in suffix S) in order to obtain an opposite line signal at the correlator output.

This signal is then the carrier of the synchronization information (through its frequency) and of the information on the type of modulation (through its sign).

FIG. 10 illustrates such an example of insertion of the item of information representative of the type of modulator chosen in synchronization sequences (in the case of the preferred method described above).

Figure 10A:
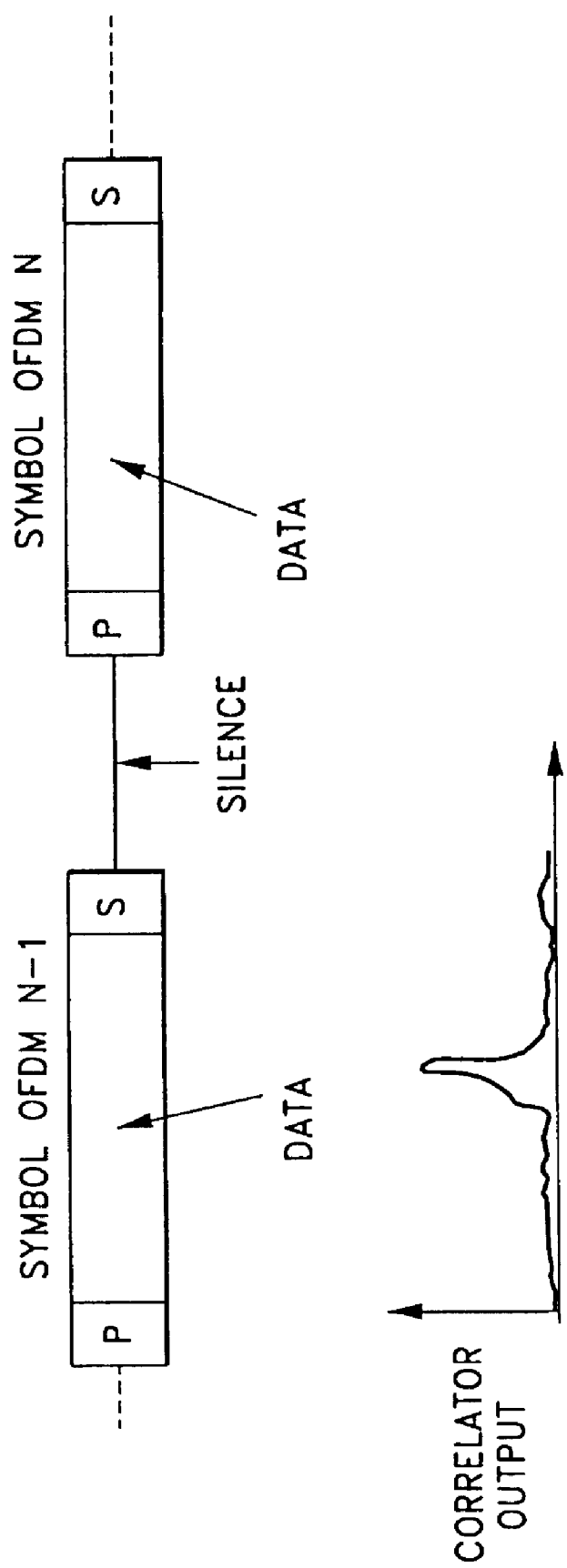
FIG. 10 illustrates an exemplary process for inserting the information representative of the type of modulator used.

FIG. 10A represent the signals transmitted in the event of the first OFDM modulator 1040, which favors the minimum bit rate, is chosen. In this case, the data sequences are transmitted in packets (each one corresponding to an OFDM symbol) each comprising a prefix P and a suffix S, forming a synchronization sequence. The data packets are separated by a silence (corresponding to a guard time) at the time of transmission.

The data inserted into prefixes P and suffixes S is chosen in such a way as to generate a positive signal at the correlator output.

Figure 10B:
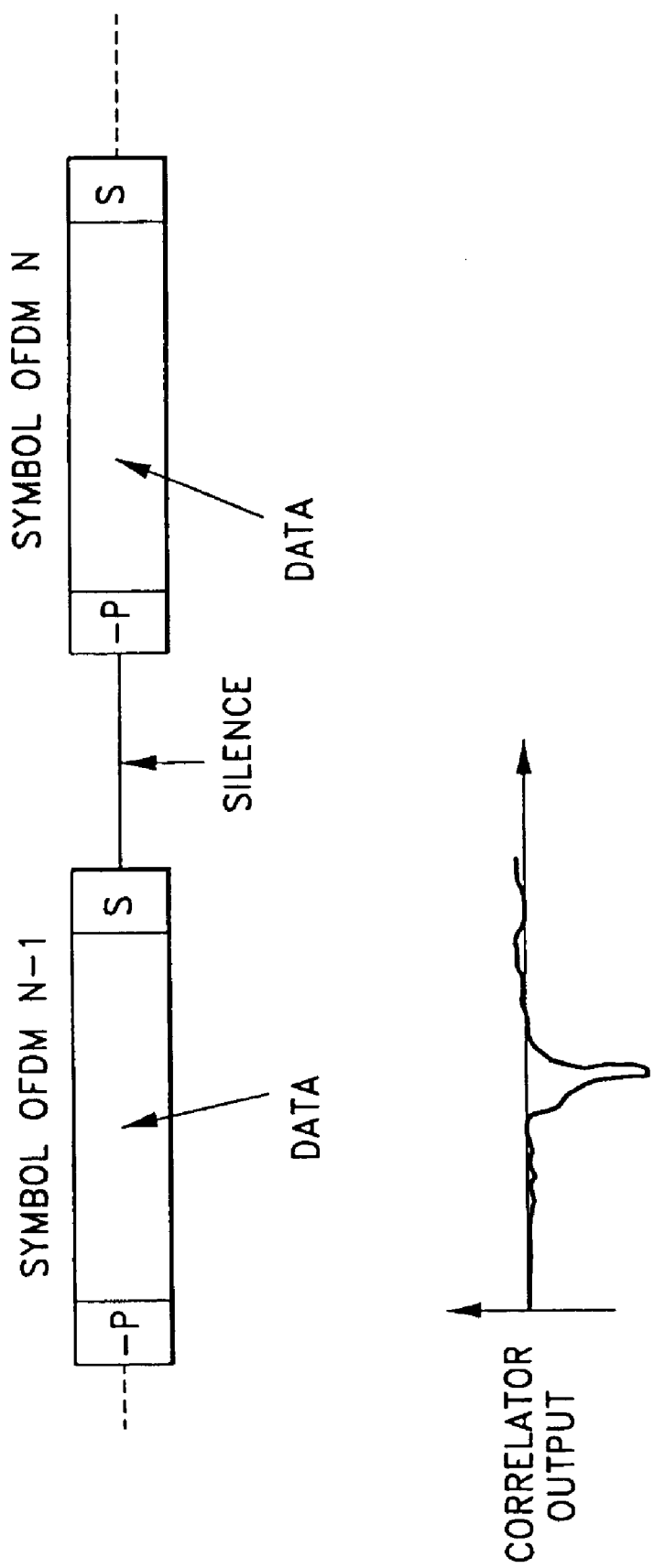

FIG. 10B represent the signals transmitted in the event of the second OFDM modulator 1050, which favors the maximum data rate, is chosen. In this case, the data inserted into prefixes P and suffixes S is chosen in such a way a to generate a negative signal at the correlator output (replacement of the P sequence by the opposite sequence). In this way, a means of identifying the choice of OFDM modulator is easily obtained.

FIG. 11 illustrates a means of producing the transmitter according to the invention including a CPU 400, a data storing unit 410, such as a Random Access Memory (RAM), a program storage unit, 420, character acquisition means 430, such as a keyboard, image restoring means, 440, such as a screen, and input/output (I/O) means 450.

The data storing unit 410 serves as a relay for the data for transmission or reception. It will also be noted that the vectors resulting from the modulation and demodulation operations are also resident in the data storing unit 410, as is the received data placed in the form of vectors prior to and after their transformation by the Fourier transform.

Figure 12:
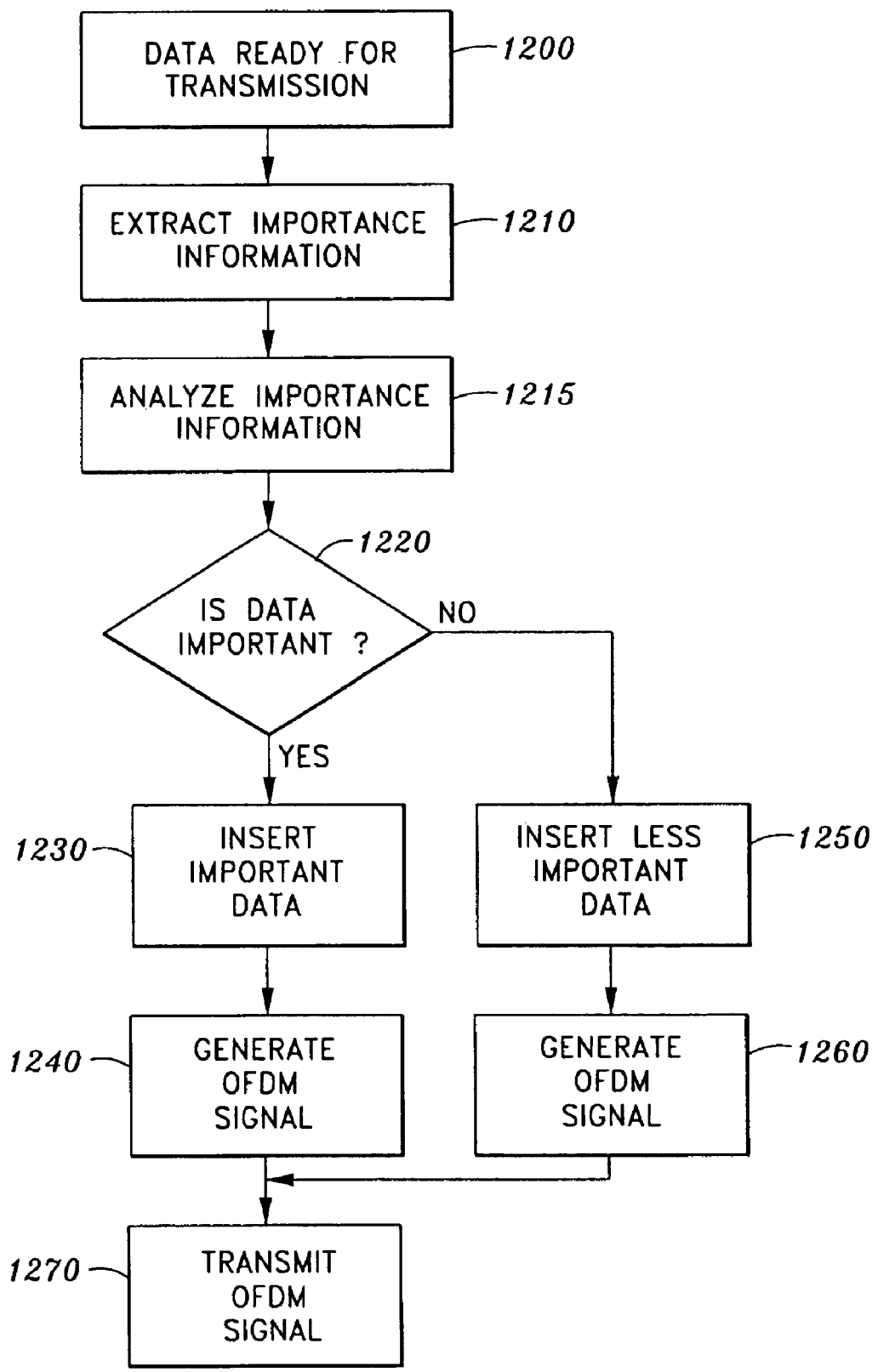
FIG. 12 shows an algorithm of the transmission process according to the invention, executed by the computer.

FIG. 12 shows an algorithm implementing the present invention in an OFDM transmitter. When a new succession of data is ready for transmission (step 1200), the importance information (signal 1015) that is associated therewith is extracted (step 1210) and analyzed (step 1215).

If the data element is considered to be highly significant (step 1220), the <<Most Significant Data>> item of information is inserted (step 1230) and the algorithm is applied that generates an OFDM signal after the addition of redundancy bits that reduce the peak value of the signal (step 1240), favoring the minimum bit error rate.

If the data is considered to be less significant, the <<Least Significant Data>> item of information is inserted (step 1250) and the algorithm is applied that generates an OFDM symbol using an inverse fast Fourier transform matrix modified so as to reduce the peak value of the signal (step 1260), favoring the maximum data rate.

Once the OFDM symbol has been generated, it is transmitted conventionally via the RF interface (step 1270).

To summarize, the mode of operation for transmission is as follows : when the transmitter receives a block of data for transmission, it analyzes its importance (either by reading the item of information added by the source or by identifying the source, or by any other means) and decides on the type of OFDM modulator to use.

If the data is classified as of prime importance (in our example, low frequency image), the system chooses the first OFDM modulator 1040, ensuring the minimum bit error rate.

If the data is classified as of lesser importance (in our example, high frequency images), the system chooses the second OFDM modulator 1050, ensuring the maximum data rate.

In both cases, after making this choice, the system inserts an item of information via insertion unit 1020 to indicate to the receiver which of OFDM demodulators 1140 and 1150 to use and controls multiplexers 1030 and 1060 in such a way that the data undergoes the chosen modulation. One example of a module for inserting this item of information is described more fully below.

Figure 13:
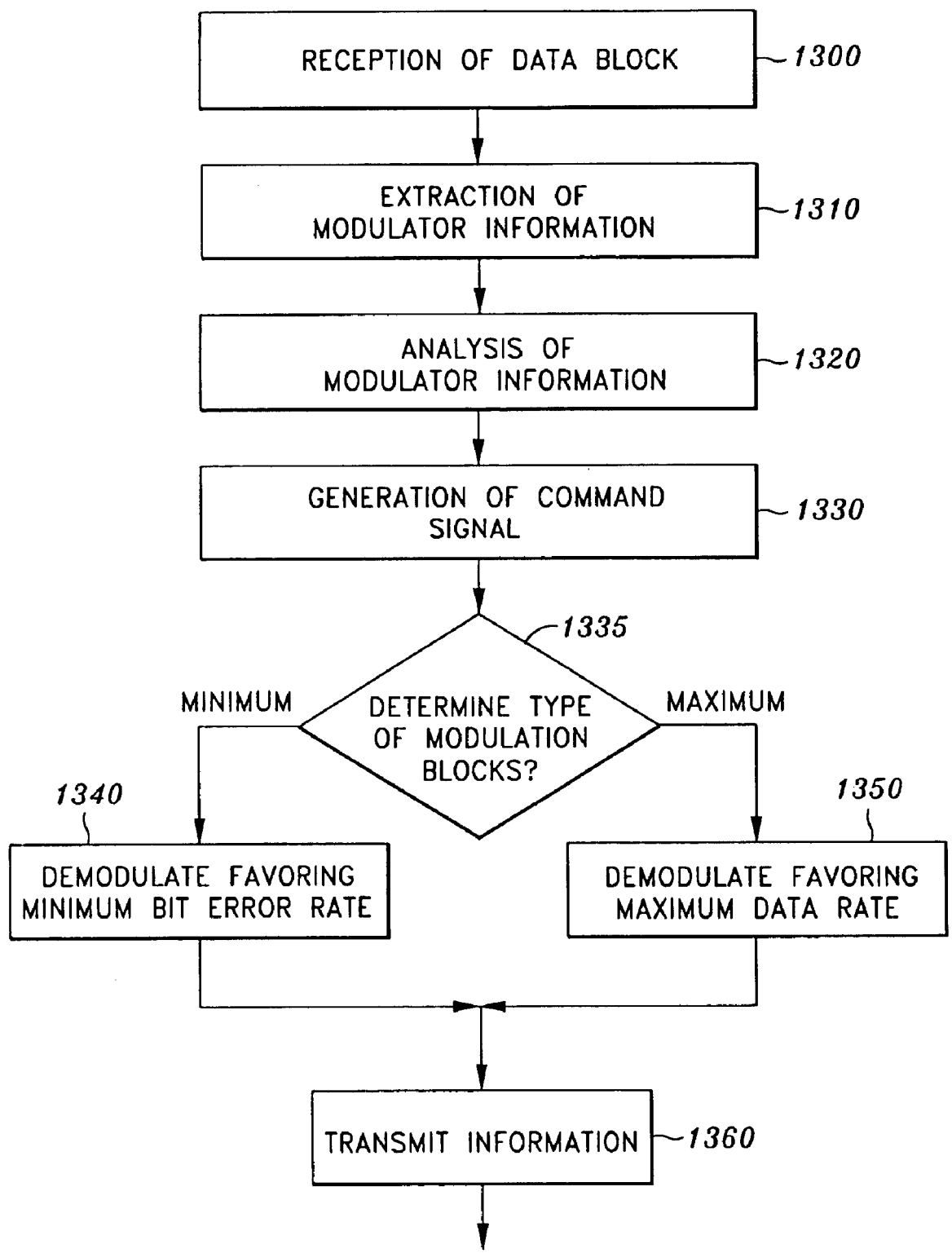
FIG. 13 shows an algorithm of the reception process according to the invention.

In reception, shown in FIG. 13, when the receiver receives a data block via RF interface 1110 (step 1300), it first extracts therefrom, in extraction unit 1120 the item of information representative of the type of modulator used (step 1310), analyzes the item of information (step 1320) and generates a command signal 1125, (step 1330) representative of the type of modulation to be applied. The demultiplexers 1130 and 1160 are positioned in such a way that the data received undergoes the appropriate demodulation (steps 1340 and 1350). The demodulated information is finally transmitted to its destination (step 1360).

It should be noted that, to simplify presentation, two separate modulators and two separate demodulators are shown here. In practice, however, it is more advisable to use the common components, such as IFFT, serial-to-parallel conversion, FFT, only once, and to switch the components specific to each peak-to-mean ratio reduction process.

All the steps described above can be implemented using software or hardware means.

The choice of one or the other is made on the basis of considerations connected with the bit rate to be obtained. Execution by a software means has been more explicitly described with reference to FIG. 12. Although the invention has been described in the simple case of using two processes for reducing the peak-to-mean ratio, it is obvious that the present invention can extend to the use of any number n of types of processing by using higher levels of data classification and a more complex system for encoding the information representative of the <<type of modulator>>.

In another embodiment, it is possible for the series of instructions forming the program not to be resident in a ROM but placed in a RAM, and then executed. The above described algorithm can easily be integrated in this embodiment by a man of the art, but other forms of embodiment can be contemplated.

It should be noted that data source 10 can, for example, be an image compression system using progressive encoding techniques such as encoding in sub-bands, with fractals, or with a discrete cosine transform (DCT, wavelets, video object (MPEG4) ; as these systems naturally produce signals of varying importance, the data classification unit can simply amount to an encoding of this level of importance.

Figure 14:
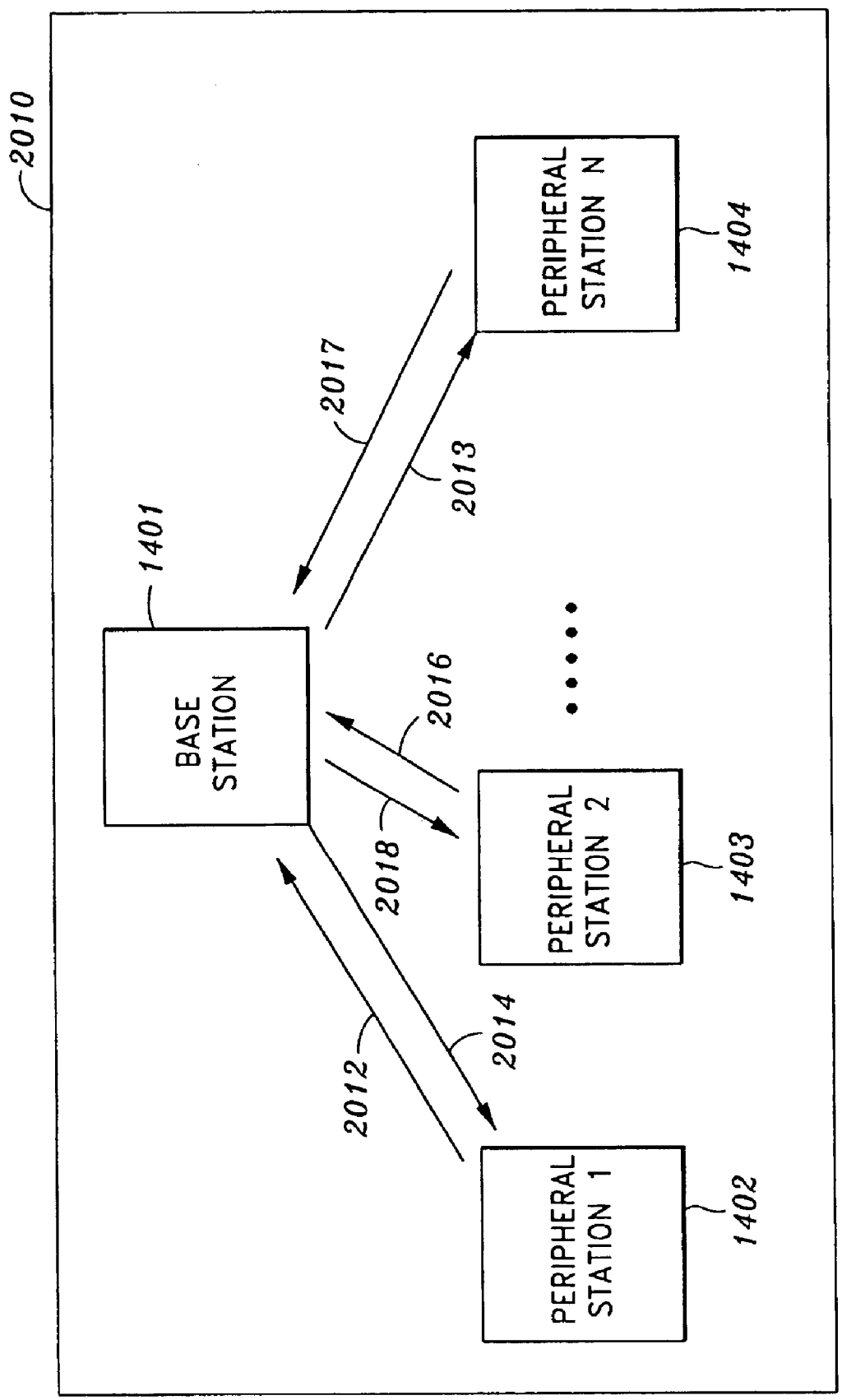
FIG. 14 is a general view of a network according to the invention including a base station SIB and several peripheral stations SPi.

As depicted in FIG. 14 and designated by the general reference denoted 2010, a network according to the invention consists of a base station 1401 and peripheral stations 1402, 1403 and 1404, where peripheral station 1404 represents an Nth number peripheral station.

These peripheral stations 1402, 1403 and 1404 are distant from the base station 1401, each connected to it by radio link and able to move with respect to it.

The base station 1401 communicates with the peripheral station 1401 by means of the incoming radio link 2012 and the outgoing radio link 2014, with the peripheral station 1403 by means of the incoming radio link 2016 and the outgoing radio link 2018 and with the peripheral station 1404 by means of the incoming radio link 2017 and the outgoing radio link 2013.

The transmissions 2012, 2014, 2016, 2018, 2013 and 2017 are effected by means of radio interfaces installed in each station and communication channels allocated to these transmissions.

Figure 15:
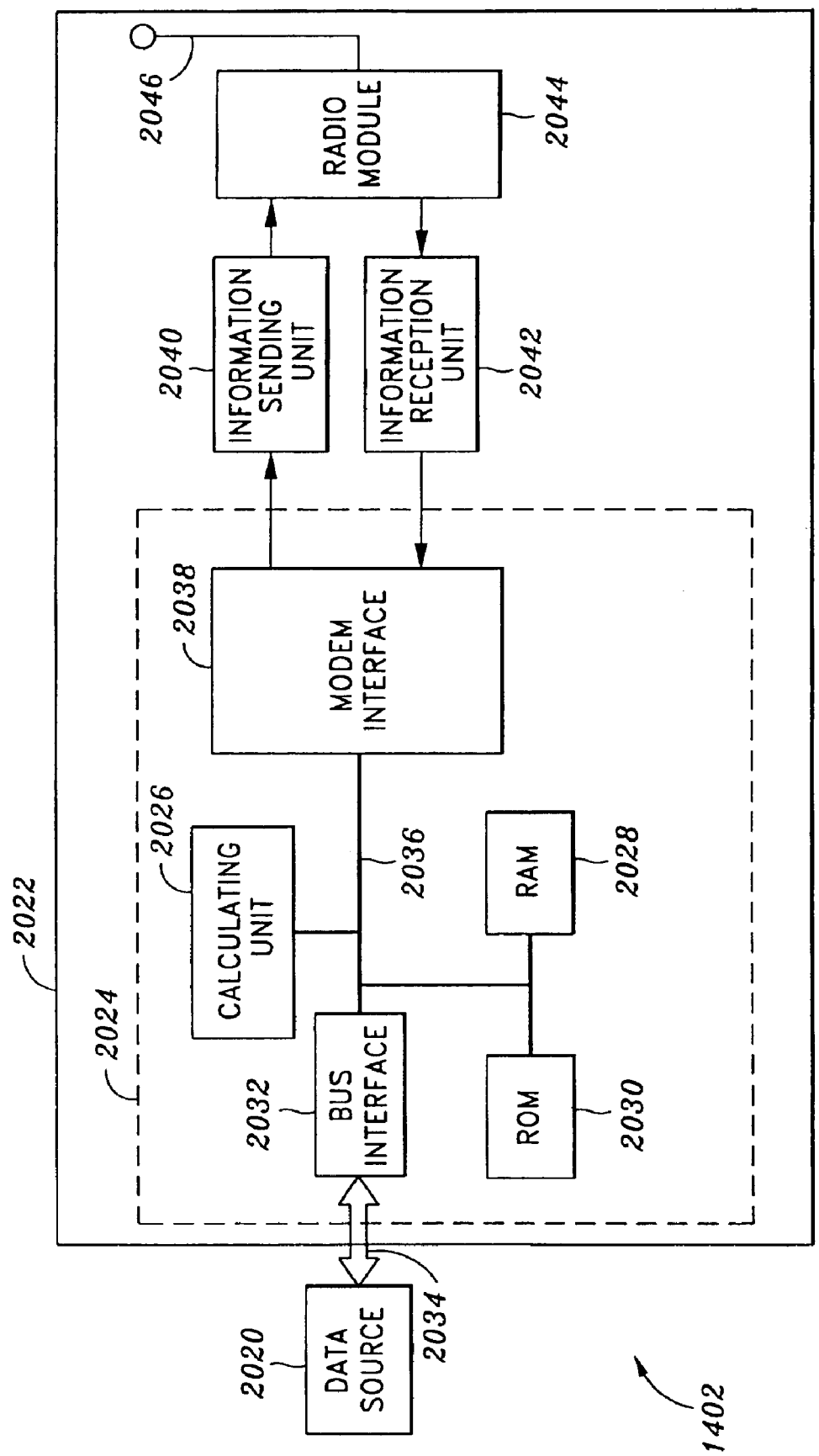
FIG. 15 is a schematic view of a peripheral station $SP_1$ according to a first embodiment of the invention.

The block diagram of FIG. 15 depicts a more detailed view of a first embodiment of a peripheral station, for example of the station 1402, which comprises a data source 2020 and a communication device 2022.

In general terms, the communication device 2022 is a device for sending and receiving information according to the present invention.

This information is intended to be transmitted over a radio communication channel, in the form of carriers modulated by said information.

The data source 2020 is for example a digital camera, a computer, a printer, a server, a facsimile machine, a scanner, a digital camera, a digital photographic apparatus, a television, a video recorder or a decoder.

This communication device 2022 includes a data processing unit 2024 comprising a calculating unit 2026, a RAM 2028, a ROM 2030, a bus interface 2032 and a bus 2034 which connects the data source 2020 to said interface.

The communication device 2022 comprises a bus 2036 serving the calculating unit 2026, the RAM 2028 and ROM 2030 and a modem interface 2038.

The communication device 2022 also has an information sending unit 2040 and an information reception unit 2042, as well as a radio module 2044 to which information sending unit 2040 and information reception unit 2042 are connected.

The radio module 2044 is equipped with a radio antenna 2046. The radio module 2044 and the radio antenna 2046 constitute on the one hand, with the information sending unit 2040, a means for sending data and on the other hand, with the information reception unit 2042, a means for receiving data.

Figure 16:
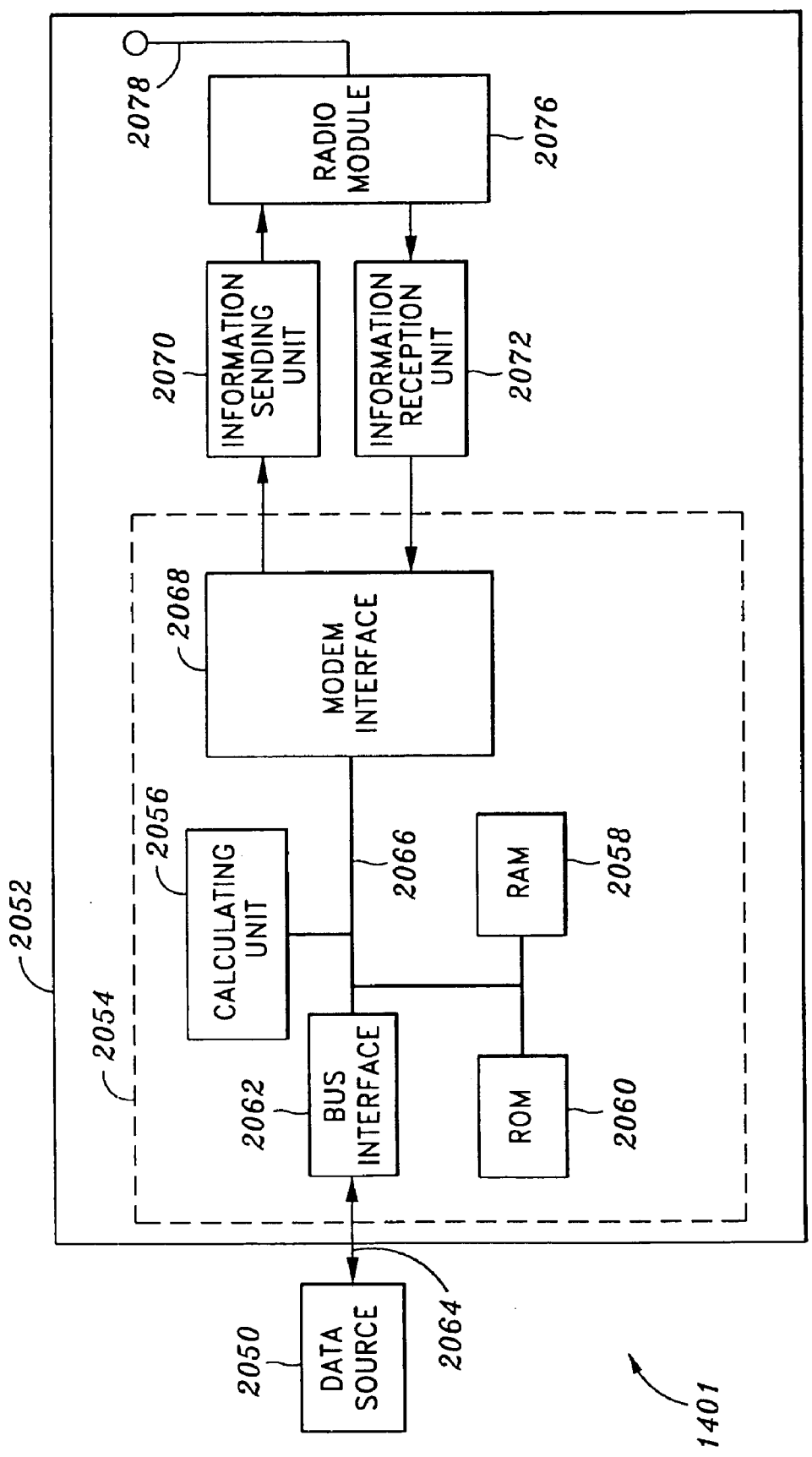
FIG. 16 is a schematic view of a base station SB according to a first embodiment of the invention.

For its part, the base station 1401 comprises, as depicted in FIG. 16, a data source 2050 and a communication device 2052 according to a first embodiment of the invention.

This communication device 2052 includes a data processing unit 2054 which comprises a calculating unit 2056, a RAM 2058, a ROM 2060, a bus interface 2062 and a bus 2064 which connects the data source 2050 with said bus interface 2062.

The communication device 2052 also includes a bus 2066 serving the calculating unit 2056, the RAM 2058 and ROM 2060 and modem interface 2068.

The communication device 2052 also includes an information sending unit 2070 and an information reception unit 2072, as well as a radio module 2076 to which the the information sending unit 2070 and the information reception unit 2072 are connected. The radio module and the antenna constitute on the one hand, with the information sending unit 2070, means for sending data and on the other hand, with the information reception unit 2072, means for receiving data.

The data source 2050 is for example a digital camera, a computer, a printer, a server, a facsimile machine, a scanner, a digital camera or a digital photographic apparatus, a television, a video recorder or a decoder.

The information sending unit 2070 and information reception unit 2072 are identical respectively to the information sending unit 2040 and to the information reception unit 2042 of the peripheral station 1402 of FIG. 15.

A description will now be given in more detail of the information sending unit 2040 and information reception unit 2072 with reference to FIGS. 17 to 23.

Figure 17:
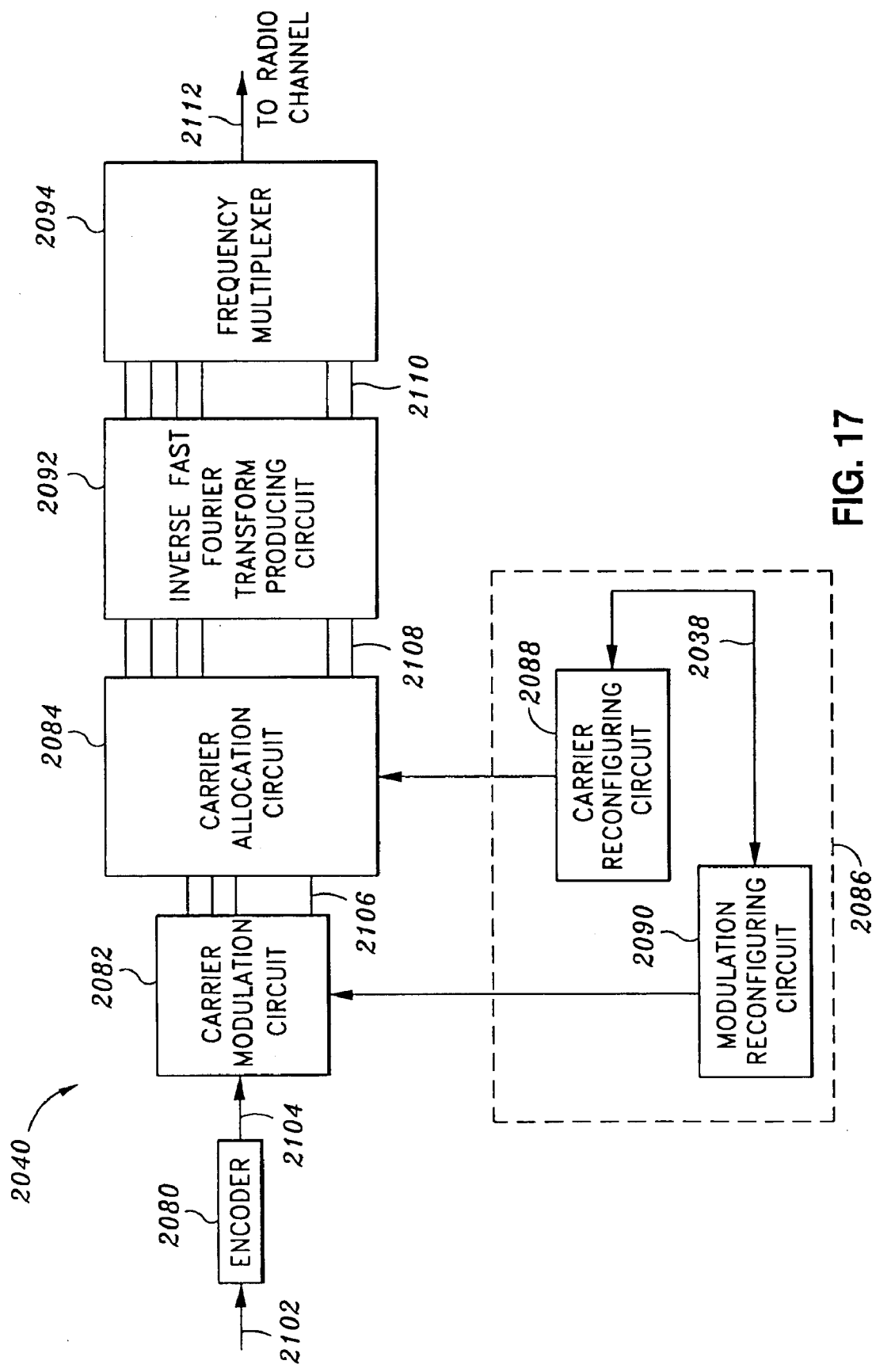
FIG. 17 is a detailed schematic view of the sending unit 40 depicted in FIG. 15.

The information sending unit 2040 depicted in FIG. 17 includes an encoder 2080 and a means of allocating to said information a number of carriers and modulation. These means of allocating carriers and a modulation consist partly of a carrier modulation circuit 2082 and partly of a carrier allocation circuit 2084.

This information sending unit 2040 also has a reconfiguring means 2086 for reconfiguring the number of carriers and the modulation allocated to the information to be transmitted.

This reconfiguring means 2086 consist partly of a carrier reconfiguring circuit 2088 for reconfiguring the number of carriers and partly of a modulation reconfiguring circuit 2090 for reconfiguring the modulation. The implementation of and conditions for the reconfiguration are explained below.

The information sending unit 2040 also includes an inverse fast Fourier transform (IFFT) producing circuit 2092 and a frequency multiplexer (MUX) 2094.

When the information sending unit 2040 is in operation, a set of successive information items J, coming from the data source 2020, is stored in the RAM 2028 (FIG. 15).

This information can be processed in the calculating unit 2026, and can for example undergo an operation of compression or of addition of a cyclic redundancy code.

The information in the RAM 2028 which has possibly been processed is first of all distributed in sequences S of data, for example of the binary type.

Each sequence S is sent to the modem interface 2038, and then to the information sending unit 2040 where the binary data streams, depicted by the reference 2102 in FIG. 17, are first coded in the encoder 2080 and represented by data stream 2104, and then are injected into the carrier modulation circuit 2082, also referred to as the mapping circuit.

In this circuit, the data stream 2104 is then grouped in R bits according to the modulation chosen, and then transformed into complex numbers, according to a stored coding alphabet.

The set of n complex numbers form a complex vector U 2106 in FIG. 17 which is then delivered to the carrier allocation circuit 2084.

In the example described here, R equals two.

Figure 18:
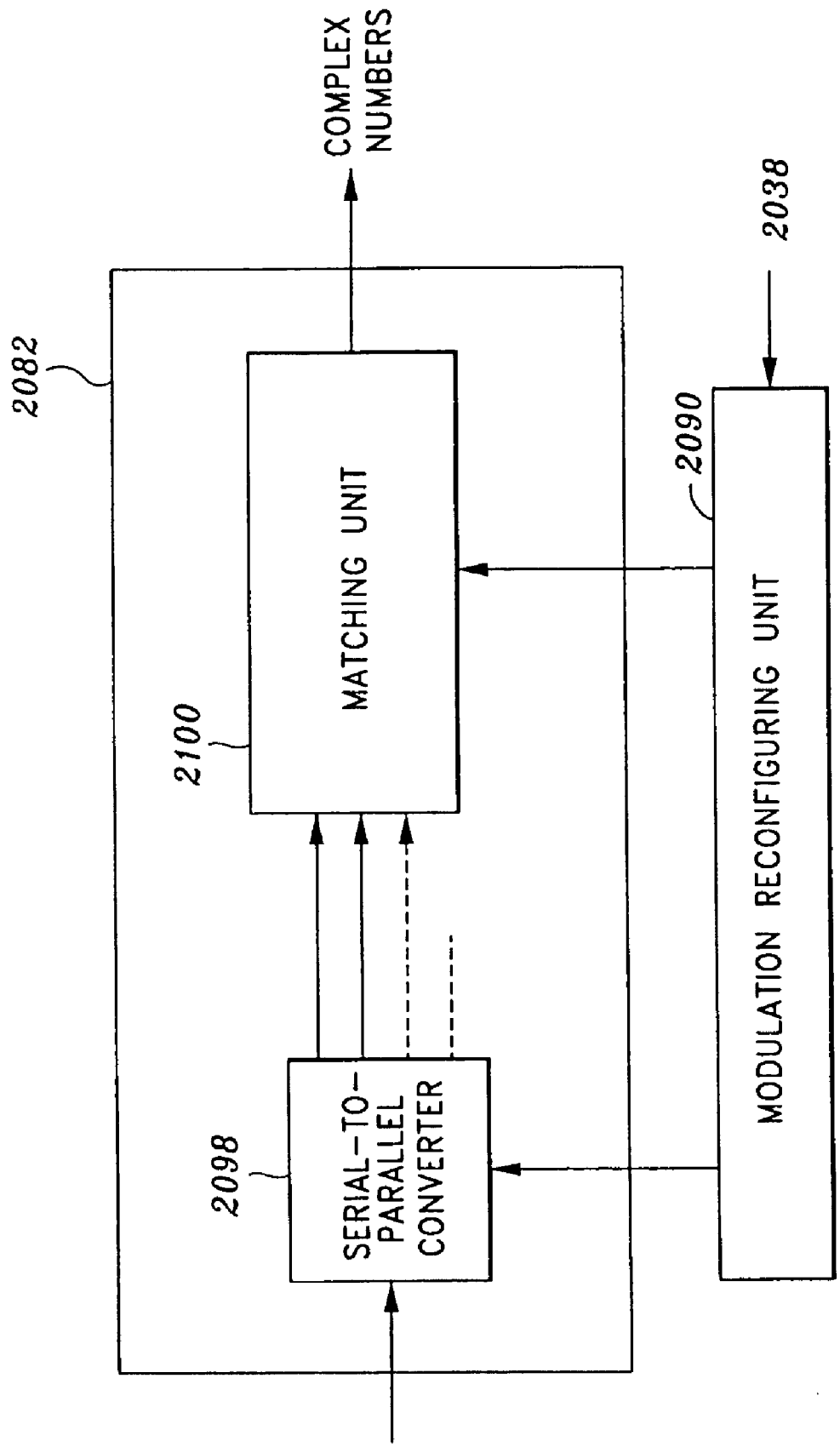
FIG. 18 is a detailed schematic view of the carrier modulation circuit 82 depicted in FIG. 17.

As depicted in FIG. 18, the modulation circuit 2082 includes, more particularly, a serial-to-parallel converter 2098.

This serial-to-parallel converter 2098 delivers at its output blocks of bits intended for a matching unit 2100. The matching unit 2100 has tables containing stored complex numbers and matches a block of R bits with a given complex number according to the modulation chosen.

Figure 19:
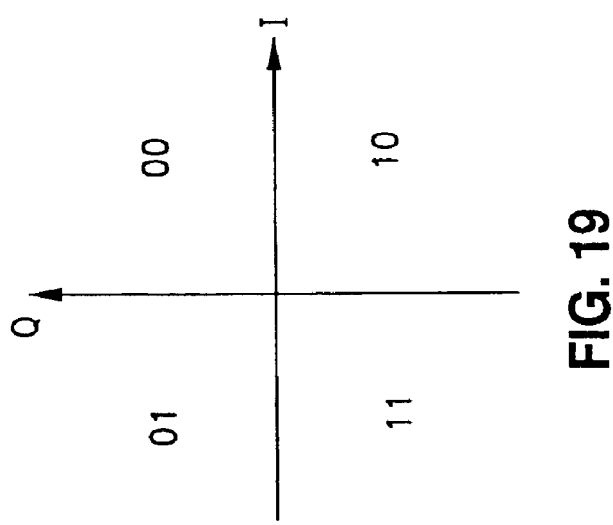
FIG. 19 is a representation of the binary data 00, 01, 11, 10 in the Fresnel plane.

The complex vectors U issuing from the circuit 2082 are for example depicted in the Fresnel plane in coordinates I and Q, as indicated in FIG. 19, according to a mapping of the quaternary phase shift keying (QPSK) type. .

The pairs of binary data 00, 01, 11 and 10 depicted in FIG. 19 are respectively associated with the complex numbers 1+j, −1+j, −1−j, 1−j which bear the name quadrature amplitude modulation (QAM) symbols 2106 in FIG. 17.

It should be noted that the modulation applied in the carrier modulation circuit 2082 can take different forms, such as binary phase shift keying (BPSK), quadrature phase shift keying (QPSK), octantal phase shift keying (8PSK), 16-state quadrature amplitude modulation (16QAM), 32-state quadrature amplitude modulation (32QAM), 64-state quadrature amplitude modulation (64QAM), etc.

In general terms, the size and number n of complex numbers issuing from the carrier modulation circuit 2082 depend on the modulation (type of modulation and level) and on the number of carriers allocated. Such an allocation will be described in more detail below.

Returning to the example described with reference to FIG. 17, during a transmission, the complex numbers forming QAM signals 2106 are transferred into the carrier allocation circuit 2084, which is depicted in more detail in FIG. 20.

Figure 20:
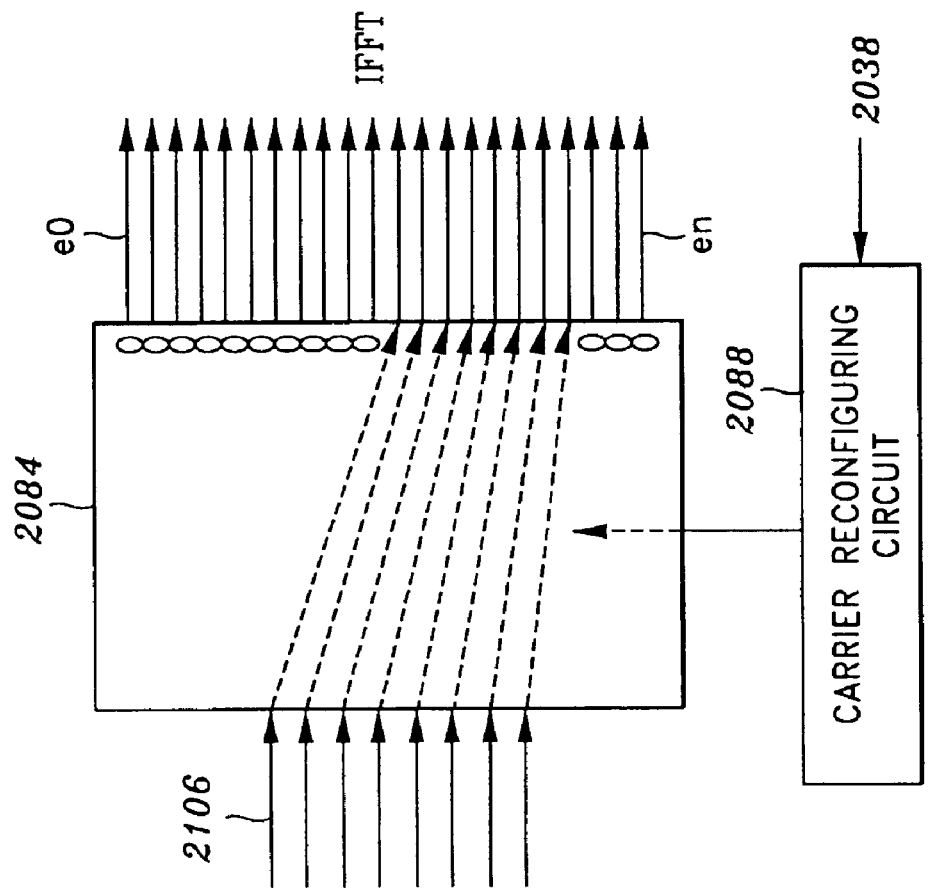
FIG. 20 is a detailed schematic view of the carrier allocation circuit 84 depicted in FIG. 17.

Thus, in FIG. 20, the carrier allocation circuit 2084 fulfils the role of a switch and matches a complex number with an selected input of the circuit 2092.

Different complex numbers are therefore allocated to the given inputs of the IFFT producing circuit 2092 as a function of information on the number of carriers selected for the transmission of information and the numbers of the inputs of the IFFT producing circuit 2092 corresponding to the selected carriers, information which is determined elsewhere, as will be discussed below.

In this way there is obtained, at the input of the IFFT producing circuit 2092, a complex vector V 2108 in which each component corresponds to a selected carrier, modulated by complex number.

This IFFT producing circuit 2092 performs the multiplication of each complex vector V by the Fourier matrix M mentioned at the start of the disclosure in order to obtain the transformed vector Y 2110.

This transformed vector Y 2110 consists of n complex numbers.

The transformed vector Y 2110 generated at the output of the IFFT producing circuit 2092 are then multiplexed by the frequency multiplexer 2094 in order to create a multiplexed carrier signal 2112 comprising all the multiplexed carriers, each carrier transporting the data contained in a number of the QAM signals 2106. The multiplexed carrier signal 2112 thus forms what is referred to as an OFDM symbol.

This multiplexed carrier signal 2112 is then modulated by a radio carrier at a modulator, not shown, included in the radio module 2044 of FIG. 15, for it to be transmitted in a transposed band over the radio communication channel.

A description will now be given in more detail of the reception unit 2072 of the base station 1401 with reference to FIGS. 21 to 23.

Figure 21:
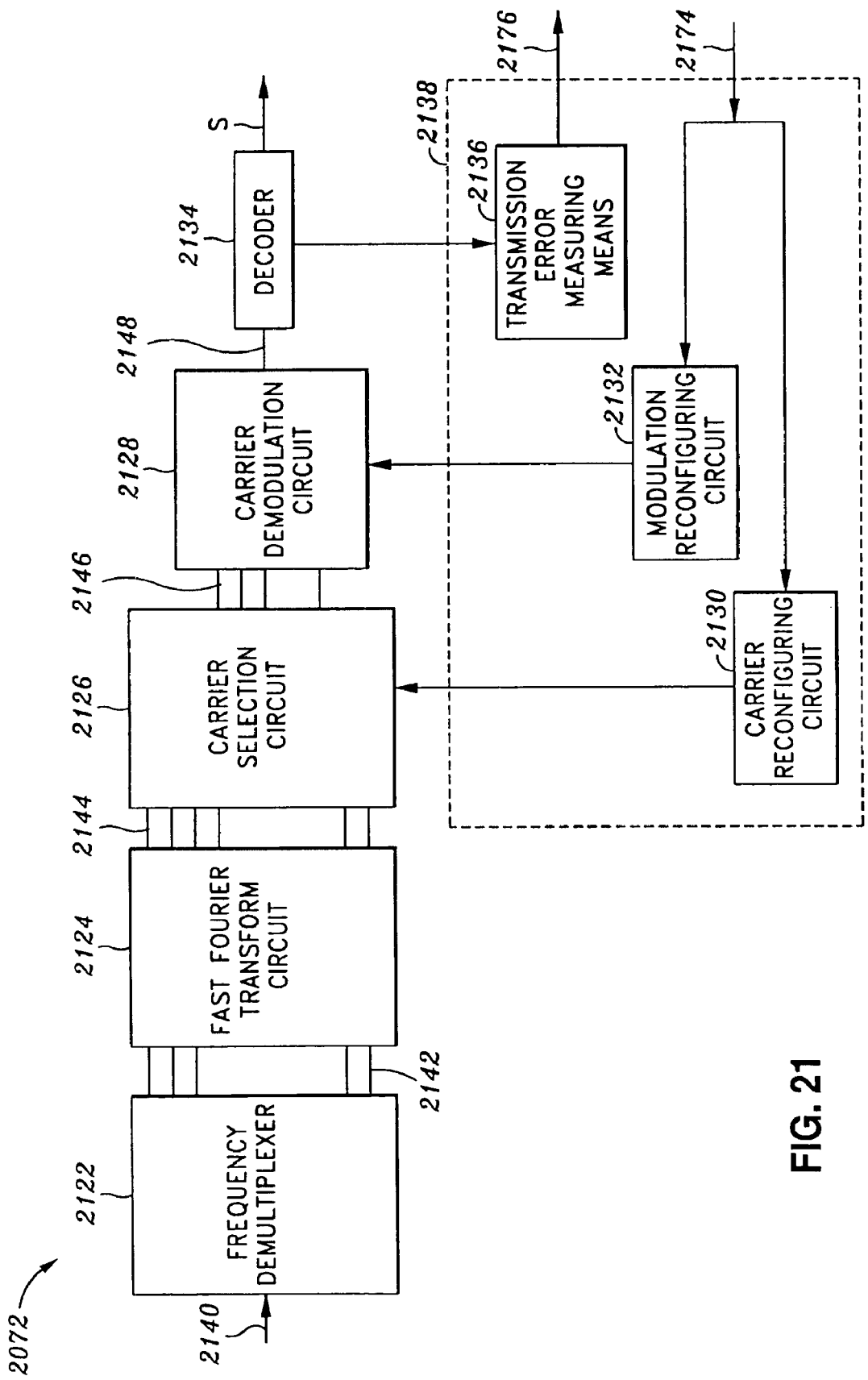
FIG. 21 is a detailed schematic view of the reception unit 72 depicted in FIG. 15.

As shown in FIG. 21, the information reception unit 2072 includes a frequency demultiplexer (DEMUX) 2122, a fast Fourier transform circuit (FFT) 2124, and means of selecting the carriers and the modulation allocated to the information transmitted over the radio communication channel. These selection means consist partly of a carrier selection circuit 2126 and partly of a carrier demodulation circuit 2128.

The information reception unit 2072 also includes means of reconfiguring the number of carriers and the modulation to be selected.

These reconfiguration means consist partly of a carrier reconfiguring circuit 2130 for reconfiguring the number of carriers to be selected and partly of a modulation reconfiguring circuit 2132 for reconfiguring the modulation to be selected. The implementation and the reconfiguration conditions are explained later.

The information reception unit 2072 also includes a decoder 2134 for the coded data and transmission error measuring means 2136 for measuring the transmission error rate on the radio communication channel in question.

The carrier reconfiguring means and modulation reconfiguring means 2132 and the transmission error measuring means 2136 form a receiver control unit 2138.

When the information reception unit 2072 is in operation, the radio signal is received from the radio communication channel by the radio antenna 2046 and is for example filtered in the radio module 2044 of FIG. 15.

The filtered signal undergoes automatic gain control to return the amplitude of said signal to a predetermined level, which is acceptable for the information reception unit 2072 to be able to function.

The signal is thus amplified because of the high attenuations which it can undergo when it is transmitted over the communication channel.

The power of the amplified signal is then measured and compared with a reference power. If the amplified and measured power does not correspond to this reference power, the gain of the amplifier is adjusted by circuits which are not shown but which are known to persons skilled in the art.

The signal is demodulated in the radio module 2044 by the radio carrier used during the modulation on sending of the signal.

The signal 2140 in FIG. 21 is then transmitted to the information reception unit 2072, demultiplexed at the frequency demultiplexer (DEMUX) 2122, in order to obtain a group of samples 2142 of the signal containing the group of carriers modulated by the complex numbers and forming a complex column vector Y'.

A fast Fourier transform (FFT) is then applied by the FFT circuit 2124 to the samples 2142 in order to obtain the signals.

2144 containing the carriers modulated by the symbols. The calculation of the direct fast Fourier transform consists of multiplying the matrix M', the inverse of the matrix M mentioned above, by the vector Y' in order to obtain a vector consisting of n complex numbers each modulating a carrier.

It should be noted that the matrices M and M' satisfy the equation MM'=Id, where Id designates the identity matrix.

When the matrix M corresponds to an inverse fast Fourier transform, the matrix M' corresponds to a direct Fourier transform, but it should however be remarked that the order of the matrices can be reversed.

According to a variant, not shown, the matrices M and M' satisfying the equation MM'=Id are Hadamard matrices.

Figure 22:
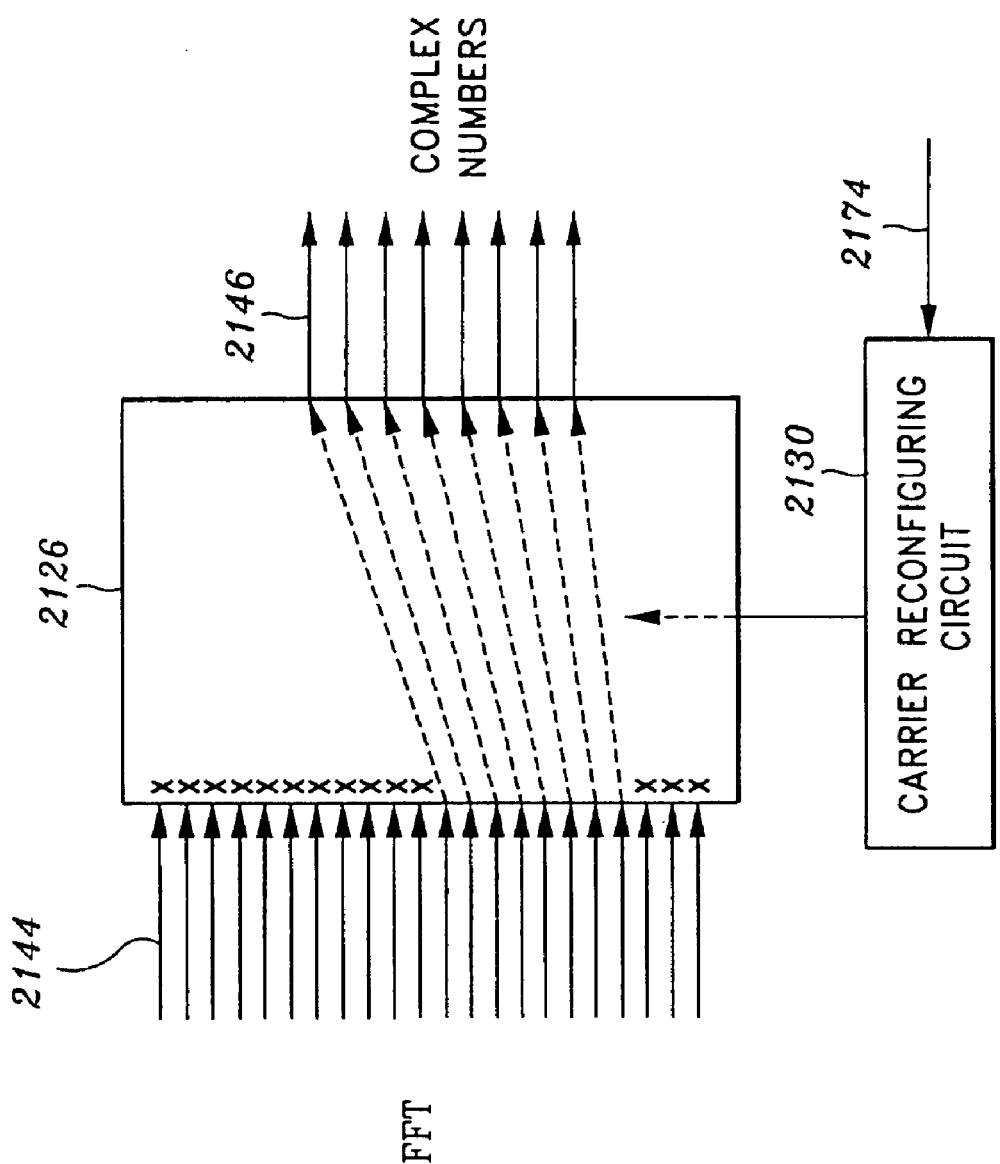
FIG. 22 is a detailed schematic view of the carrier selection circuit 126 depicted in FIG. 21.

The different outputs of the FFT circuit 2124 are connected to different inputs of the carrier selection circuit 2126, as shown in FIG. 22, carrier selection circuit 2126 selects, from amongst the different outputs of the FFT circuit 2124, the carriers which have been used for transmitting complex numbers or new carriers more adapted to the relevant information transmission and supplies, at its output, said complex numbers 2146 in parallel. These complex numbers form the approximate complex vector Z.

As such, the carrier selection circuit 2126 fulfils the role of a switch.

Each of the n complex numbers corresponds to a point in the Fresnel plane which is depicted in FIG. 19.

The complex numbers 2146 are then supplied to the carrier demodulation circuit 2128 in order to generate the coded digital data sequence 2148.

Figure 23:
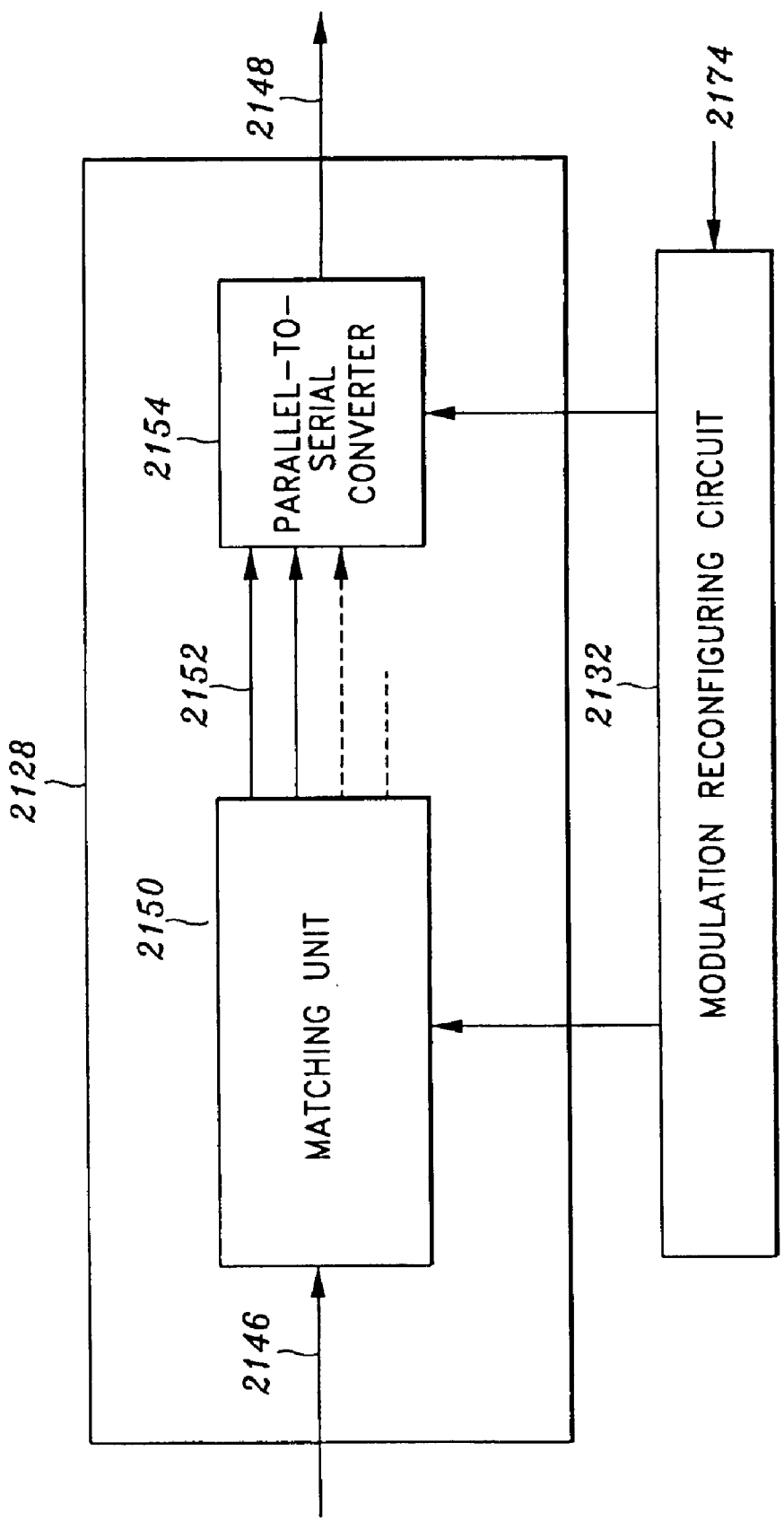
FIG. 23 is a detailed schematic view of the carrier demodulation circuit 128 depicted in FIG. 21.

As depicted in FIG. 23, the carrier demodulation circuit 2128 includes a matching unit 2150 which comprises tables containing binary data groups and blocks of bits with a block size corresponding to the chosen type and level of modulation.

Thus matching unit 2150 receives, at its input, complex numbers 2146, for example 1+j, −1+j, −1−j, 1−j, and matches with them respectively the pairs of binary data 00, 01, 11 and 10 FIG. 19) since the QPSK modulation was chosen, as seen above, at the time of sending.

In order to obtain this matching, provision is made for performing a decision step on the position in the Fresnel plane on the points of said complex approximate vector Z with respect to the points of the coding alphabet used at the time of sending, and which are those forming the complex vector U, associated with the information which may have been sent.

The decision step is performed according to a criterion which takes into account the minimum value of the Euclidean distance between each point obtained for the approximate vector Z and those corresponding to the vector U.

When the Euclidean distance calculated between one of the points obtained for the approximate vector Z and one of the points of the alphabet is minimal, it is deduced therefrom that the point which may have been sent is that of the alphabet.

The decision step can also be performed in accordance with a decision at the maximum likelihood on a set of symbols, using a Hamming distance or a Euclidean distance and a Viterbi algorithm.

Thus the complex numbers are each associated with a point of the coding alphabet used on sending and supplying the binary data sequences which have been transmitted.

The modulation reconfiguring circuit 2132 can modify the modulation applied, as described below.

The pairs of binary data 2152 in FIG. 23 are sent in parallel to a parallel-to-serial converter 2154, which performs the parallel to serial conversion of said data and delivers the data 2148 to the decoder 2134.

The modulation reconfiguring circuit 2132 also acts on the parallel-to-serial converter 2154, supplying to it the above-mentioned number R in accordance with which the binary data are grouped.

The sequences S of data issuing from the decoder 2134 of FIG. 21 are then stored in the RAM 2028 in FIG. 15 and processed by the calculating unit 2026.

It should be noted that the transmission of carriers modulated by symbols, which has been described here, concerns a transmission of symbols by a modulation technique known as OFDM.

However, other types of transmission of carriers modulated by symbols can also be suitable, such as, for example, a radio transmission technique known as frequency division multiple access (FDMA) or a spectrum spreading technique by frequency jumping.

Figure 24:
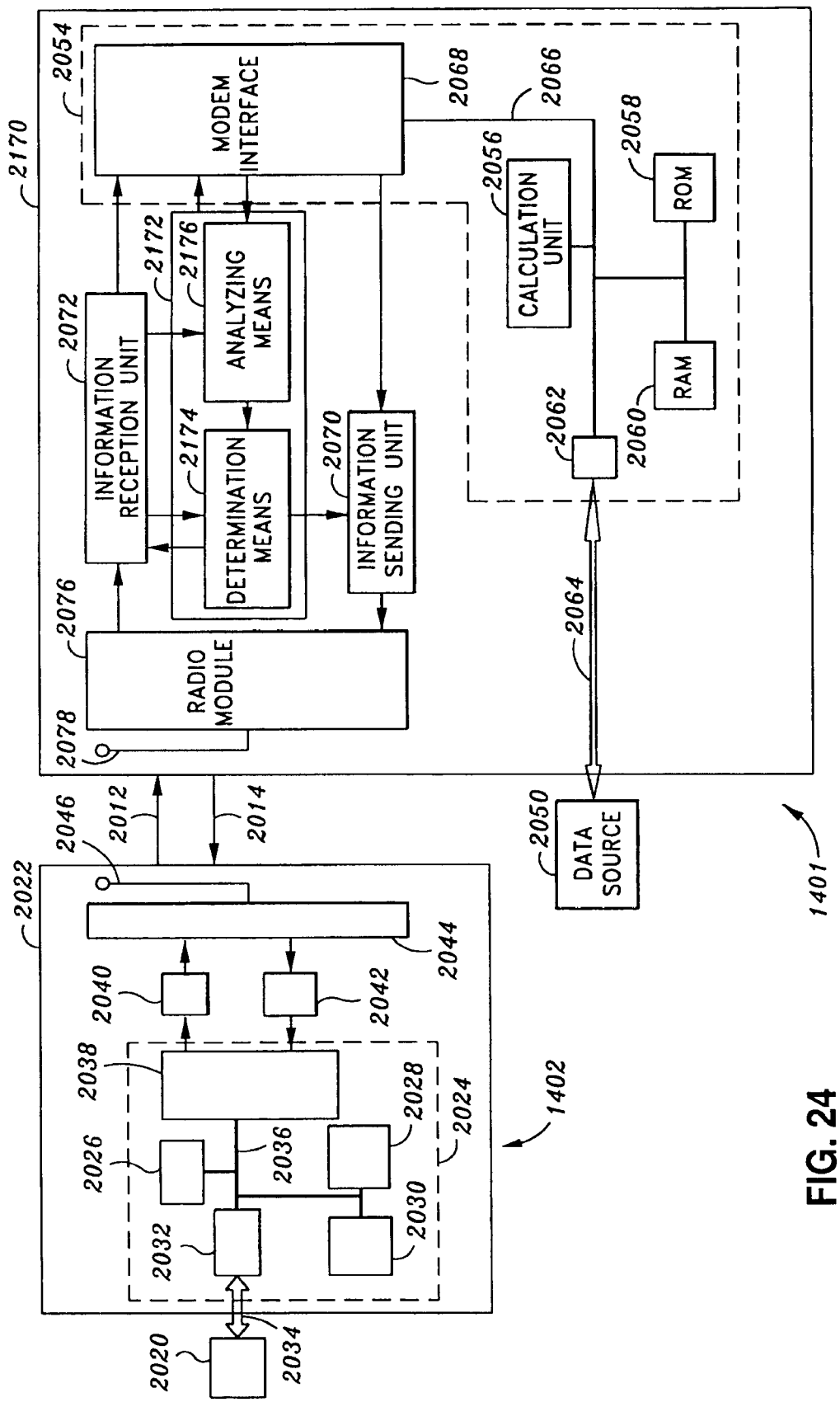
FIG. 24 is a schematic view depicting the base station SB and peripheral station $SP_1$ according to the invention.

FIG. 24 depicts the peripheral station 1402 and the base station 1402 communicating information which each other by means of the incoming link 2012 and the outgoing link 2014.

The peripheral station 1402 is in all respect identical to the one shown in FIG. 15. The base station 1401 repeats all the elements indicated in FIG. 16, but their arrangement has been somewhat modified in order to show new elements.

The communication device 2052 of the information sending and reception device has disappeared in order to show the transmission management device 2170, which corresponds to a device for managing information transmissions by radio between the base station 1401 and the peripheral station 1402 according to the present invention.

This transmission management device 2170 includes the communication device 2052 of FIG. 16, but this has not been reproduced in order not to complicate the diagram.

This transmission management device 2170 has, as depicted in FIG. 24, inserted between the information sending unit 2070 and information reception unit 2072, a management unit 2172.

When the peripheral station 1402 wishes to communicate information to be base station 1401 over the relevant radio channel, it first sends a request specifying a required service quality for the information transmission to come.

This required service quality specifies the transmission error rate and transmission rate required for the information transmission in question between the base station and the peripheral station.

The transmission management device 2170 includes means of receiving this request which consist of the radio antenna 2078, the radio module 2076 and the information reception unit 2072 and a management unit 2172.

This transmission management device 2170 also has means of receiving at least one measurement of the transmission error rate for a given information transmission, a measurement which was made by transmission error measuring means 2136.

The management unit 2172 has determination means 2174, of determining a number of carriers and a modulation adapted in response to the required service quality, in terms of transmission error rate and transmission rate, for a given information transmission.

It should be noted that this number of carriers and this modulation vary according to different service qualities required on one and the same radio communication channel and for different information transmissions.

These determination means 2174 communicate bidirectionally, as depicted in FIG. 24 by two arrows, with the information reception unit 2072.

The determination means 2174 determines the number of carriers and the modulation adapted to a service quality request, with a view to their allocation to the radio communication channel allocated to the relevant information transmission.

These determination means 2174 communicate with the information sending unit 2070 in order to transmit to the peripheral station 1402 the transmission parameters which are the number of carriers and the modulation.

These transmission parameters are also transmitted to the information reception unit 2072 of the base station 1401.

The management unit 2172 also has analyzing means 2176 for analyzing the measurement of the transmission error rate received by the transmission error measuring means 2136 of the information reception unit 2172 and transmitted to said analyzing means 2176 and for comparing the result of this analysis with the required service quality, in terms of transmission rate and transmission error rate required.

The result of this comparison is transmitted to the determination means 2174.

It should be noted that the determination means 2174 of determining the number of carriers and the modulation adapted to an information transmission are used before the relevant information transmission occurs.

However, as will be seen subsequently, these determination means can also be used during the information transmission itself.

More particularly, the service quality required for a given information transmission is expressed in terms of transmission error rate threshold and variation in transmission rate acceptable for said information transmission.

Thus, for an information transmission, which is similar to the transmission of files, the transmission rate may vary to a great extent whilst the acceptable error rate should be as low as possible and should not vary.

On the other hand, for applications of the real-time type, the transmission rate must be as constant as possible whilst the error rate, for its part, can vary.

The invention makes provision for adapting, to each required service quality which, as has just been seen, can be very different from one information transmission to another, a given pair consisting of a number of carriers and a modulation.

A description will now be given of the sending, transmission management and reception methods according to the invention, with reference to the respective algorithms in FIGS. 25 to 27.

Figure 25:
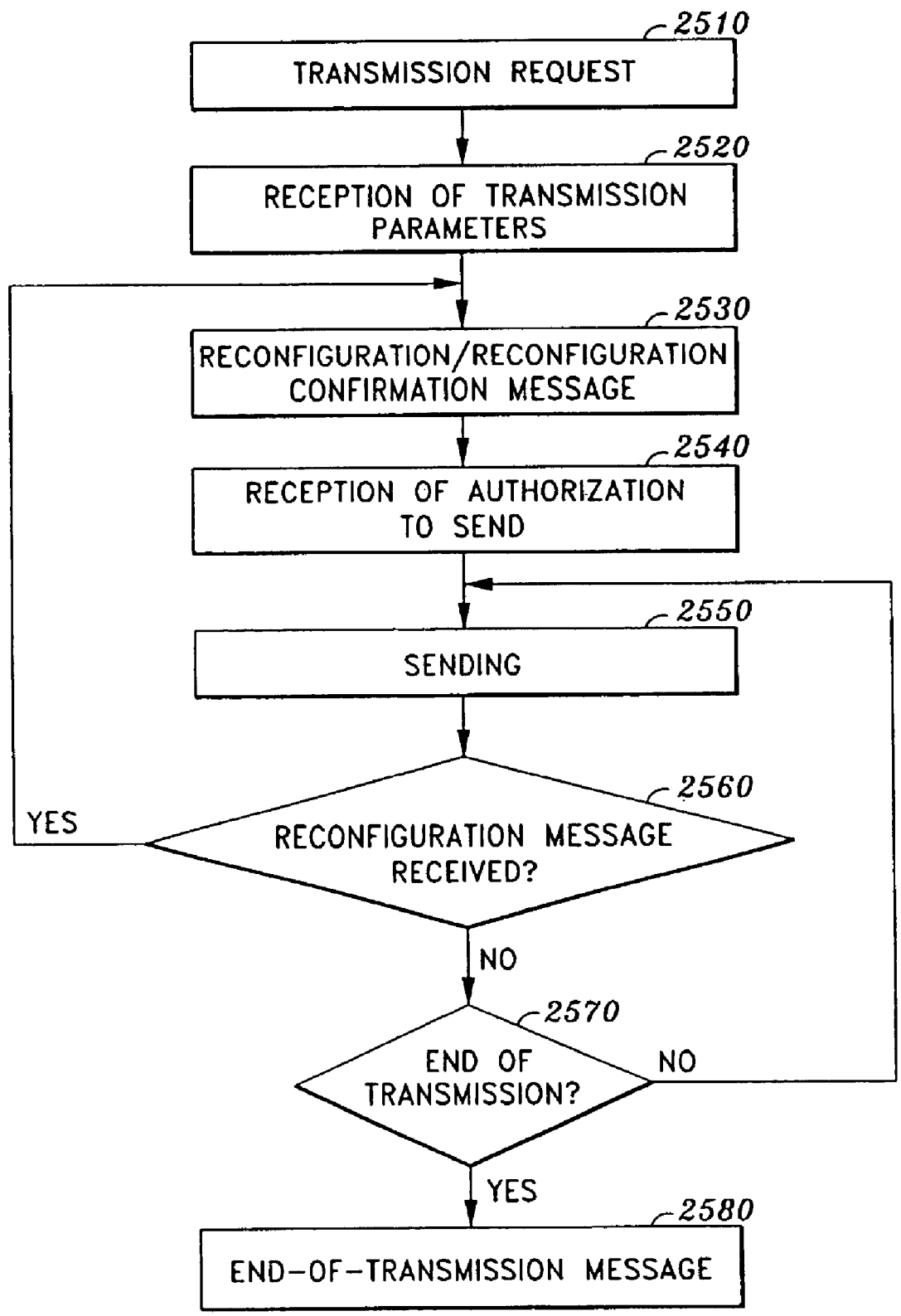
FIG. 25 is an algorithm representing the different steps of the information sending method according to the invention.

As depicted in FIG. 25, the sending method according to the invention includes a step during which the peripheral station 1402 transmits to the base station 1401 a transmission request with which a required service quality is associated (step 2510).

This service quality specifies the transmission rate and the transmission error rate acceptable for the given information transmission between the peripheral station 1402 and the base station 1401.

As has just been seen, the service quality also specifies the transmission error rate threshold and the variation in the transmission rate acceptable for the information transmission in question.

Figure 26:
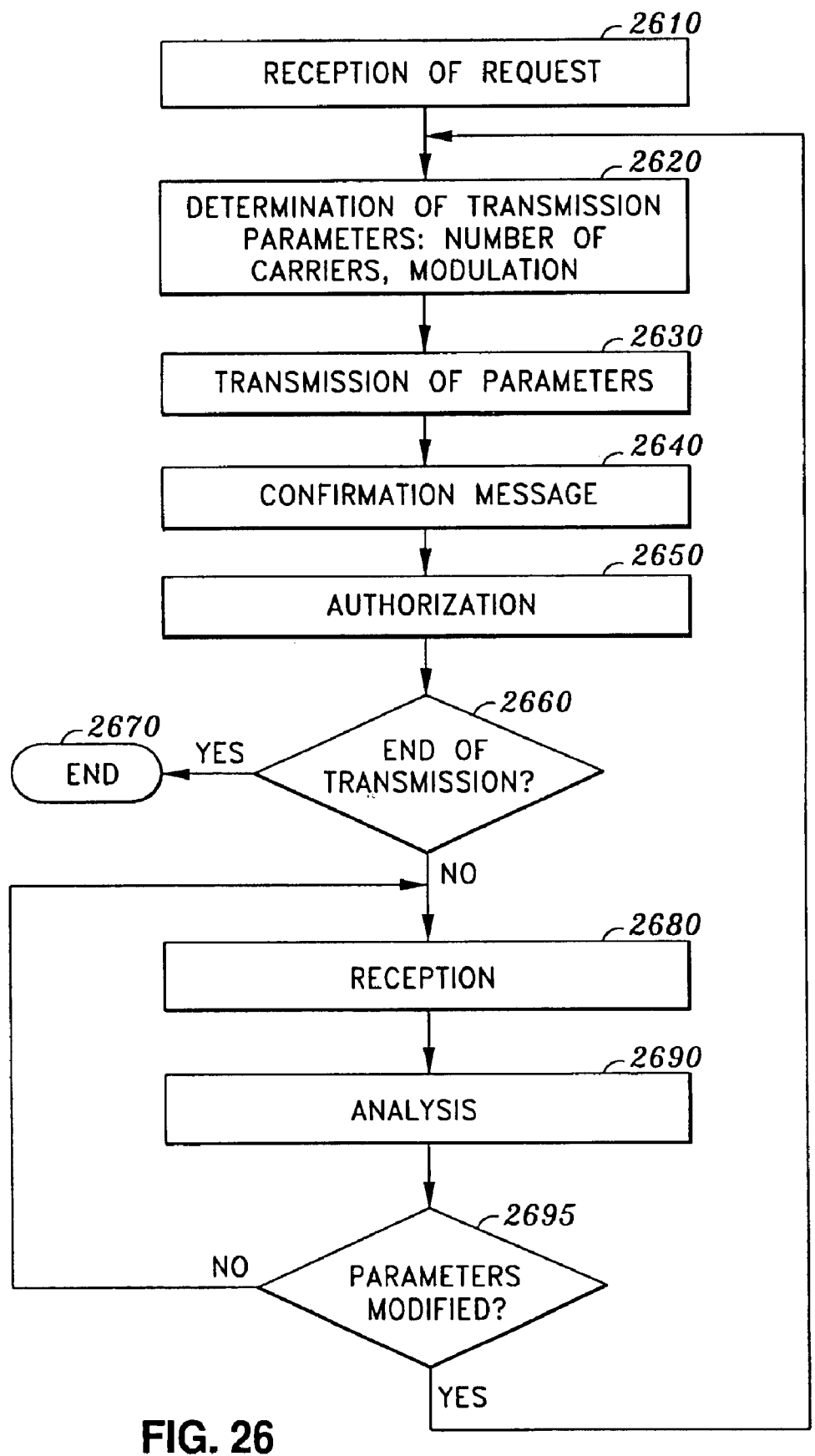
FIG. 26 is an algorithm representing the different steps of the information transmission management method according to the invention.

As depicted in FIG. 26, the method of managing radio transmissions between the peripheral station 1402 and the base station 1401, according to the present invention, includes a step denoted 2610, during which the transmission management device 2170 of the base station 1401 receives from the peripheral station 1402 the transmission request and the associated service quality request.

The transmission management device 2170 determines, by virtue of the determination means 2174, the transmission parameters (number of carriers and modulation) adapted to the required service quality, in terms of transmission error rate and transmission rate for the information transmission in question. This step of determining the transmission parameters is performed during the step denoted 2670 of the management method according to the present invention.

When this determination step is performed, the transmission parameters, namely the number of carriers and the modulation, which are allocated to the transmission in question, are transmitted (step 2630) by the management unit 2172 to the information reception unit 2072 and to the information sending unit 2070 with a view to the sending of these parameters to the peripheral station 1402.

Figure 27:
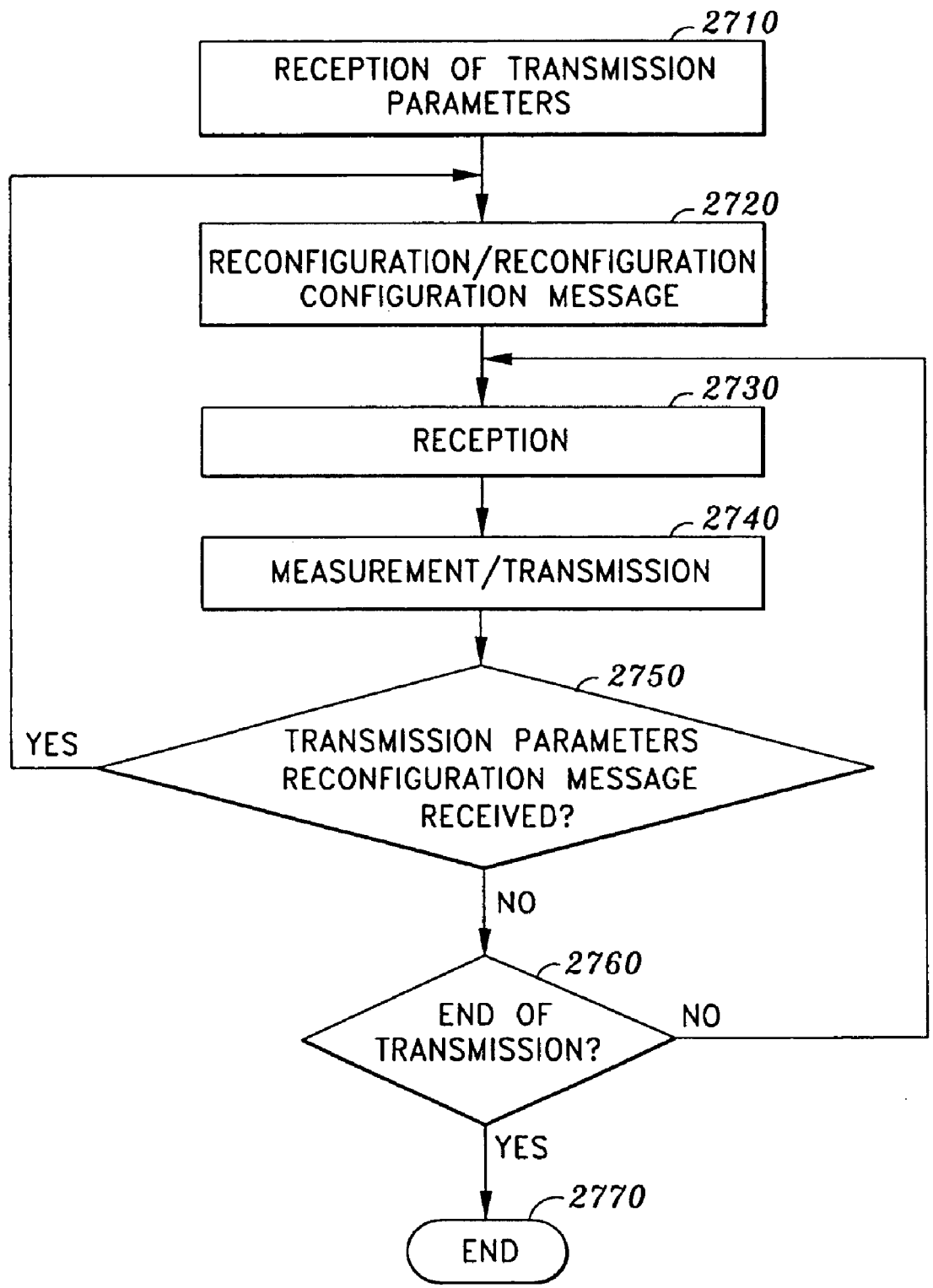
FIG. 27 is an algorithm representing the different steps of the information reception method according to the invention.

In accordance with step 2710 of the reception method according to the invention, whose algorithm is shown in FIG. 27, the information reception unit 2072 receives the transmission parameters thus determined.

Returning to FIG. 21, which details the information reception unit 2072 of the base station 1401, it can be seen that the transmission parameters which have been determined are directed to the carrier reconfiguring circuit 2130 and the modulation reconfiguring circuit 2132. The number of carriers allocated to the communication station in question, having regard to the required service quality, is transmitted to the carrier reconfiguring circuit 2130 of reconfiguring the number of carriers.

The modulation adapted to the transmission in question, having regard to the service quality required for it, is transmitted to the modulation reconfiguring circuit 2132.

Let it be considered, for example, that the fast Fourier transform operation performed in the FFT circuit 2124 (FIG. 21) supplies 1512 points at the output, and let it be assumed that the transmission management device and more precisely the determination means 2174 indicate that, having regard to the required service quality, it is necessary to have 501 carriers and identify the 501. useful outputs of the FFT circuit 2124.

Thus, in the example considered, out of the 1512 output points of the FFT circuit 2124, only 501 have a significant value, and the carrier reconfiguring circuit 2130 effect a reconfiguration of the number of carriers, selecting the 501 useful outputs of the FFT circuit 2124.

Likewise, the information concerning the modulation adapted to the transmission in question enables the modulation reconfiguring circuit 2132 to reconfigure the modulation applied to the complex numbers 2146, selecting the adapted look-up table and acting on the parallel-to-serial converter 2154 by supplying to the parallel-to-serial converter the number R according to which the binary data must be grouped.

When the information reception unit 2072 of the base station 1401 has been reconfigured according to these transmission parameters, in accordance with step 2720 of the reception method according to the invention, said reception unit sends a reconfiguration confirmation message to the management unit 2172.

At the peripheral station 1402, the transmission parameters transmitted over the incoming link denoted 2014 in FIG. 24 are distributed to the information reception unit 2042 and to the information sending unit 2040 by means of the modem interface 2038.

As depicted in FIG. 17, the transmission parameters are intended on the one hand for the modulation reconfiguring unit 2090 for reconfiguring the modulation to be allocated to the information transmission, and on the other hand to the carrier reconfiguring circuit 2088 to be allocated to the information transmission.

As a function of the received modulation parameters (type of modulation and level), the modulation reconfiguring circuit 2690 acts on the serial-to-parallel converter 2098, supplying to it the number R according to which the binary data must be grouped, and select in the matching unit 2100 the look-up table adapted to the modulation under consideration.

As a function of the transmission parameters received from the management device 2172, namely the number of carriers and the number of the carriers to be considered, the carrier reconfiguring circuit 2088 matches the QAM symbols 2106 (FIG. 20) to the numbers of the inputs IFFT producing circuit 2092 (IFFT) which were supplied by the transmission management device 2170.

The carrier reconfiguring circuit 2088 switches the QAM symbols 2106 onto the inputs corresponding to the appropriate carriers of the IFFT producing circuit 2092.

When the information sending unit 2040 of the peripheral station 1402 receives the transmission parameters determined by the transmission management device 2170 of the base station 1401 (step 2520), and when the reconfiguration step according to these parameters has taken place (step 2530), the peripheral station 1402 sends a reconfiguration confirmation message to the transmission management device 2170.

The transmission management method according to the invention includes a step of receiving reconfiguration confirmation messages coming from the information reception unit 2072 and from the peripheral station 1402 (step 2640).

The transmission management device according to the invention sends a transmission enable message to the information reception unit 2072 and to the peripheral station 1402 (step 2650).

The information sending unit 2040 of the peripheral station 1402 receives the send enable message coming from the transmission management device 2170 (step 2540).

The peripheral station 1402 then sends information in accordance with the adapted transmission parameters (step 2550).

If it is determined (in step 2660) that the transmission of information between the peripheral station 1402 and the base station 1401 ends, the process ends (step 2670).

If the transmission is not at the end, the transmission error measuring means 2136 measures the error rate of the current information transmission and transmit the result of this measurement to the analyzing unit 2176 (step 2740). The analyzing unit 2176 then receives this error rate measurement (step 2680).

The analyzing unit 2176 analyzes the measurement of the error rate of the current information transmission and compares the result of this analysis with the required service quality, in terms of transmission rate and transmission error rate (step 2690).

If the result of this analysis does not meet the service quality required for the information transmission in question, then the transmission parameters must be modified once again (step 2695, followed by steps 2620 to 2650).

The transmission management device 2170, thereby determines new transmission parameters (number of carriers and modulation) and transmits them to the information reception unit 2072 and to the peripheral station 1402.

The peripheral station 1402 receives from the transmission management device a message reconfiguring the parameters of the current transmission (step 2560, followed by steps 2530 to ).

At the same time, the information reception unit 2072 receives the message reconfiguring the parameters of the current transmission (step 2550, followed by steps 2520 to 2540).

In so far as it is determined that the parameters of the current transmission should not be modified (step 2695), then a test is carried out to determine whether the information reception unit 2072 received an end of transmission (step 2750).

If the transmission is not terminated, then the reception and measurement are performed once again (steps 2730 and 2740).

Because of this, a new measurement of the transmission error rate is made by the reception unit 2072 is performed (step 2695, followed by steps 2680 and 2690).

This measurement of the error rate of the current transmission and the corresponding adaptation of the number of carriers and of the modulation are performed continuously during the information transmission in question, so as to satisfy the required service quality criteria.

Returning to FIG. 25, when no message reconfiguring the current transmission parameters is received from the transmission management device 2170, a test is performed (step 2560) to determine whether the information sending unit 2040 of the peripheral station 1402 is requesting an end of transmission (step 2570).

If an end of transmission is not requested, then transmission continues (step 2570, followed by steps 2550 and 2560).

On the other hand, if the information sending unit 2040 requests an end of transmission, then the peripheral station 1402 sends an end of transmission message by means of the incoming radio link 2012 to the transmission management device 2170 (step 2580). The information reception unit 2072 also receives the end of transmission message and the transmission ends (step 2770).

A test is performed at the end of transmission (step 2660) and transmission ends (step 2670).

Figure 28:
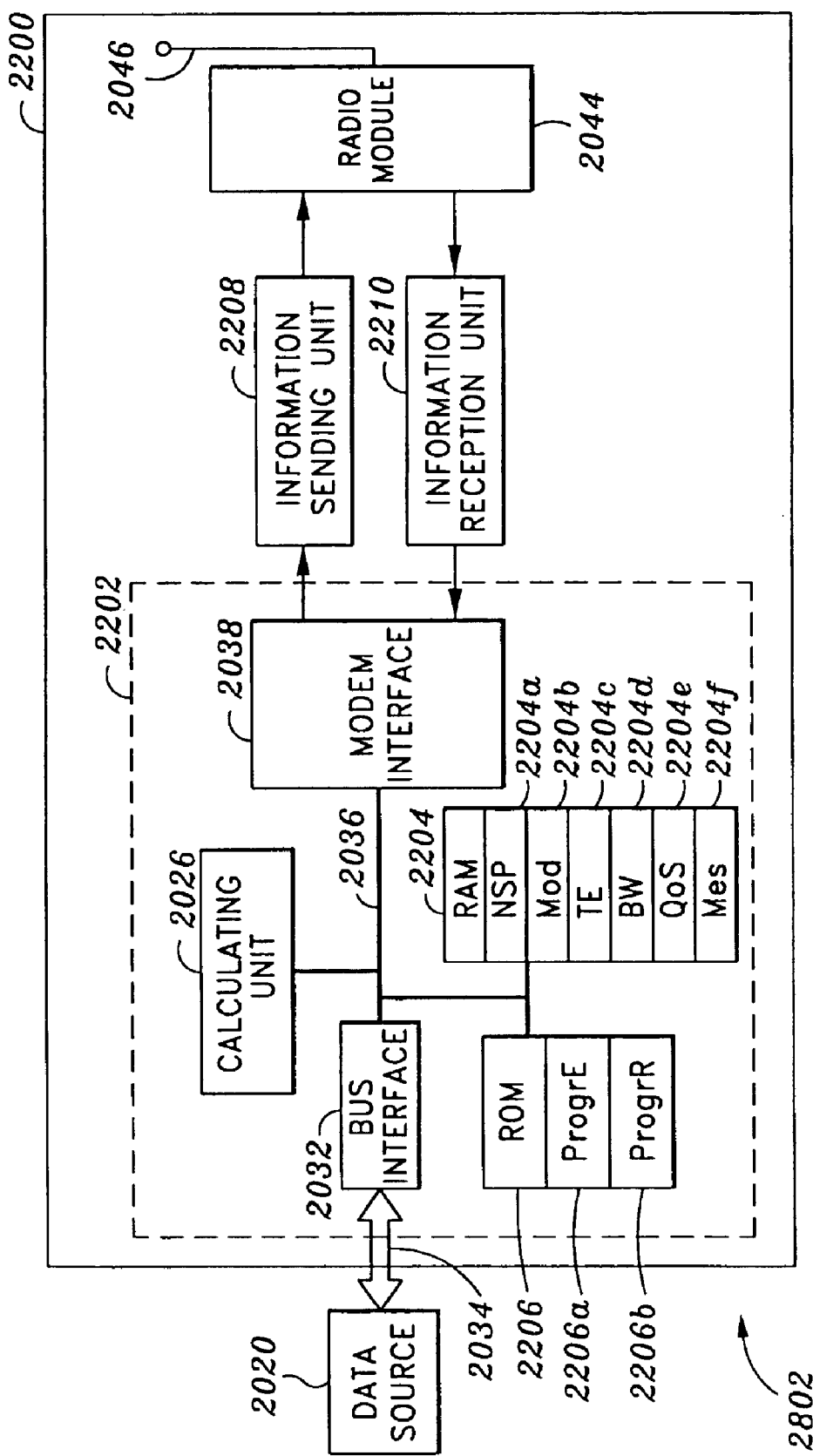
FIG. 28 is a schematic view of a peripheral station SP'1 according to a second embodiment of the invention.

The peripheral communication station 2802 depicted in FIG. 28 concerns a second embodiment of the invention.

In FIG. 28, all the elements are unchanged compared with those of FIG. 15 and have the same references.

The peripheral station 2802 has a data source 2020 and an communication device 2200.

This communication device 2200 has a data processing unit 2202 which comprises a calculating unit 2026, a bus interface 2032 and a bus 2034 which connects the data source 2020 to the bus interface 2032. The data processing unit 2202 also comprises a modem interface 2038, a RAM 2204 and a ROM 2206.

The computing device 2200 also includes an information sending unit 2208 connected to a radio module 2044, which is equipped with an antenna 2046.

The communication device 2200 also includes an information reception unit 2210 connected to the radio module 2044 and a modem interface 2038.

As depicted in FIG. 28, the bus interface 2032, the calculating unit 2026, the modem interface 2038 and the RAM 2204 and ROM 2206 are all connected by a bus 2036.

In this embodiment, the functionalities of the sending and reception methods according to the present invention are implemented by means of computer programs denoted respectively Progr E 2206a and Progr R 2206b.

Progr E 2206a, which implements the sending method according to the present invention is placed in a memory area of the ROM 2206. The instructions of Progr E 2206a correspond to steps 2510 to 2580 of the algorithm depicted in FIG. 25.

Progr R 2206b, which implements the information reception method according to the present invention is placed in a memory area of the ROM 2206.

The instructions of Progr R 2206b correspond to steps 2710 to 2770 of the algorithm depicted in FIG. 27.

In this embodiment, the information sending unit 2208 and information reception unit 2210 include the same elements as the information sending unit 2040 and information reception unit 2072, with the exception of the respective reconfiguring means 2086 and receiver control unit 2138, which are not included in 2208 and information reception unit 2210.

This is because the functionalities implemented in these units are now implemented by the respective computer programs ProgrE 2206a and ProgrR 2206b.

The RAM 2204 has several registers denoted 2204a to 2204f, which contain different variables used during the execution of the instructions of the previously mentioned computer programs.

Thus the register 2204a contains a variable called number of carriers and denoted NSP. The register 2204b contains a variable called modulation and denoted Mod. The register 2204c contains a variable called transmission error rate and denoted TE. The register 2204d contains a variable called passband (this also corresponds to the transmission rate) and denoted BW. The register 2204e contains a variable called service quality and denoted QoS.

The register 2204f contains a variable called measurement, denoted Mes, and which corresponds to the result of the measurement of the error rate of a current transmission, effected in the information reception unit 2210.

The variables TE, BW and QoS are used by the computer program Progr E 2206a.

The transmission parameters denoted NSP and MoD are used during steps 2520, 2530, and 2560 of the computer program Progr E 2206a and during steps 2710 and 2720 of the computer program Progr R 2206b.

Figure 29:
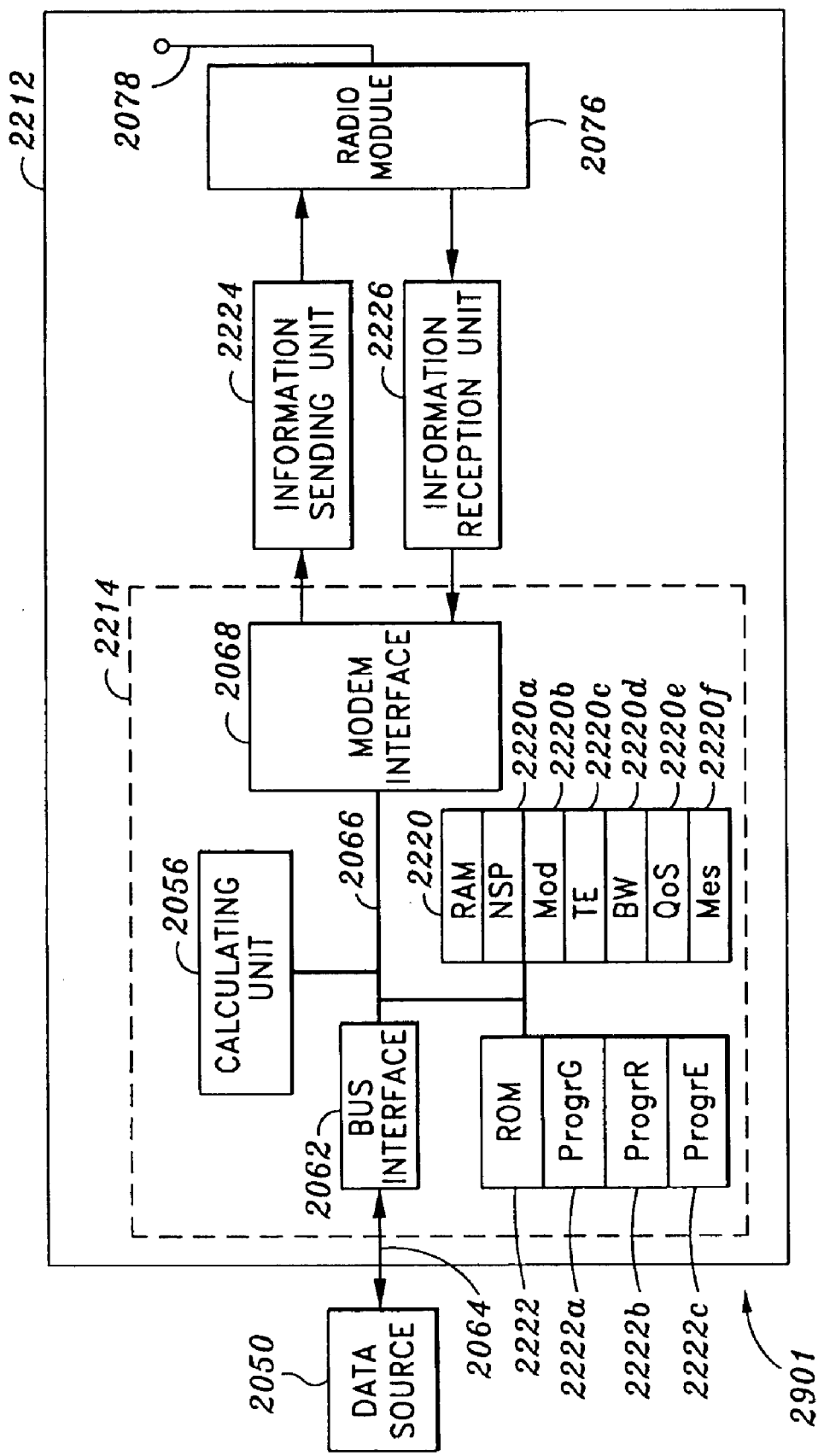
FIG. 29 is a schematic view of a base station SB' according to a second embodiment of the invention.

FIG. 29 illustrates an additional embodiment of a base communication station 2901 according to the present invention. This base station has a data source 2050 and a transmission management device 2212.

This transmission management device 2212 also fulfils the sending and reception functions. The transmission management device 2212 has a data processing unit 2214 which comprises a calculating unit 2056, a bus interface 2062 and a bus 2064 which connects the data source 2050 to the bus interface 2062, a modem interface 2068, a RAM 2220 and a ROM 2222.

A bus 2066 connects the calculating unit 2056, the bus interface 2062, the modem interface 2068 and the RAM 2220 and ROM 2222.

The transmission management device according to this embodiment of the present invention also has an information sending unit 2224 connected to a radio module 2076, which is equipped with an antenna 2078.

The information sending unit 2224 is also connected to the modem interface 68.

The transmission management device 2212 also has an information reception unit 2226 which is connected to the radio module 2076 and the modem interface 2068.

In this embodiment, the functionalities of the transmission and reception management method according to the invention are implemented by means of computer programs denoted Progr G 2222a and Progr R 2222b.

The permanent storage means 2222 has two memory areas denoted Progr G 2222a and Progr R 2222b, which contain respectively the programs Progr G and Progr R.

The instructions of the program Progr G correspond to steps $G_1$ to $G_{10}$ of the algorithm depicted in FIG. 26.

The instructions of the program Progr R correspond to steps 2710 to 2770 of the algorithm depicted in FIG. 27.

The RAM 2220 contains several registers denoted 2220a to 2220f, each containing a different variable with is used during the execution of the different instructions of the above-mentioned computer programs.

The variables denoted NSP, Mod, TE, BW, QoS and Mes are the same as those described with reference to FIG. 28 and are therefore not explained any further here. These variables are respectively contained in the registers 2220a to 2220f of the RAM 2220.

The variables TE, BW and QoS are used during step 2610 of the program Progr G 2222a. The variables denoted NSP, Mod are used during steps 2620 and 2630 of the program Progr G 2222a The first variables cited TE, BW and QoS are also used during steps 2690 of this same program. The variable Mes was used during steps 2680 and 2690.

The transmission parameters represented by the variables NSP and Mod are used during step 2710 of the computer program Progr R 2222b. The variable Mes is used during the step 2740 of the computer program Progr R 2222b.

It should be noted that the information sending unit 2224 and information reception unit 2226 of the base station 2901 are identical to the information sending unit 2040 and information reception unit 2072 depicted respectively in FIGS. 17 and 21, except for reconfiguring means 2086 and receiver control unit 2138, which are not included.

This is because the functionalities provided by the units are now implemented by the computer programs.

The permanent storage means also contains a memory area denoted 2222c which contains a computer program Progr E 2222c for implementing the sending method according to the invention.

The instructions of Progr E 2222c correspond to steps 2510 to 2580 depicted in the algorithm in FIG. 25. The variables contained in the registers 2220c, 2220d, 2220e are used during step 2510 of the program Progr E. The variables contained in the registers 2220a and 2220b are used during steps 2520, 2530 and 2560 of the computer program Progr E 2222c.

According to an aspect of the invention which is not shown, the functionalities of the information sending unit 2224 and information reception unit 2226 of the base station 2901 are implemented by one of the computer programs stored in memory areas of the ROM 2222.

In order to illustrate the possible choices of reconfiguring the modulation and the number of carriers in order to guarantee a given service quality, the parameters of the OFDM modulation which follow will be taken as an example, and these are:

number of carriers =1512 or 6048 useful carriers, 3 modulation levels: 4QAM, 16QAM, 64QAM, 3 coding ratios: ½; ⅔; ¾; ⅚; ⅞, guard time: ¼, ⅛, 1/16, 1/32 of the duration of the OFDM symbols.

The coding ratio is defined as being the ratio between the number of useful information items and the number of redundant information items added by the coding in order to make the information transmission more reliable. A coding ratio of ¾ means that there are three useful information items for one redundant information item.

The guard time for its part defines the interval of time separating two consecutive transmissions of OFDM symbols.

By modifying all these parameters, different possible global rates are obtained. Thus, if the coding ratio is fixed at ⅞ and the guard time at 1/32, there are obtained, as a function of the QAM-type modulation level used, the following global transmission rates:

4 QAM→10.56 Mbit/s (all the carriers are used)

16QAM→21.11 Mbit/s (all the carriers are used)

64QAM→31.67 Mbit/s (all the carriers are used)

Consequently, with 1512 useful carriers, if it is wished to allocate a useful rate of 3.5 Mbit/s to an information transmission, there are the following three solutions

| Solution | Useful Rate | Modulation | Number of carriers |
|---|---|---|---|
| 1 | 3.499 Mbit/s | 4QAM | 501 |
| 2 | 3.504 Mbit/s | 16QAM | 251 |
| 3 | 3.497 Mbit/s | 64QAM | 167 | with the useful rate expressed in the form:

Useful rate=(global rate/1512)×number of carriers allocated.

Solution 1 uses a very robust 4QAM modulation which can guarantee transmission with a low error rate, but in return close on one third (501/1512) of the carriers will be necessary.

Solution 2 uses a less robust 16QAM modulation but requires only one sixth of the carriers.

Solution 3 uses one ninth of the carriers with a scarcely robust modulation.

In order to guarantee the transmission rate of 3.5 Mbit/s, the management device 2170 or 2212 according to the invention therefore has a choice between these three solutions.

Its choice is made according to the acceptable error rate for the transmission concerned.

This error rate is related to the service quality required with the transmission request.

It might be thought that solution I will always be the most advantageous solution whatever the service quality requested.

However, the function of the management device according to the invention being to use the radio resources as effectively as possible, it would be disadvantageous in terms of radio resources management to use solution 1 whilst the current transmission conditions make it possible to choose solution 3.

It will easily be understood that, if solution 3 is chosen for all the peripheral stations 1402 to 1404 communicating with the base station 1401, it will be possible to have simultaneously nine transmissions each with a transmission rate of 3.5 Mbit/s whilst solution I would allow only three transmissions.

When the radio resources of a network become limited, the transmission management device 2170 or management unit 2172 according to the present invention will have to make compromises between the transmission parameters determined for a given information transmission and what it can actually offer. These compromises depend on the required service qualities.

For example:

a service quality A defines a fluctuation in the required useful transmission rate of +/−20% and an error rate threshold in bits transmitted of $10^{-6}$.

A service quality B defines a fluctuation in the required useful transmission rate of +/−5% and an error rate threshold in bits transmitted of $10^{-5}$.

A service quality C defines a fluctuation in the required useful transmission rate of +/−30% and an error rate threshold in bits transmitted of $10^{-8}$.

A service quality D defines a fluctuation in the required useful transmission rate of +/−1% and an error rate threshold in bits transmitted of $10^{-8}$.

Let it be assumed now, for example, that the peripheral stations 1402 and 1403 of FIG. 14 have required the same transmission rate and the same error rate threshold and are disposed at different distances with respect to the base station 1401.

For example, the peripheral station 1402 is closer to the base station 1401 than the station 1402.

The transmission of information between peripheral station 1402 and base station 1401 can then use a modulation of low robustness (eg 64 QAM) and a small number of carriers.

On the other hand, the transmission of information between peripheral station 1403 and base station 1401 because of the distance which separates them, will therefore on the one hand have to use a very robust modulation (4QAM) in order to obtain an error rate equivalent to that of the transmission between peripheral station 1402 and base station 1401, and on the other hand will require a number of carriers appreciably greater than that allocated to the said transmission between peripheral station 1402 and base station 1401.

If the management device according to the invention cannot allocate a sufficient number of carriers, the information transmission rate between peripheral station 1403 and base station 1401 will be decreased.

If this rate becomes less than the minimum rate tolerated by the service quality requested by station $SP_2$, the management device will have to reduce the number of carriers allocated to the transmission of information between peripheral station 1402 and base station 1401 in order to satisfy transmission between peripheral station 1403 and base station 1401.

This example presents the important role played by the management device in the optimum management of the radio resources of a network.

In another example, the peripheral stations 1402 and 1403 of FIG. 14 do not require the same service quality, the service quality requested by 1402 requiring a number of carriers much greater than that required by 1403.

In such a case, the compromise established by the management device according to the invention is simple since the carriers not used for the transmission of information between peripheral station 1403 and base station 1401 are allocated to the transmission of information between peripheral station 1402 and base station 1401.

It should also be noted that, in addition to the service qualities required for the transmission of information between the peripheral stations 1402 to 1404 and the base station 1401, priorities can be allocated to these information transmissions according for example to the nature of the information to be transmitted and the applications envisaged.

According to this possibility, one of the information transmissions between a peripheral station, for example peripheral station 1402 and the base station 1401, is allocated a higher priority than the transmissions between the other peripheral stations and the base station 1401, and if this same transmission needs, because of its required service quality, a number of carriers greater than that previously allocated, then, whatever the service qualities required for the other transmissions, the necessary number of carriers will be taken from one or more of these other transmissions.

Provision can also be made for the number of carriers necessary to the transmission of information with the highest priority to be taken from the information transmission with the lowest priority.

Figure 30:
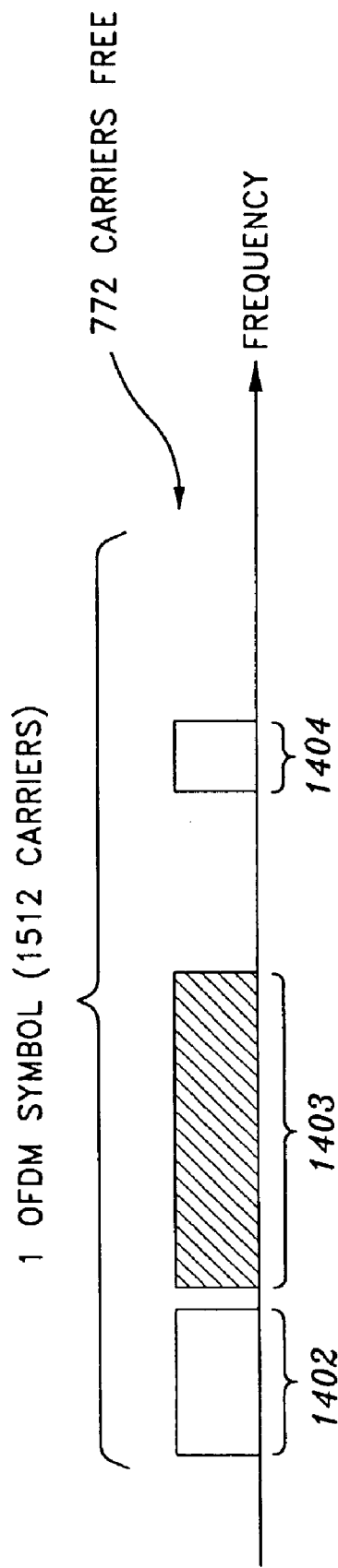
FIG. 30 is a schematic representation of an OFDM symbol.

By way of example, FIG. 30 depicts an ODFM symbol with 1512 carriers distributed over three transmissions of information between peripheral stations 1402 to 1404, and base station 1401.

The transmission between peripheral station 1402 and base station 1401 is effected with a transmission rate of 3.5 Mbits/s for a number of carriers of 167 and a 64QAM modulation.

The transmission between peripheral station 1403 and base station 1401 is effected with a transmission rate 3.5 Mbits/s for a number of carriers of 501 and a 4QAM modulation.

The transmission between peripheral station 1404 and base station 1401 is effected with a transmission rate of 500 Kbit/s for a number of carriers of 72 and a 4QAM modulation.

Thus, out of the 1512 carriers, 772 are not used for the three information transmissions in question but can be allocated subsequently if the required qualities and/or the transmission conditions on the communication channels are changed. invention extends to a process for transmitting data over a transmission channel using a multi-carrier type of modulation, a significance being attributed to each data element or group of data elements for transmission, and the different classes of data being transmitted using modulators favoring either the bit rate or the bit error rate, or again, the energy transmitted.

What is claimed is:

1. A method of transmitting data using multicarrier-type modulation, comprising the steps of:

extracting a first signal from received data, where said first signal represents transmission quality of each sub-carrier observed and transmitted by a remote device;

allocating transmission data to the sub-carriers in an order, wherein the order is based on an importance of the transmission data and the first signal; and inserting a second signal in transmission data, wherein said second signal represents the order in which the transmission data are allocated to the sub-carriers based on the importance of the transmission data and the first signal.

2. A method of receiving data using multicarrier-type modulation, comprising the steps of:

analyzing a transmission channel so as to supply a signal representing transmission quality of each sub-carriers in a return direction;

extracting received data of a signal representing an order in which the transmission data are arranged by a transmission device on the sub-carriers; and forming the received data according to the signal representing the order in which the transmission data are arranged by the transmission device.

3. A method according to claim 2, wherein the received data are serialized in said forming step according to the signal representing the order.

4. A device for transmitting data to a remote device, comprising:
- allocating means for allocating transmission data to sub-carriers in an order, wherein the order is based on an importance of the transmission data and a transmission quality of the sub-carriers; and
- inserting means for inserting in the transmission data of a signal representing the order.

5. A device according to claim 4, wherein said the transmission quality of the sub-carriers is observed and transmitted by a reception device.

6. Device according to claim 4, further comprising:
premodulator means, said premodulator means comprising:
- a presenting means for presenting data to be transmitted according to an importance and a transmission quality observed in each subcarrier in a direction of transmission, to different inputs of a modulator, wherein each input corresponds to a subcarrier,
- a first inserting means for inserting in the data to be transmitted a signal representing the transmission quality observed in each subcarrier in a direction opposite the direction of transmission, and
- a second inserting means for inserting, in the data, a signal representing an order in which the data to be transmitted are arranged at an input of the premodulator, the device further comprising:
a post-demodulator means, said post-demodulator means comprising
- a first extracting means for extracting, from a signal issuing from a demodulator, a frequency classification data signal representing a transmission quality observed by remote device for each subcarrier in the direction of transmission, wherein said signal is generated by the remote device,
- an analyzing means for analyzing a transmission channel so as to supply a signal representing the transmission quality of each subcarrier in the direction opposite the direction of transmission,
- a second extracting means for extracting, from the signal issuing from the demodulator, a signal representing the order in which the different data to be transmitted are arranged at the input of the premodulator of the remote device, and
- a serializing means for serializing the data received as a function of a data position signal representing an order in which data to be transmitted are arranged at the input of the premodulator of the remote device.

7. Device according to claim 6, wherein the premodulator means further comprises a data classification unit and a frequency allocation unit.

8. Device according to claim 7, wherein the presenting means generates a data significance signal representing the importance of each data item supplied by a data source.

9. Device according to claim 7, wherein said frequency allocation unit further comprises:
- first generating means for generating a data allocation command signal for determining the distribution of the data over the different subcarriers from data, wherein the data includes the data significance signal and frequency classification data signals, and
- second generating means for generating a signal representing an order in which the data to be transmitted are arranged at the input of the premodulator.

10. Device according to claim 7, wherein the frequency allocation unit further comprises:
- storing means for storing the information contained in the frequency classification data signal, data significance and storage signals for the frequency allocation unit to read,
- first classification means for classifying and storing the subcarriers by order of interference in a classification table,
- second classification means for classifying and storing the data to be transmitted in order of an importance, using information contained in the data significance signal,
- first transmission means for transmitting a signal relating to relative positioning of data, to the first insetting means,
- second transmission means for transmitting a data allocation command signal to a data allocation unit, wherein said data allocation command signal is composed of a pair of data, wherein each pair of data comprises output of the first classification means and the second classification means,
- a testing means for testing whether the data allocation command signal has been completely transmitted.

11. Device according to claim 7, wherein data allocation unit further comprises a transfer means for transferring data supplied by a data source to a subcarrier denoted by the frequency allocation unit in a data allocation command signal.

12. Device according to claim 5, further comprising:
- a calculation unit,
- a temporary data storage unit,
- a program storage unit,
- a character entry means,
- an image reproduction means, and
- an input-output means.

13. Device according to claim 5, wherein said device is a telephone.

14. Device according to claim 5, wherein said device is a photographic apparatus.

15. Device according to claim 5, wherein said device is a printer.

16. Device according to claim 5, wherein said device is a scanner.

17. Device according to claim 5, wherein said device is a camera.

18. Device according to claim 5, wherein said device is a computer.

19. Device according to claim 5, wherein said device is a facsimile machine.

20. Device according to claim 5, wherein said device is a television receiver.

21. Device according to claim 5, wherein said device is an audio/video player.

22. Method for transmitting data from a local device to a remote device via a transmission channel, the method comprising the steps of:
- receiving data for transmission, from a data source;
- extracting importance information corresponding to the data;
- analyzing the importance information;
- inserting a <<Most Significant Data>> flag and applying an algorithm that generates an Orthogonal Frequency Division Multiplex (OFDM) symbol after an addition of redundancy bits reduce a peak value of the signal, in a case where the data is highly important;
- inserting a ((Least Significant Data)) flag and applying an algorithm that generates an OFDM symbol by using an inverse fast Fourier transform (IFFT) matrix modified so as to reduce a peak value of the signal, in a case where the data is not highly important, transmitting the generated OFDM symbol, via a radiofrequency interface.

23. Method for receiving data transmitted by a remote device via a transmission channel to a reception device, comprising the steps of:

receiving data at a radiofrequency receiver, extracting importance information associated with received data, analyzing the importance information;

generating a control signal representative of a type of demodulation to be applied, wherein if the data is considered to be highly significant, a demodulation favoring a minimum bit error is applied, and wherein if the data is considered to be less significant, a demodulation favoring a maximum data rate is applied; and sending demodulated data to a destination.

24. Device for transmitting data to a remote device via a transmission channel, comprising a data source;

a radiofrequency interface;

two multi carrier demodulators, wherein a first multicarrier demodulator favors a minimum bit error rate, and wherein a second multi-carrier demodulator favors a maximum bit rate;

a plurality of multiplexers for selecting a modulator, and an insertion unit for inserting into data an item of information corresponding to a chosen modulator, wherein a modulator is chosen according to an importance of data received from the data source, and wherein the importance of data received from the data source also affects operation of said plurality of multiplexers.

25. Device according to claim 24, wherein said insertion unit inserts an OFDM symbol prefix and a suffix into data for transmission ensuring synchronization of a receiver.

26. Device according to claim 24, further comprising:

a computing unit, a unit for temporarily storing data, a program storage unit, a character acquisition means, image restoring means, and an input/output means.

27. Device according to claim 24, wherein said device is a telephone.

28. Device according to claim 24, wherein said device is a photographic apparatus.

29. Device according to claim 24, wherein said device is a printer.

30. Device according to claim 24, wherein said device is a scanner.

31. Device according to claim 24, wherein said device is a camera.

32. Device according to claim 24, wherein said device is a computer.

33. Device according to claim 24, wherein said device is a facsimile machine.

34. Device according to claim 24, wherein said device is a television receiver.

35. Device according to claim 24, wherein said device is an audio/video reader.

36. Device for receiving data transmitted by a remote device via a transmission channel, comprising:

a radiofrequency receiver;

two multi-carrier demodulators, wherein a first multicarrier demodulator favors a minimum bit error rate and wherein a second multi-carrier demodulator favors a maximum data rate, a plurality of multiplexers for selecting a demodulator, and an extraction unit for extracting control data, such as a type of demodulator to use, and for generating a signal to command said plurality of multiplexers.

37. Device according to claim 36, further comprising:

a computing unit CPU, a unit for temporarily storing data, a program storage unit, a character acquisition means, an image restoring means, and an input/output means.

38. A method of managing information transmissions between a base station and at least one peripheral station, comprising the steps of:

managing an acceptable error rate; and allocating a number of carriers and a modulation to at least one radio communication channel allocated to a transmission of information between the base station and the at least one peripheral station, in accordance with the acceptable error rate for a transmission of information between the base station and the at least one peripheral station.

39. A method according to claim 38, wherein the number of carriers and a modulation are allocated to at least one communication channel in accordance with the acceptable error rate and variation in transmission rate acceptable for an information transmission.

40. A method according to claim 38, wherein the step of allocating a number of carriers and a modulation is performed during an information transmission between the base station and the at least one peripheral station.

41. A method according to claim 38, wherein the step of allocating a number of carriers and a modulation is performed between two information transmissions between the base station and the at least one peripheral station.

42. Method according to claim 38, further comprising a step of receiving at least one measurement of a transmission error rate on radio communication channel allocated to transmission of information between the base station and the at least one peripheral station.

43. A method according to claim 42, further comprising the steps of:

analyzing said at least one measurement of the transmission error rate; and comparing the result of the analyzing step with the acceptable error rate.

44. A method according to claim 43, further comprising a step of determining a number of carriers and a modulation if the comparing step indicates that the acceptable error rate has not been met.

45. Method according to claim 38, further including a step of determining a number of carriers to be allocated different from a number of carriers previously allocated to said at least one communication channel between the base station and the at last one peripheral station.

46. Method according to claim 45, wherein the number of carriers to be allocated to said at least one communication channel between the base station and the at least one peripheral station is greater than a number of carriers that was allocated previously.

47. Method according to claim 45, wherein the number of carriers to be allocated to said at least one communication channel between the base station and the at least one peripheral station is less than a number of carriers that was allocated previously.

48. Method according to claim 46 further comprising the steps of:
determining a number of carriers to be allocated to a first communication channel between the base station and a first peripheral station which is greater than a number of carriers which was previously allocated to this first communication channel, and
determining a number of carriers to be allocated to a second communication channel between the base station and a second peripheral station which is less than a number of carriers which was previously allocated to this second communication channel, in response to service qualities required for the transmission of information on communication channels in terms of transmission error rate and transmission rate.

49. Method according to claim 38, wherein said method further includes a step of determining a modulation to be allocated to said at least one communication channel between the base station and the at least one peripheral station which is different from a modulation previously allocated.

50. Method according to claim 38, wherein a transmission by modulated carriers uses a technique of modulation by Orthogonal Frequency Division Multiplexing (OFDM).

51. Device according to claim 50, wherein transmission by modulated carriers uses a technique of modulation known as Orthogonal Frequency Division Multiplexing.

52. A method according to claim 38, wherein the number of carriers and the modulation are allocated in said allocating step in accordance with the acceptable error rate and transmission rate.

53. A method of sending information over a communication channel, comprising the steps of:
allocating a number of carriers and a modulation to information for transmitting over a radio communication channel; and
sending the information in carriers modulated by the information,
wherein the number of carriers and the modulation are allocated to the information in said allocating slip in accordance with an acceptable error rate for an information transmission.

54. A method according to claim 53, wherein the number of carriers and the modulation are allocated to the information in said allocating step in accordance with the acceptable error rate and variation in the transmission rate acceptable for said information for transmission.

55. A method according to claim 53, wherein the allocating step is performed during an information transmission.

56. A method according to claim 53, wherein the allocating step is performed between two information transmissions.

57. Method according to claim 53, further including a step of sending a request to allocate a service quality in terms of transmission rate and transmission error rate for an information transmission.

58. A method according to claim 53, further comprising a step of reconfiguring a number of carriers different from a number of carriers previously allocated to the information in said allocating step.

59. Method according to claim 58, wherein a number of carriers reconfigured is greater than a number of carriers previously allocated.

60. Method according to claim 58, wherein a number of carriers reconfigured is less than a number of carriers previously allocated.

61. A method according to claim 53, further comprising, a step of reconfiguring a modulation different from a modulation previously allocated to the information in said allocating step.

62. Method according to claim 53, wherein the sending step uses modulation by Orthogonal Frequency Division Multiplexing.

63. A method according to claim 53, wherein the number of carriers and the modulation are allocated in said allocating step in accordance with the acceptable error rate and transmission rate.

64. A method of receiving information coming from a communication channel, comprising the steps of:
receiving information sent in the form of carriers modulated by information; and
selecting the carriers and modulation allocated to the information, in accordance with acceptable error rate for an information transmission.

65. A method according to claim 64, wherein the carriers and the modulation are selected in said selecting step in accordance with the acceptable error rate and variation in the transmission rate acceptable for said information transmission.

66. A method according to claim 64, wherein the selecting step is performed during an information transmission.

67. A method according to claim 64, wherein the selecting step is performed between two information transmissions.

68. Method according to claim 64, further comprising a step of measuring the transmission error rate on the radio communication channel allocated to an information transmission.

69. A method according to claim 64, further comprising a step of reconfiguring the number of carriers different from a number of carriers allocated selected in said selecting step.

70. A method according to claim 69, wherein the number of carriers which are reconfigured is greater than a number of carriers selected in said selecting step.

71. A method according to claim 69, wherein the number of carriers which are reconfigured is less than a number of carriers selected in said selecting step.

72. A method according to claim 64, further comprising a step of reconfiguring the modulation different from the modulation selected in said selecting step.

73. Method according to claim 64, wherein receiving step receives carriers modulated by Orthogonal Frequency Division Multiplexing (OFDM).

74. A method according to claim 64, wherein the carriers and modulation are selecting step in accordance with the acceptable error rate and transmission rate.

75. A device for managing the information transmission between a base station and at least one peripheral station, said device comprising:
managing means for managing an acceptable error rate; and
allocating means for allocating a number of carriers and a modulation to at least one radio communication channel allocated to a transmission of information between the base station and the at least one peripheral station, in accordance with the acceptable error rate for a transmission of information between the base station and the at least one peripheral station.

76. A device according to claim 75, wherein said allocating means allocates the number of carriers and a modulation to at least one communication channel in accordance with the acceptable error rate and variation in transmission rate acceptable for the information transmission.

77. Device according to claim 75 further comprising receiving means for receiving at least one measurement of transmission error rate.

78. A device according to claim 77, further comprising:
analyzing means for analyzing the at least one measurement of transmission error rate; and
comparing means for comparing the output of the analyzing means with the acceptable error rate.

79. Device according to claim 75, further comprising determining means for determining a number of carriers to be allocated different from a number of carriers previously allocated to the at least one communication channel between the base station and the at least one peripheral station.

80. Device according to claim 79, wherein the number of carriers to be allocated to the at least one communication channel between the base station and the at least one peripheral station is greater than the number of carriers allocated previously to the communication channel.

81. Device according to claim 79, wherein the number of carriers allocated to said at least one communication channel between the base station and the at least one peripheral station is less than the number of carriers allocated previously to the communication channel.

82. Device according to claim 81, further comprising:
first determining means for determining a number of carriers to be allocated to a first communication channel between the base station and a first peripheral station which is greater than that previously allocated to the first communication channel, and
second determining means for determining a number of carriers to be allocated to a second communication channel between the base station and a second peripheral station which is less than that previously allocated to the second communication channel, in response to service qualities required respectively for the transmission of information over the communication channel in terms of transmission error rate and transmission rate.

83. Device according to claim 75, further comprising determining means for determining a modulation to be allocated to said at least one communication channel between the base station and the at least one peripheral station which is different from a modulation allocated previously.

84. Device according to claim 75, wherein the transmission by modulated carriers uses a technique of modulation known as Orthogonal Frequency Divisional Multiplexing (OFDM).

85. A device according to claim 75, wherein said allocating means allocates the number of carriers and the modulation in accordance with the acceptable error rate and transmission rate.

86. A device for sending information over a communication channel, comprising:
allocating means for allocating a number of carriers and a modulation to information for transmitting over the communication channel,
sending means for sending said information in carriers modulated by said information,
wherein said allocating means allocates the number of carriers and the modulation to the information in accordance with an acceptable error rate for an information transmission.

87. A device according to claim 86, wherein said allocating means allocates the number of carriers and the modulation to the information in accordance with the acceptable error rate and variation in a transmission rate acceptable for an information transmission.

88. A device according to claim 86, further comprising the reconfiguring means for reconfiguring the number of carriers different from a number of carriers previously allocated by said allocating means.

89. Device according to claim 88, wherein the number of carriers reconfigured is greater than a number of carriers previously allocated.

90. Device according to claim 88, wherein the number of carriers reconfigured is less than a number of carriers previously allocated.

91. Device according to claim 86, further comprising reconfiguring means for reconfiguring the modulation different from a modulation previously allocated by said allocating means.

92. Device according to claim 86, wherein the information transmission uses a technique of Orthogonal Frequency Division Multipleing (OFDM).

93. A device according to claim 86, wherein said allocating means allocates the number of carriers and the modulation in accordance with the acceptable error rate and transmission rate.

94. A device for receiving information coming from a communication channel, comprising:
receiving means for receiving information sent in carriers modulated by the information, and
selecting means for selecting carriers and modulation allocated for the information, in accordance with acceptable error rate for an information transmission.

95. Device according to claim 94, wherein said selecting means selects the carriers and the modulation in accordance with the acceptable error rate and variation in transmission acceptable for the information transmission.

96. Device according to claim 94, further comprising measuring means for measuring the transmission error rate on a communication channel allocated to the information transmission.

97. A device according to claim 94, further comprising reconfiguring means for reconfiguring the number of carriers different from a number of carriers previously selected by said selecting means.

98. A device according to claim 97, wherein the number of carriers reconfigured is greater than a number of carriers previously selected by said selecting means.

99. A device according to claim 97, wherein the number of carriers reconfigured is less than a number of carriers previously selected by said selected means.

100. Device according to claim 94, further comprising reconfiguring means for reconfiguring the modulation different from a modulation previously selected by said selecting means.

101. A device according to claim 94, wherein said selecting means selects the carriers and modulation in accordance with acceptable error rate and transmission rate.

* * * * *

UNITED STATES PATENT AND TRADEMARK OFFICE
CERTIFICATE OF CORRECTION

PATENT NO. : 7,039,120 B1
APPLICATION NO. : 09/450716
DATED : May 2, 2006
INVENTOR(S) : Francois Thoumy et al.

It is certified that error appears in the above-identified patent and that said Letters Patent is hereby corrected as shown below:

COVER PAGE:
(30) Foreign Application Priority Data, "Jan. 29, 1999 (FR)...99 0134" should read -- Jan. 29, 1999 (FR)...99 01034 --.

COLUMN 1:
Line 21, "to" should read -- too --.

COLUMN 2:
Line 20, "transmission)." should read -- transmission. --.

COLUMN 3:
Line 49, "stream" should read -- streams --.

COLUMN 4:
Line 57, "coding," should read -- coding, and --.

COLUMN 5:
Line 57, "of" should read -- of: --.

COLUMN 7:
Line 18, "data)," should read -- data), and --.

COLUMN 8:
Line 10, "involving" should read -- involving: --;
Line 25, "signal;" should read -- signal; and --;
Line 34, "radiofre-" should read -- radio fre- --;
Line 51, "rate;" should read -- rate; and --; and
Line 57, "radiofrequency" should read -- radio frequency --.

COLUMN 13:
Line 42, "it is" should read -- are --.

COLUMN 14:
Line 50, "Clearly that" should read -- Clearly, --.

COLUMN 17:
Line 14, "simplifies" should be deleted; and
Line 21, "radiofrequency" should read -- radio frequency --.

UNITED STATES PATENT AND TRADEMARK OFFICE
CERTIFICATE OF CORRECTION

PATENT NO.      : 7,039,120 B1
APPLICATION NO. : 09/450716
DATED           : May 2, 2006
INVENTOR(S)     : Francois Thoumy et al.

It is certified that error appears in the above-identified patent and that said Letters Patent is hereby corrected as shown below:

COLUMN 19:
Line 3, "Time=[[t]] $t_1$" should read -- Time=$t_1$ -- and
"Time=[[t=]] $t_2$," should read -- Time=$t_2$, --.

COLUMN 20:
Line 13, "embodiment the" should read -- embodiment of the --;
Line 35, "accordance" should read -- according --;
Line 60, "created" should read -- created: --; and
Line 61, ":" should be deleted.

COLUMN 21:
Lines 26 and 35, "in" should read -- of --; and
Line 46, "comprises" should read -- comprises: --.

COLUMN 23:
Line 7, "a" (second occurrence) should read -- as --.

COLUMN 28:
Line 46, "FIG." should read -- (FIG. --.

COLUMN 29:
Line 47, "be" should read -- the --.

COLUMN 31:
Line 45, "the 501." should read -- the 501 --.

COLUMN 35:
Line 12, "with" should read -- which --.

COLUMN 36:
Line 17, "solutions" should read -- solutions: --.

COLUMN 37:
Line 23, "(eg" should read -- (e.g., --.

UNITED STATES PATENT AND TRADEMARK OFFICE
CERTIFICATE OF CORRECTION

PATENT NO. : 7,039,120 B1
APPLICATION NO. : 09/450716
DATED : May 2, 2006
INVENTOR(S) : Francois Thoumy et al.

It is certified that error appears in the above-identified patent and that said Letters Patent is hereby corrected as shown below:

COLUMN 38:
Line 31, "changed. invention" should read -- changed. ¶ The scope of the present invention is not limited to the details of the forms of embodiment discussed above by way of example but extends, on the contrary, to changes within the grasp of a man of the art. It is clear, for example, that the invention --; and
Line 56, "sub-carriers" should read -- sub-carrier --.

COLUMN 39:
Line 9, "said" should be deleted;
Line 29, "comprising" should read -- comprising: --; and
Line 61, "signals," should read -- signals; --.

COLUMN 40:
Line 4, "read," should read -- read; --;
Line 7, "table," should read -- table; --;
Line 10, "signal," should read -- signal; --;
Line 12, "insetting" should read -- inserting --;
Line 13, "means," should read -- means; --;
Line 19, "means," should read -- means; and --;
Line 22, "wherein data" should read -- wherein said data --;
Line 53, "Method" should read -- A method --; and
Line 65, "important;" should read -- important; and --.

COLUMN 41:
Line 3, "important, transmitting" should read -- important; ¶ transmitting --;
Line 4, "radiofrequency" should read -- radio frequency --;
Line 6, "Method" should read -- A method --;
Line 9, "radiofrequency" should read -- radio frequency -- and "receiver," should read -- receiver; --;
Line 11, "data," should read -- data; --;
Line 21, "comprising" should read -- comprising: --;
Line 24, "radiofrequency" should read -- radio frequency --;
Line 25, "multi carrier" should read -- multi-carrier --;
Line 28, "bit" should read -- data --;
Line 29, "modulator," should read -- modulator; --; and
Line 46, "image" should read -- an image --.

UNITED STATES PATENT AND TRADEMARK OFFICE
CERTIFICATE OF CORRECTION

| | |
|---|---|
| PATENT NO. | : 7,039,120 B1 |
| APPLICATION NO. | : 09/450716 |
| DATED | : May 2, 2006 |
| INVENTOR(S) | : Francois Thoumy et al. |

It is certified that error appears in the above-identified patent and that said Letters Patent is hereby corrected as shown below:

COLUMN 42:
Line 1, "radiofrequency" should read -- radio frequency --;
Line 5, "rate," should read -- rate; --;
Line 6, "demodulator," should read -- demodulator; --;
Line 23, "radio" should be deleted; and
Line 44, "radio" should read -- the --.

COLUMN 43:
Line 6, "claim 46" should read -- claim 46, --;
Line 11, "channel," should read -- channel; and --; and
Line 44, "slip" should read -- step --.

COLUMN 44:
Lines 1, 7 and 30, "Method" should read -- A method --;
Line 3, "comprising," should read -- comprising --;
Line 34, "allocated" should be deleted;
Line 46, "wherein receiving" should read -- wherein the receiving --; and
Line 50, "are selecting" should read -- are selected in said selecting --.

COLUMN 45:
Line 3, "claim 75" should read -- claim 75, --;
Line 30, "channel," should read -- channel; --; and
Line 57, "channel," should read -- channel; and --.

UNITED STATES PATENT AND TRADEMARK OFFICE
CERTIFICATE OF CORRECTION

PATENT NO. : 7,039,120 B1
APPLICATION NO. : 09/450716
DATED : May 2, 2006
INVENTOR(S) : Francois Thoumy et al.

It is certified that error appears in the above-identified patent and that said Letters Patent is hereby corrected as shown below:

COLUMN 46:
Line 31, "information," should read -- information; --;
Line 35, "acceptable" should read -- an acceptable --;
Line 54, "selected" should read -- selecting --.

Signed and Sealed this

Sixteenth Day of January, 2007

JON W. DUDAS
*Director of the United States Patent and Trademark Office*